US011696119B2

(12) United States Patent
Bao et al.

(10) Patent No.: US 11,696,119 B2
(45) Date of Patent: Jul. 4, 2023

(54) NEURAL NETWORK CONFIGURATION FOR WIRELESS COMMUNICATION SYSTEM ASSISTANCE

(71) Applicant: QUALCOMM Incorporated, San Diego, CA (US)

(72) Inventors: Jingchao Bao, San Diego, CA (US); Sony Akkarakaran, Poway, CA (US); Hamed Pezeshki, San Diego, CA (US); Tao Luo, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 17/122,117

(22) Filed: Dec. 15, 2020

(65) Prior Publication Data

US 2021/0185515 A1 Jun. 17, 2021

Related U.S. Application Data

(60) Provisional application No. 62/959,072, filed on Jan. 9, 2020, provisional application No. 62/948,703, filed on Dec. 16, 2019.

(51) Int. Cl.
*H04W 4/30* (2018.01)
*H04W 8/24* (2009.01)
(Continued)

(52) U.S. Cl.
CPC ............ *H04W 8/245* (2013.01); *G06N 3/008* (2013.01); *G06N 3/04* (2013.01); *G06N 3/044* (2023.01);
(Continued)

(58) Field of Classification Search
CPC ........ H04W 8/25; H04W 4/30; H04W 72/042
See application file for complete search history.

(56) References Cited

U.S. PATENT DOCUMENTS

2010/0074119 A1 3/2010 Krishnaswamy
2015/0324689 A1 11/2015 Wierzynski et al.
(Continued)

FOREIGN PATENT DOCUMENTS

WO 2016072893 A1 5/2016
WO 2019047097 A1 3/2019
(Continued)

OTHER PUBLICATIONS

International Search Report and Written Opinion—PCT/US2020/065209—ISA/EPO—dated Mar. 25, 2021. 17 pages.
(Continued)

*Primary Examiner* — Barry W Taylor
(74) *Attorney, Agent, or Firm* — Marbury Law Group

(57) ABSTRACT

Methods, systems, and devices for wireless communications are described. Generally, the described techniques provide for communicating capability information (e.g., regarding neural network blocks supported by a user equipment (UE) and a base station). A base station may configure one or more neural network block parameters, and may transmit the neural network block parameters to the UE. The UE may configure or reconfigure a neural network block according to the neural network block parameters, and may process one or more signals, e.g., baseband signals, generated by the UE using the neural network block and the neural network block parameters.

18 Claims, 24 Drawing Sheets

(51) Int. Cl.
*G06N 3/04* (2023.01)
*G06N 3/008* (2023.01)
*G06N 5/025* (2023.01)
*H04W 72/23* (2023.01)
*G06N 3/044* (2023.01)

(52) U.S. Cl.
CPC .............. *G06N 5/025* (2013.01); *H04W 4/30* (2018.02); *H04W 72/23* (2023.01)

(56) References Cited

U.S. PATENT DOCUMENTS

| | | | |
|---|---|---|---|
| 2020/0229054 A1 | 7/2020 | Lee | |
| 2020/0367264 A1* | 11/2020 | Chen | H04W 72/048 |
| 2020/0413316 A1* | 12/2020 | Isaksson | H04W 24/10 |
| 2021/0064996 A1* | 3/2021 | Wang | H04L 1/0016 |
| 2021/0158151 A1* | 5/2021 | Wang | H04L 12/189 |
| 2021/0194733 A1* | 6/2021 | Huangfu | G06N 3/084 |
| 2021/0342687 A1* | 11/2021 | Wang | G06N 3/08 |
| 2021/0385682 A1* | 12/2021 | Bedekar | G06N 3/105 |

FOREIGN PATENT DOCUMENTS

| | | |
|---|---|---|
| WO | 2019075691 A1 | 4/2019 |
| WO | 2019172813 A1 | 9/2019 |
| WO | 2020171803 A1 | 8/2020 |
| WO | 2020226542 A1 | 11/2020 |
| WO | 2021029889 A1 | 2/2021 |

OTHER PUBLICATIONS

Oppo, et al., "Discussion on AI/ML Model Transfer in 5GS", 3GPP SA WG1 #88, 3GPP Draft; S1-193039, 3rd Generation Partnership Project (3GPP), Mobile Competence Centre; 650, Route Des Lucioles; F-06921 Sophia-Antipolis Cedex; France, vol. SA WG1, No. Reno, USA; Nov. 18, 2019-Nov. 22, 2019, Nov. 8, 2019 (Nov. 8, 2019), 13 Pages, XP051822342, Retrieved from the Internet: URL: https://ftp.3gpp.org/tsg_sa/WG1_Serv/TSGS1_88_Reno/Docs/S1-193039.zip_S1-193039_MotivationAA of AA AMMTA Av8.1.pdf [retrieved on Nov. 8, 2019] pp. 1-10.

* cited by examiner

NEURAL NETWORK CONFIGURATION FOR WIRELESS COMMUNICATION SYSTEM ASSISTANCE

RELATED APPLICATIONS

This application claims the benefit of priority to U.S. Provisional Application No. 62/948,703 entitled "NEURAL NETWORK CONFIGURATION FOR WIRELESS COMMUNICATION SYSTEM ASSISTANCE" filed Dec. 16, 2019, and U.S. Provisional Application No. 62/959,072 entitled "FLEXIBLE CONFIGURATION OF FUNCTION BLOCK PARAMETERS AMONG DC/CC/SUL/BWP" filed Jan. 9, 2020, the entire contents of both of which are incorporated herein by reference for all purposes.

FIELD OF TECHNOLOGY

The following relates generally to wireless communications and more specifically to neural network configuration for wireless communication system assistance.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may perform various functions (e.g., process one or more signals) using one or more neural network blocks.

SUMMARY

The described techniques relate to improved methods, systems, devices, and apparatuses that support neural network configuration for wireless communication system assistance. Generally, the described techniques provide for communicating capability information (e.g., regarding neural network blocks capable of being utilized by a user equipment (UE) and a base station). A base station may configure one or more neural network block parameters, and may transmit the neural network block parameters to the UE. The UE may configure or reconfigure a neural network block according to the neural network block parameters, and may process one or more signals generated or received by the UE using the neural network block and the neural network block parameters. The UE may also provide feedback information (e.g., when requested by the base station) indicating how well the neural network block is performing with the configuration. The base station may use the feedback information when providing neural network block parameters to the UE and other served UEs, to configure or reconfigure the neural network block for improved performance.

A method of wireless communications at a UE is described. The method may include transmitting, to a base station, capability information indicating one or more neural network blocks supported by the UE, receiving, from the base station, one or more neural network block parameters based on the transmitting of the capability information, and processing one or more signals generated by the UE using a first neural network block of the one or more neural network blocks and the one or more neural network block parameters.

An apparatus for wireless communications at a UE is described. The apparatus may include a processor, memory coupled with the processor, and instructions stored in the memory. The instructions may be executable by the processor to cause the apparatus to transmit, to a base station, capability information indicating one or more neural network blocks supported by the UE, receive, from the base station, one or more neural network block parameters based on the transmitting of the capability information, and process one or more signals generated by the UE using a first neural network block of the one or more neural network blocks and the one or more neural network block parameters.

Another apparatus for wireless communications at a UE is described. The apparatus may include means for transmitting, to a base station, capability information indicating one or more neural network blocks supported by the UE, receiving, from the base station, one or more neural network block parameters based on the transmitting of the capability information, and processing one or more signals generated by the UE using a first neural network block of the one or more neural network blocks and the one or more neural network block parameters.

A non-transitory computer-readable medium storing code for wireless communications at a UE is described. The code may include instructions executable by a processor to transmit, to a base station, capability information indicating one or more neural network blocks supported by the UE, receive, from the base station, one or more neural network block parameters based on the transmitting of the capability information, and process one or more signals generated by the UE using a first neural network block of the one or more neural network blocks and the one or more neural network block parameters.

Various aspects may include transmitting, to a base station, capability information indicating one or more neural network blocks supported by the UE, receiving, from the base station, control signaling with one or more neural network block parameters based at least in part on the transmitting of the capability information, processing one or more signals generated by the UE using a first neural network block of the one or more neural network blocks and the one or more neural network block parameters; and transmitting, to the base station, an acknowledgement message indicating that the control signaling has been successfully received.

In some aspects, the one or more neural network block parameters may further include one or more adjustment parameters to the first neural network block used to process the one or more signals by the UE, and the method may further include adjusting the first neural network block according to the one or more adjustment parameters, wherein processing the one or more signals using the first neural network block may be based at least in part on the adjusting.

In some aspects, the control signaling may include a resource allocation message including the one or more neural network block parameters for configuring network components. In some aspects, the network components may include one or more cell groups, one or more component carriers associated with each of the one or more cell groups, one or more bandwidth parts associated with each of the one or more component carriers, or a combination thereof. In some aspects, the one or more cell groups may include a master cell group, a secondary cell group, a supplementary cell group, or a combination thereof.

Some aspects may further include receiving, from the base station, the control signaling over a physical downlink control channel, wherein the one or more neural network block parameters are received over the physical downlink control channel, and configuring the first neural network block in place of a default network function block of the UE based at least in part on receiving the one or more neural network block parameters, wherein processing the one or more signals using the first neural network block is based at least in part on the configuring.

Some aspects may further include transmitting a configuration of the configured first neural network block to the base station over a physical uplink control channel or a physical uplink shared channel.

Some aspects may further include receiving configuration information over a physical downlink control channel, wherein the configuration information includes an indication of one or more added algorithms for the first neural network block, one or more released algorithms from the default network function block, or a combination thereof.

Various aspects may include receiving, from a UE, UE capability information indicating that the UE supports one or more neural network blocks, configuring, based on the received UE capability information, control signaling with one or more neural network block parameters for a first neural network block of one or more neural network blocks supported by the UE, transmitting the control signaling to the UE, and receiving, from the UE, an acknowledgment message indicating that the control signaling has been successfully received by the UE.

In some aspects, transmitting the control signaling further may include transmitting, to the UE, the control signaling over a physical downlink control channel, wherein the one or more neural network block parameters are transmitted over the physical downlink control channel according to the control signaling.

In some aspects, transmitting the control signaling further may include transmitting configuration information for the first neural network block and the one or more neural network block parameters over a physical downlink control channel, wherein the configuration information includes instructions for the UE to configure the first neural network block in place of a default network function block of the UE.

Some aspects may further include receiving a configuration of a configured first neural network block from the UE over a physical uplink control channel or a physical uplink shared channel, wherein the configured first neural network block has been configured by the UE based at least in part on the one or more neural network block parameters. Some aspects may further include adjusting the first neural network block according to the one or more adjustment parameters, wherein processing the one or more signals using the first neural network block may be based on the adjusting.

Some aspects may further include receiving a resource allocation message for a physical downlink shared channel, and monitoring the physical downlink shared channel for the one or more neural network block parameters based on receiving the resource allocation message, wherein receiving the one or more neural network block parameters may be based on monitoring the physical downlink shared channel. In some aspects, the resource allocation message may include a downlink control information (DCI) message, a media access control (MAC) control element (MAC-CE) or radio resource control (RRC) message, and the one or more neural network block parameters may be received as part of a downlink data message.

In some aspects, the one or more adjustment parameters include an activation indication for a node of the first neural network block, a deactivation indication of the node of the first neural network block, a weight value for the node of the first neural network block, an adjustment to a weight value for a submodule, or a bias value for the node of the first neural network block, or a combination thereof.

Some aspects may further include performing a first operation on the one or more signals using a first submodule of the first neural network block based on a first weight value indicated by the one or more adjustment parameters, and performing a second operation on the one or more signals using a second submodule of the first neural network block based on a second weight value indicated by the one or more adjustment parameters, where processing the one or more signals using the first neural network block may be based on performing the first operation and the second operation.

Some aspects may further include identifying the first neural network block having one or more configuration options, where the one or more neural network blocks supported by the UE may include the first neural network block.

Some aspects may further include receiving, from the base station, a resource allocation message for a physical downlink shared channel, receiving configuration information for the first neural network block and the one or more neural network block parameters over the physical downlink shared channel based on receiving the resource allocation message, and configuring the first neural network block in place of a default network function block of the UE based on receiving the configuration information and the one or more neural network block parameters, where processing the one or more signals using the first neural network block may be based on the configuring. In some aspects, the resource allocation message may include a radio resource control message, or a downlink control information message.

In some aspects, the configuration information may include an indication of one or more added algorithms for the first neural network block, one or more released algorithms from the default network function block, or a combination thereof.

Some aspects may further include identifying the default network function block, where the one or more neural network blocks supported by the UE may include the default network function block.

Some aspects may further include receiving control information from the base station that indicates a new network function block to be the default network function block, where identifying the default network function block may be based on receiving the control information.

Some aspects may further include monitoring for the configuration information based on receiving the resource allocation message, where receiving the configuration information may be based on the monitoring.

Some aspects may further include transmitting, by the UE, a request message to use a second neural network block different than the first neural network block, and processing the one or more signals using the second neural network block based on transmitting the request message.

Some aspects may further include receiving, from the base station, an acknowledgment message based on the transmitting of the request message, where processing the one or more signals using the second neural network block may be based on receiving the acknowledgement message.

In some aspects, receiving the one or more neural network block parameters further may include identifying a set of neural network blocks stored by the UE, where the one or more neural network blocks supported by the UE may include the set of neural network blocks, receiving an indication of the first neural network block of the set of neural network blocks, and identifying the first neural network block of the set of neural network blocks based on receiving the indication of the first neural network block, wherein processing the one or more signals using the first neural network block may be based on identifying the first neural network block.

Some aspects may further include receiving a downlink message that may include the one or more neural network block parameters, wherein receiving the one or more neural network block parameters may be based on receiving the downlink message.

In some aspects, the downlink message may include a downlink control information message, a media access control element, or a radio resource control message, or a combination thereof.

Some aspects may further include initiating, upon receiving the one or more neural network block parameters, a timer, wherein processing the one or more signals using the first neural network block may be based on an expiration of the timer.

Some aspects may further include initiating, upon receiving the one or more neural network block parameters, a counter of symbols, a counter of slots, or a combination thereof, wherein processing the one or more signals using the first neural network block may be based on the counter of symbols, the counter of slots, or the combination thereof satisfying a threshold.

Some aspects may further include initiating, upon processing the one or more signals using the first neural network block, a timer, determining that the timer may have expired, and processing, based on determining that the timer may have expired, the one or more signals using a default neural network block different than the first neural network block.

Some aspects may further include receiving, from the base station, one or more additional neural network block parameters, and transmitting, to the base station, a negative acknowledgement message indicating that the one or more additional neural network block parameters failed to be successfully decoded.

Some aspects may further include determining a priority status of the one or more additional neural network block parameters, wherein transmitting the negative acknowledgement message may be based on the priority status.

Some aspects may further include receiving, from the base station, a request for feedback information about a performance of the first neural network block, and transmitting, based on processing the one or more signals using the first neural network block and the request, a report including the feedback information about the performance of the first neural network block to the base station. In some aspects, the request may be communicated using a downlink control information (DCI) message, a media access control (MAC) control element (MAC-CE) message, or a radio resource control message, and the feedback information may be communicated using an uplink control message on an uplink control channel or an uplink data message on a physical uplink shared channel.

In some aspects, the feedback information may include processed data, unprocessed data, complete measurements, partial measurements, or a combination thereof.

In some aspects, the first neural network block may be configured to perform channel estimation for the one or more signals, channel state information compression for the one or more signals, or a combination thereof.

Some aspects may further include receiving, from the base station, second capability information indicating that the base station supports at least one neural network block, where transmitting the capability information to the base station may be based on receiving the second capability information. In some aspects, the second capability information may be included in a system information block, a master information block, a downlink control information message, a media access control element, or a radio resource control message, or a combination thereof.

In some aspects, the one or more neural network block parameters may include one or more input values, a number of layers of the first neural network block, a number of nodes for one or more layers of the first neural network block, a connection map across the one or more layers of the first neural network block, one or more activation functions for one or more nodes of the first neural network block, one or more weight values for the one or more nodes of the first neural network block, or one or more bias values for the one or more nodes of the first neural network block, or a combination thereof.

In some aspects, the one or more neural network block parameters further may include one or more adjustment parameters to the first neural network block used to process one or more signals by the UE.

In some aspects, the resource allocation message may include a downlink control information message or radio resource control message, and the one or more neural network block parameters may be transmitted as part of a downlink data message.

In some aspects, the one or more adjustment parameters include an activation indication for one or more nodes of the first neural network block, a deactivation indication for the one or more nodes of the first neural network block, a weight value for the one or more nodes of the first neural network block, or a bias value for the one or more nodes of the first neural network block, or a combination thereof.

In some aspects, the one or more adjustment parameters to the first neural network block include a first adjustment to a first weight value for a first node of a submodule of the first neural network block or a second adjustment to a second weight value for a second node of a submodule of the first neural network block, or both.

Some aspects may further include transmitting, to the UE, a resource allocation message for a physical downlink shared channel, and transmitting configuration information for the first neural network block and the one or more neural network block parameters over the physical downlink shared channel based on transmitting the resource allocation message, wherein the configuration information includes instructions for the UE to configure the first neural network block in place of a default network function block of the UE.

In some aspects, the resource allocation message may include a radio resource control message, or a downlink control information message.

In some aspects, the configuration information may include an indication of one or more added algorithms for the first neural network block, one or more released algorithms from the default network function block, or a combination thereof.

In some aspects, one or more neural network block types supported by the UE may include the default network function block.

Some aspects may further include transmitting control information to the UE that indicates a new network function block to be the default network function block.

Some aspects may further include receiving, from the UE, a request message to use a second neural network block different than the first neural network block, and transmitting, to the UE, an acknowledgement message based on the receiving of the request message.

In some aspects, transmitting the one or more neural network block parameters further may include transmitting an indication of the first neural network block of a set of neural network blocks stored by the UE, where the one or more neural network blocks supported by the UE may include the set of neural network blocks.

Some aspects may further include operations, features, means, or instructions for transmitting a downlink message that may include the one or more neural network block parameters, where the one or more neural network block parameters transmitted as part of the downlink message.

In some aspects, the downlink message may include a downlink control information message, a media access control element, or a radio resource control message, or a combination thereof.

Some aspects may further include transmitting an indication of a timer and an instruction for the UE to initiate the timer upon receiving the one or more neural network block parameters.

Some aspects may further include transmitting an indication of a counter of symbols, a counter of slots, or a combination thereof, and an instruction for the UE to initiate the counter of symbols, the counter of slots, of the combination thereof upon receiving the one or more neural network block parameters.

Some aspects may further include transmitting, to the UE, one or more additional neural network block parameters, and receiving, from the UE, a negative acknowledgement message indicating that the one or more additional neural network block parameters failed to be successfully decoded.

Some aspects may further include receiving the negative acknowledgement message may be based on a priority status of the one or more additional neural network block parameters.

Some aspects may further include transmitting, to the UE, a request for feedback information about a performance of the first neural network block, and receiving, based on the request for the feedback information about the performance of the first neural network block, a report including the feedback information about the performance of the first neural network block. In some aspects, the request may be communicated using a DCI message, MAC-CE message, or an RRC message, and the feedback information may be communicated using an uplink control message on an uplink control channel or an uplink data message on a physical uplink shared channel In some aspects, the feedback information may include processed data, unprocessed data, complete measurements, partial measurements, or a combination thereof.

In some aspects, the first neural network block may be configured to perform channel estimation for one or more signals, channel state information compression for the one or more signals, or a combination thereof.

Some aspects may further include transmitting, to the UE, second capability information indicating that the base station supports at least one neural network block, wherein receiving the capability information from the UE may be based on transmitting the second capability information. In some aspects, the second capability information may be included in a system information block, a master information block, a downlink control information message, a media access control element, or a radio resource control message, or a combination thereof.

In some aspects, the one or more neural network block parameters include one or more input values, a number of layers of the first neural network block, a number of nodes for one or more layers of the first neural network block, a connection map across the one or more layers of the first neural network block, one or more activation functions for one or more nodes of the first neural network block, one or more weight values for the one or more nodes of the first neural network block, or one or more bias values for the one or more nodes of the first neural network block, or a combination thereof.

Further aspects include a UE and a base station including a processor configured to perform operations of any of the aspect methods summarized above. Further aspects include a non-transitory computer-readable medium having stored thereon processor-executable instructions configured to cause a processor perform operations of any of the aspect methods summarized above. Further aspects include a computer program product comprising processor-executable instructions configured to cause a processor perform operations of any of the aspects of methods summarized above. Further aspects include an apparatus including means for performing functions of any of the aspect methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
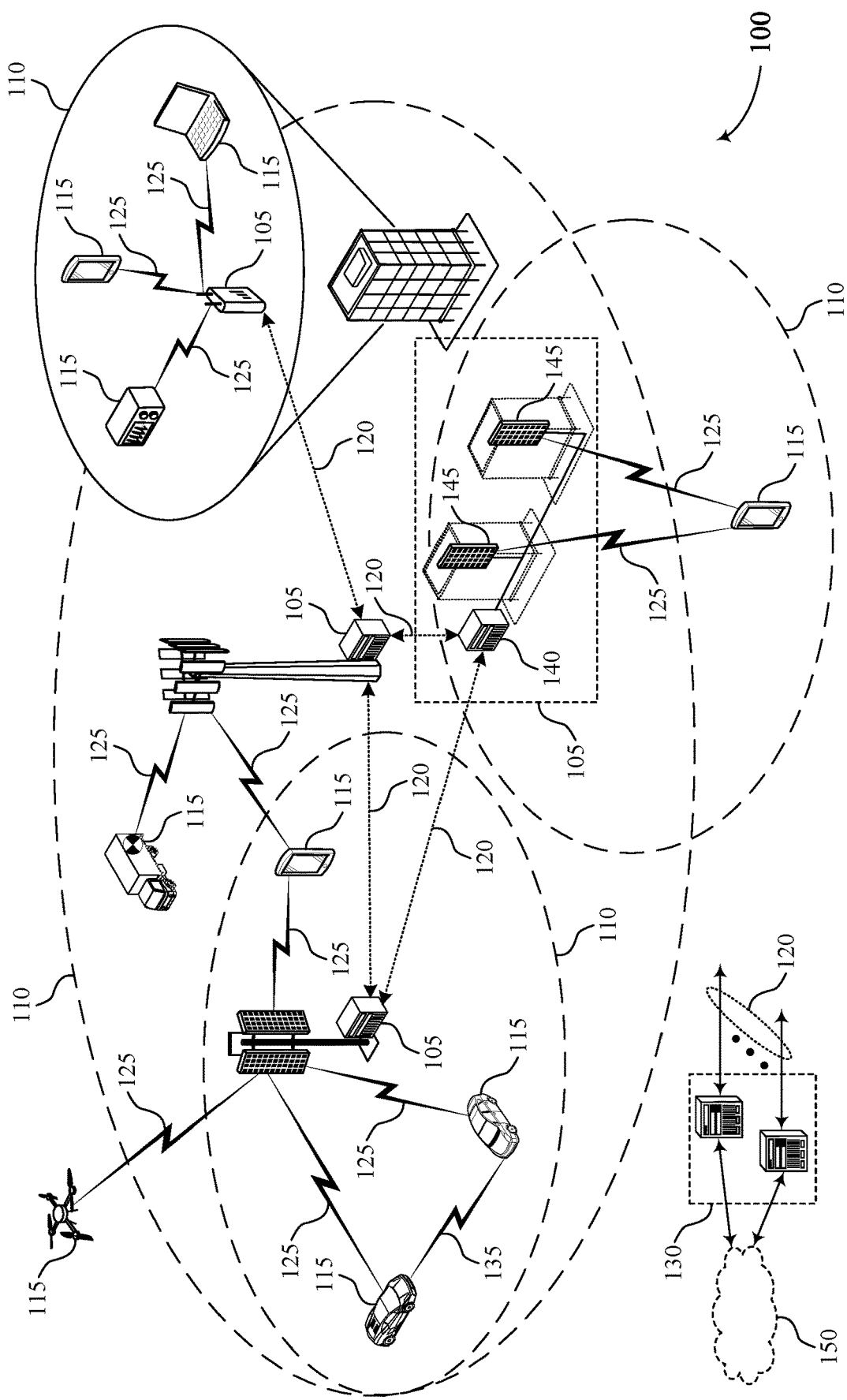
FIG. 1 illustrates an example of a wireless communications system that supports neural network configuration for wireless communication system assistance in accordance with aspects of the present disclosure.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

A wireless communications system may support the use of neural networks. For example, a user equipment (UE) may perform one or more functions by applying one or more neural network blocks to a signal, such as a baseband signal. A neural network may be made up of a plurality of neural network blocks, each of which may include any number and combination of neural networks or layers of a neural network, in which the output of one neural network block may provide the input to a next neural network block and/or an output of the neural network. Using neural network blocks may increase reliability of some communications and improve signal throughput. For example, a UE may determine or estimate channel conditions without an accurate or real-time knowledge of channel conditions by using a neural network block to perform channel estimation. Training or developing a neural network block may be time-intensive, may result in a high overhead signaling cost, and may use a large amount of computational resources.

A base station may assist one or more UEs to configure, train, and utilize one or more neural network blocks to fit the local environment of the UEs. Each neural network block may be configured and trained to perform one or more functions. For example, a UE may perform channel estimation on a signal (e.g., processing one or more baseband signals) using a channel estimation neural network block. Each neural network block may be characterized by a number of neural network block parameters. Neural network block parameters may include a number of layers, a number of nodes in each layer, a mapping between the respective nodes of each layer, an activation function for one or more of the nodes or submodules of the neural network block, a deactivation function for one or more of the nodes or submodules of the neural network block, one or more weight values, bias values, or the like. Base stations and UEs may communicate capability information, feedback information, neural network block parameters for a neural network block, or other signals, or combinations thereof to support neural network blocks used by the UE to perform various functions.

In some examples, a UE and a base station may communicate capability information. For example, the UE may transmit capability information indicating neural network blocks supported by the UE. The base station may configure, based on the UE capability information, the base station capability information, or both, one or more neural network block parameters for the UE. The base station may transmit the one or more neural network block parameters to the UE.

The base station may transmit one or more neural network block parameters to the UE to configure neural network blocks used by the UE. The neural network block parameters may include an addition or a release of one or more nodes of the neural network block, one or more additional input values for the neural network block or one or more additional output values for the neural network block, an activation or deactivation of one or more supplementary submodules of the neural network block, one or more weight values for nodes or primary submodules and supplementary submodules of the neural network block, or the like. The base station may transmit such neural network block parameters for reconfiguration via a downlink control information (DCI) message, or a media access control (MAC) control element (CE), or the like. In some examples, (e.g., the neural network block parameters include weight values and bias values for one or more supplementary submodules of the neural network block), the base station may schedule (e.g., via radio resource control (RRC) signaling, a DCI message, or the like) a downlink transmission over a physical downlink shared channel (PDSCH), and may transmit the neural network block parameters to the UE over the PDSCH as scheduled.

The base station may transmit one or more neural network block parameters to the UE to configure a new neural network block at the UE. Such configuration information could include each of the neural network block parameters described above. In some examples, the configuration information may include a complete model or map of each input value, node, and output value, including weight values, bias values, and mapping between each node, for the new neural network block. In such examples, the base station may schedule (e.g., via RRC signaling, a DCI message, or the like) a PDSCH, and may transmit the neural network block parameters to the UE over the PDSCH as scheduled.

The UE may apply the neural network block parameters to a neural network block. That is, the UE may update the neural network block according to the received neural network block parameters. For instance, the UE may reconfigure the neural network block according to the neural network block parameters, configure a new neural network block according to the neural network block parameters, or select one of a set of pre-trained neural network blocks according to the neural network block parameters.

Having updated the neural network block, the UE may process a signal (e.g., a baseband signal) generated by the UE from one or more over-the-air (OTA) wireless signals using the neural network block. For example, if the neural network block is a channel estimation neural network block, the UE may receive one or more reference signals, and phase shift and modulate the reference signals to generate a digital domain baseband signal. In this example, the UE may extract relevant data from the digital domain baseband signal, and may process the digital domain baseband signal using the neural network block. In such examples, the UE may generate one or more outputs from the neural network block, such as unprocessed data or processed training data, which may represent channel estimation results for signal distortion correction, represent error corrections for detected distortions, or include a combination thereof. As used herein, processed data may be data output by the neural network block. As used herein, unprocessed data may be data that is not processed by the neural network block, and is consistent with data input to the neural network block (effectively bypassing the neural network block). Unprocessed data may be stored in memory or the UE for use in neural network training or refinement, and/or may be transmitted to the base station for use in updating neural networks and other purposes.

Particular aspects of the subject matter described herein may be implemented to realize one or more advantages. The described techniques may support the use of one or more neural network blocks which may result in increased throughput, increased reliability of signaling, increased system efficiency and improved user experience. As such, supported techniques may include improved network operations and, in some examples, may promote device and network efficiencies, among other benefits.

Aspects of the disclosure are initially described in the context of wireless communications systems. Aspects of the disclosure are further illustrated by and described with reference to neural network blocks, architectures, and process flows. Aspects of the disclosure are further illustrated by and described with reference to apparatus diagrams, system diagrams, and process flow diagrams that relate to neural network configuration for wireless communication system assistance.

FIG. 1 illustrates an example of a wireless communications system 100 that supports neural network configuration for wireless communication system assistance in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or another interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology. A "device" may also be referred to as a unit, a station, a terminal, or a client, among other examples. A UE 115 may also include or may be referred to as a personal electronic device, such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier," or "component carrier," may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each carrier may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

In some examples, dual connectivity can be implemented among UEs 115. Similar to carrier aggregation, dual connectivity can utilize radio resources within multiple carriers to improve UE throughput. A carrier may be a component carrier associated with one or more cell groups (e.g., master cell group, secondary cell group). Dual Connectivity may enable UEs 115 to simultaneously transmit and receive data on multiple component carriers from two cell groups via master eNodeB and secondary eNodeB. In some examples, dual connectivity and carrier aggregation may be implemented simultaneously. The configuration between master cell group and secondary cell group is independent, such that each cell group can be configured with a number of unique component carriers each having a number of uniquely defined BWPs.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the particular bandwidth may be referred to as a "system bandwidth" of the carrier or the wireless communications system 100. For example, the particular bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (4) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may configure one or more neural network block parameters, and may transmit the neural network block parameters to a UE 115. The UE 115 may configure or reconfigure a neural network block according to the neural network block parameters, and may process one or more signals (e.g., baseband signals) generated by the UE 115 using the neural network block and the neural network block parameters. The UE 115 may also provide feedback information (e.g., when requested by the base station) indicating how well the neural network block is performing with the configuration. For example, if a channel estimate neural network block fails to accurately or reliably determine channel estimates (e.g., exhibiting phase or center frequency offset errors), the decoding success rate of the phase-compensated and carrier frequency compensated channel output may be lower than a certain threshold and multiple retransmissions may be triggered that are abnormal given some signal-to-noise-ratio (SNIR) conditions, which the UE 115 may characterize in a performance metric that the UE 115 reports in feedback information to the base station 105. Similarly, output errors of other types of neural network blocks may be recognized or determined by the UE 115 based on measurable device performance issues caused by or related to neural network block outputs, and characterized by the UE 115 in performance metrics associated with specific neural network blocks that may be included in feedback information reported to the base station 105. Base station 105 may use the feedback information when providing neural network block parameters to the UE 115 and other served UEs 115, to configure or reconfigure the neural network block for improved performance. Processing signals using a neural network block may result in improved throughput, increased system efficiency, and improved user experience.

Figure 2:
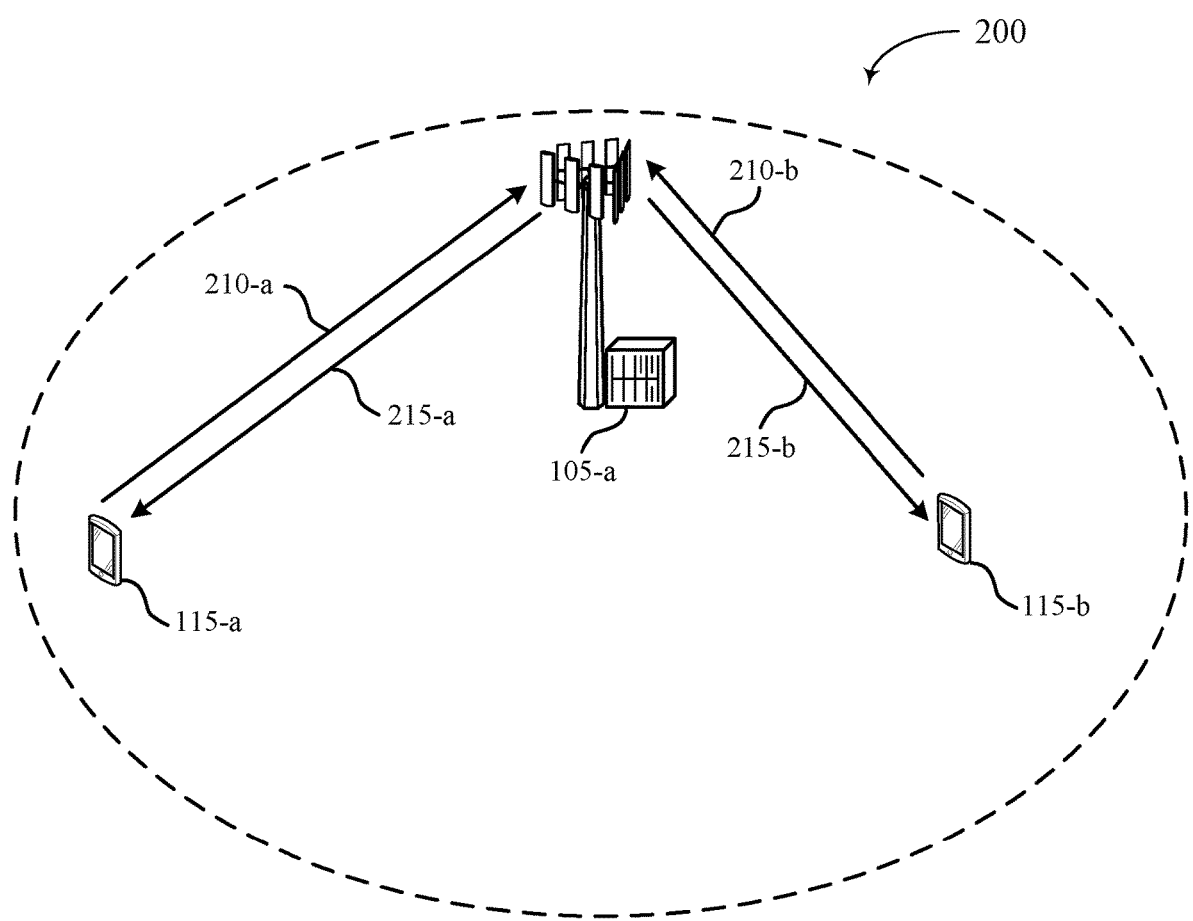
FIG. 2 illustrates an example of a wireless communications system that supports neural network configuration for wireless communication system assistance in accordance with aspects of the present disclosure.

FIG. 2 illustrates an example of a wireless communications system 200 that supports neural network configuration for wireless communication system assistance in accordance with aspects of the present disclosure. In some examples, wireless communications system 200 may implement aspects of wireless communications system 100.

Wireless communications system 200 may support the use of neural networks. For example, a UE 115 (e.g., UE 115-a, UE 115-b, etc.) may perform one or more functions (e.g., process one or more signals) using one or more neural network blocks to process a signal (e.g., a baseband signal). Using neural network blocks may increase reliability of some communications and improve signal throughput. For example, UE 115-a may determine or estimate channel conditions without an accurate or real-time knowledge of channel conditions by using a neural network block to perform channel estimation. Training or developing a neural network block may be time-intensive, may result in a high overhead signaling cost, and may use a large amount of computational resources.

Base station 105-a may assist one or more UEs 115 (e.g., UE 115-a and UE 115-b) to configure, train, and utilize one or more neural network blocks to fit the local environment of the UEs 115. If base station 105-a assists the UEs 115 in training and applying one or more neural network blocks, then the UEs 115 may be able to utilize higher complexity algorithms or online neural network algorithms. The UEs 115 may be able to offload the computation to the base stations. UEs 115 may be able to provide channel estimation information in diverse and versatile environments. Base station assistance may also reduce the complexity of one or more models or neural network blocks at a UE 115. Each neural network block may be configured and trained to perform one or more functions. For example, UE 115-a may perform channel estimation procedures using a channel estimation neural network block. Each neural network block may be characterized by a number of neural network block parameters. Neural network block parameters may include a number of layers, a number of nodes in each layer, a mapping between the respective nodes of each layer, an activation function for one or more of the nodes or submodules of the neural network block, a deactivation function for one or more of the nodes or submodules of the neural network block, one or more weight values, bias values, or the like. Base station 105-a, UE 115-a, and UE 115-b may communicate capability information, feedback information, neural network block parameters for a neural network block, or other signals, or combinations thereof to support neural network blocks used by each UE 115 to perform various functions.

In some examples, each UE 115 and base station 105-a may communicate capability information. For example, base station 105-a may transmit, to UE 115-a via downlink 215-a, capability information regarding one or more neural network blocks capable of being implemented by base station 105-a. UE 115-a may transmit capability information to base station 105-a via uplink 210-a regarding neural network blocks capable of being implemented by UE 115-a. The one or more neural network blocks implemented by the UE may include a single neural network block that is configurable to perform one or more different functions, a default neural network block or traditional function block (e.g., a function block for performing one or more functions by the modem of the UE that is not a neural network block), a list of pre-trained neural network blocks from which base station 105-a can select a neural network block, or the like. Base station 105-a may configure, based on the UE capability information received from UE 115-a, or base station capability information transmitted by base station 105-a, or both, one or more neural network block parameters for UE 115-a. Base station 105-a may transmit the one or more neural network block parameters to UE 115-a via downlink 215-a.

A base station may receive capability information from a UE 115-a, and may transmit, via downlink 215-a, one or more neural network block parameters to be implemented by the UE 115-a. In some examples, base station 105-a may transmit neural network block parameters to reconfigure a neural network block with dynamic configuration options that is capable of being implemented by the UE 115-a. In some examples, base station 105-a may transmit neural network block parameters to configure a new neural network block in place of a default neural network block. In some examples, base station 105-a may transmit neural network block parameters selecting one of a set of neural network blocks capable of being implemented by UE 115-a.

Base station 105-a may transmit neural network block parameters to UE 115-a to reconfigure a neural network block with dynamic configuration options that is capable of being implemented by UE 115-a. For instance, base station 105-a may transmit one or more neural network block parameters to UE 115-a via downlink 215-a. UE 115-a may configure the supported neural network block using the neural network block parameters. The neural network block parameters may describe adding or releasing one or more nodes of the configurable neural network block, adding one or more additional input values for the configurable neural network block or adding one or more additional output values for the configurable neural network block, activating or deactivating one or more supplementary submodule of the neural network block, adding, removing or updating one or more weight values for nodes or primary submodules and supplementary submodules of the configurable neural network block, or the like. Base station 105-a may transmit such neural network block parameters for reconfiguration of the configurable neural network block on downlink 215-a via a DCI message, or a MAC-CE, or the like. In some examples, (e.g., the neural network block parameters include weight values and bias values for one or more supplementary submodules of the neural network block), base station 105-a may schedule (e.g., via RRC signaling, a DCI message, or the like) a downlink transmission over a PDSCH, and may transmit the neural network block parameters to UE 115-a over the PDSCH on downlink 215-a as scheduled.

Base station 105-a may transmit neural network block parameters to configure a new neural network block in place of a default neural network block. For instance, base station 105-a may transmit one or more neural network block parameters to UE 115-a via downlink 215-a to configure a new neural network block at UE 115-a. Such configuration information could include adding one or more nodes to the new neural network block, adding one or more input values for the new neural network block or adding one or more output values for the new neural network block, activating or deactivating a primary or supplementary submodule of the new neural network block, one or more weight values for nodes or primary submodules and supplementary submodules of the new neural network block, or the like. In some examples, the configuration information may include a complete model or map of each input value, node, and output value, including weight values, bias values, and mapping between each node, for the new neural network block. In such examples, base station 105-a may schedule (e.g., via RRC signaling, a DCI message, or the like) one or more resources of a PDSCH, and may transmit the neural network block parameters to UE 115-a over the PDSCH as scheduled.

Base station 105-a may transmit neural network block parameters selecting one of a set of neural network blocks capable of being implemented by UE 115-a. Base station 105-a may transmit one or more neural network block parameters to UE 115-a that may include an indication of one of the pre-trained neural network blocks. Base station 105-a may indicate the one or more parameters (e.g., using a small number of bits) in a DCI message, a MAC-CE message, or via RRC signaling.

UE 115-a may update a neural network block operating using the received neural network block parameters. For instance, UE 115-a may reconfigure the neural network block according to the neural network block parameters, configure a new neural network block according to the neural network block parameters, or select one of a set of pre-trained neural network blocks according to the neural network block parameters.

Having updated the neural network block, UE 115-a may process a signal (e.g., a baseband signal or a digital domain baseband signal) generated by UE 115-a from one or more over-the-air (OTA) wireless signals using the updated neural network block. For example, if the neural network block is a channel estimation neural network block, UE 115-a may receive one or more reference signals, combine and down convert signals, and generate a digital domain baseband signal. In this example, the UE 115-a may extract relevant data from the digital domain baseband signal, and may process the digital domain baseband signal using the neural network block. In such examples, UE 115-a may generate one or more outputs from the neural network block (e.g., unprocessed data, or processed training data) which may represent channel estimation results for signal distortion correction, or may represent error corrections for detected distortions, or a combination thereof.

In some examples, the neural network block may be considered critical (e.g., may have a high priority). In such examples, UE 115-a might immediately (e.g., upon receiving and decoding the neural network block parameters) process the baseband signals using the neural network block operating using the received neural network block parameters. In such examples, UE 115-a may send an acknowledgement (ACK) message to the base station indicating successful reception of the neural network block parameters. If UE 115-a does not receive neural network block parameters for a critical neural network block, then UE 115-a may transmit a negative acknowledgement (NACK) to base station 105-a. If a neural network block is not considered critical, then UE 115-a may use a timer or a counter to determine whether the neural network block parameters or default parameters should be used. The UE 115-a may activate or deactivate the neural network block according to the timer or the counter. For example, UE 115-a may activate the neural network block and initiate the timer, and may revert to a default or previously used neural network block upon expiration of the timer. In such examples, UE 115-a may receive the parameters and initiate the timer, and may activate (e.g., apply) the neural network block for the digital domain baseband signals upon expiration of the timer. In some examples, UE 115-a may activate a counter (e.g., a symbol counter, a slot counter, or the like) upon receiving the neural network block parameters. In such examples, when UE 115-a determines that the counter has expired (e.g., the counter has counted a number of symbols, slots, or the like), UE 115-a may activate (e.g., apply) the neural network block for the digital domain baseband signal.

UEs 115 in wireless communications system 200 may support base station assistance of neural network block training and application by providing feedback data reporting to base station 105-a. For example, UE 115-a may report feedback data to base station 105-a. UE 115-a may report the feedback information immediately, or base station 105-a may schedule UE 115-a to report the feedback data dynamically, such as using a dynamic resource allocation, or periodically, such as using a semi-persistent resource allocation. That is, base station 105-*a* may schedule an uplink transmission on uplink 210-*a*, and UE 115-*a* may transmit feedback data on a physical uplink control channel (PUCCH) or physical uplink shared channel (PUSCH). Base station 105-*a* may schedule the feedback report by transmitting a DCI message, or via RRC signaling. The feedback data may include unprocessed data or processed data. For example, the feedback data may be unprocessed channel quality measurements made by UE 115-*a*. The feedback data may be processed data, and may include channel information gathered by UE 115-*a* (e.g., by receiving one or more reference signals) prior to or after performing a channel estimation or prior to or after frequency-tracking corrections are made. The feedback information may include channel information gathered by UE 115-*a* including a pilot signal only, or including a complete reference signal. The feedback information may include time-domain signal reporting including a cyclic prefix or a time domain signal from which UE 115-*a* has stripped the cyclic prefix. UE 115-*b* may similarly communicate with base station 105-*a*, and may train and use one or more neural network blocks. UE 115-*b* may also report feedback information. Base station 105-*a* may gather the feedback information from multiple UEs 115. During subsequent iterations with each UE 115, base station 105-*a* may adjust, update, or confirm one or more neural network block parameters based on the feedback information to improve the output values of the neural network blocks, resulting in increased throughput for the UE, improved channel measurements without real-time knowledge of channel conditions (e.g., for a rapidly changing environment), increased system efficiency, and improved user experience.

Neural network blocks may perform one or more functions. A neural network block may perform the functions of default wireless communications network hardware, firmware, or software to replace, or free up those resources for additional processing. For example, a neural network block may be a channel estimation block, a channel state information (CSI) compression block, a modulation block, a demodulation block, a coding block, a decoding block, a serial-to-parallel/parallel-to-serial block, an (inverse) Fast Fourier Transform block, digital-to-analog/analog-to-digital block, packet detection block, cyclic redundancy check packet block, carrier frequency offset block, or the like. These various hardware and software blocks may be referred to as default network function blocks. In some examples, a neural network block can perform functions of multiple blocks simultaneously. For example, a neural network block can provide packet detection functionality for multiple UEs, effectively replacing default packet detection hardware and software. As another example, a neural network block can perform multiple functions, such as operating as a channel estimation block and demodulation block in a single instance, effectively replacing the associated hardware and software for channel estimation and demodulation. A neural network block, as described herein, may refer to illustrative examples where the neural network block is, for instance, a channel estimation block. However, a neural network block as described herein may refer to any neural network block and may be similarly used (e.g., for CSI compression, modulation, demodulation, coding, decoding, etc.). A neural network block may include one or more input nodes, one or more hidden nodes included in one or more layers, and one or more output nodes, as described in greater detail with reference to FIG. 3.

Figure 3:
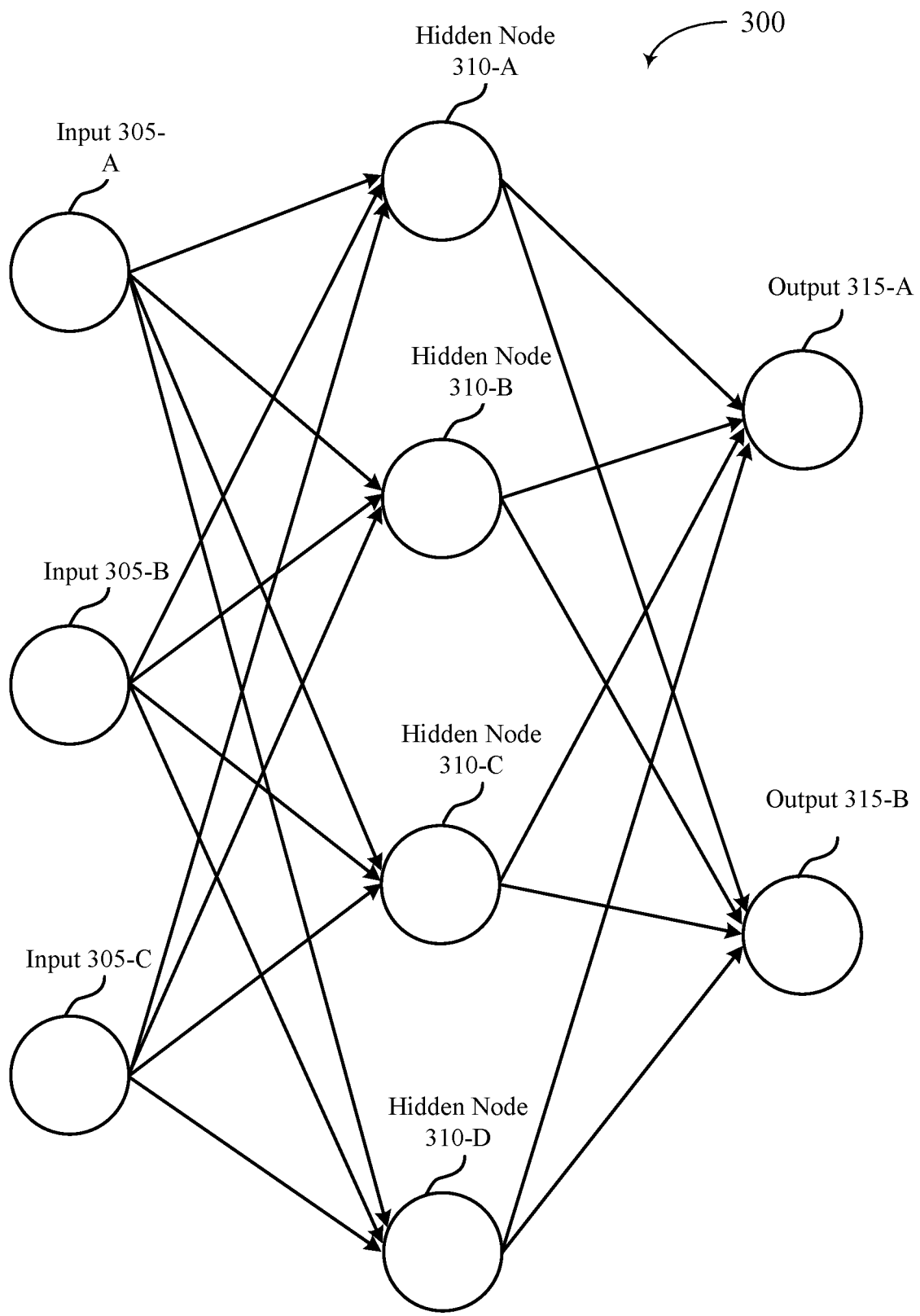
FIG. 3 illustrates an example of a neural network block that supports neural network configuration for wireless communication system assistance in accordance with aspects of the present disclosure.

FIG. 3 illustrates an example of a neural network block 300 that supports neural network configuration for wireless communication system assistance in accordance with aspects of the present disclosure. In some examples, neural network block 300 may implement aspects of wireless communications system 100 and wireless communications system 200.

A UE 115 may support one or more neural network blocks 300. Neural network block 300 may be based on or inspired by biological neural networks. Neural network block 300 may be a compilation of one or more algorithms that perform operations on one or more input values to produce one or more output values.

Neural network block 300 may include a number of layers. Each layer may include a number of nodes (which may be referred to as neurons). For example, an input layer may include one or more input nodes 305 (e.g., input node 305-*a*, input node 305-*b*, and input node 305-*c*). Input nodes 305 may receive one or more input values. The input values may be current or previous measurements, historical data, fixed or configured parameter values (e.g., as indicated by a base station 105), or the like. For example, neural network block 300 may be a channel estimation neural network block. In such examples, input values received by input nodes 305 may include historical channel estimation values, an average of previously measured channel estimation values, current measurements of channel estimation values, signals (e.g., baseband signals), or the like. Neural network block 300 may also include one or more layers of hidden nodes 310. Neural network block 300 illustrates a single layer of hidden nodes 310 (e.g., including hidden node 310-*a*, hidden node 310-*b*, hidden node 310-*c*, and hidden node 310-*d*). However, neural network block 300 may include multiple hidden node layers, each hidden node layer including one or more hidden nodes 310. Hidden nodes 310 may perform one or more operations on input values received from input nodes 305 (e.g., multiplication, weighted multiplication, activation or deactivation operations, summations, weighted summations, etc.). Neural network block 300 may also include one or more output nodes 315 (e.g., output node 315-*a* and output node 315-*b*). Each output node 315 may receive data that has been manipulated or processed by the hidden nodes 310, and may generate an output value.

A node of neural network block 300 may perform one or more mathematical operations. Operations may rely on weight values, bias values, or the like. For example, an activation function may include multiplying a set of one or more input values with a set of one or more weight values, summing the result, and adding a bias value to the sum. Weight values may be used to affect output values (e.g., positive weights may increase the value of an output and negative weights may decrease the value of an output). Weights may be utilized to increase or decrease the effect of a particular input value, set of data, source of data, or the like. A bias may be a constant value (e.g., a constant vector) that is added to the product of inputs multiplied by weights. The bias value may be used to offset a particular result or output, and may be used to reduce variance. That is, a bias may shift the output of an activation function towards negative or positive value.

Each node of neural network block 300 may perform an activation function. For input nodes 305 of the input layer, the input values may be raw data or processed data (e.g., unprocessed numerical values) provided by a base station or configured at the UE 115. Each input node 305 may multiply one or more input values with one or more weights, and add a bias value. The bias value for each input node 305 may be the same or different. Similarly, the weight values for each input node 305 may be the same, or may be different. Each input node 305 may generate an output based on its respective activation function, and may provide that output to each hidden node 310. For instance, input node 305-a may provide its output to hidden node 310-a, hidden node 310-b, hidden node 310-c, and hidden node 310-d. Input node 305-b and input node 305-c may similarly provide their respective outputs to each hidden node 310. Each hidden node may also perform an activation function on its received inputs (e.g., the outputs provided by input nodes 305). For example, hidden node 310-a may be configured with three weight values and a bias value (e.g., via one or more neural network block parameters as described in greater detail with reference to FIG. 5). Hidden node 310-a may multiple the first of the three weight values by the input received from input node 305-a, the second of the three weight values by the input received from input node 305-b, and the third of the three weight values by the input received from input node 305-c. Hidden node 310-a may sum the results of the multiplication, and may then add the bias value to the result, thereby generating an output. Hidden node 310-a may send the generated output to each output node 315. Each hidden node 310 may similarly perform an activation function on each input received from input nodes 305, and may send the resulting output to each output node 315. Each output node 315 may perform a respective activation function on the received inputs (e.g., the output values from hidden nodes 310). The resulting outputs may be generated as output data.

Neural network block 300 may be characterized by one or more neural network block parameters. Neural network block parameters may include one or more of a number of layers, a number of nodes in each layer, a connection mapping between the layers, activation functions for each node, and one or more hyperparameters (e.g., weight values and bias values for each node in neural network block 300). Neural network block parameters may further include an indication of a previously trained neural network block 300, one or more submodules within neural network block 300, or the like.

In some examples, the output data may represent channel estimation information. In some examples, the output data may represent distortion corrections for OTA signaling (e.g., reference signals), as described in greater detail with respect to FIG. 4.

Figure 4:
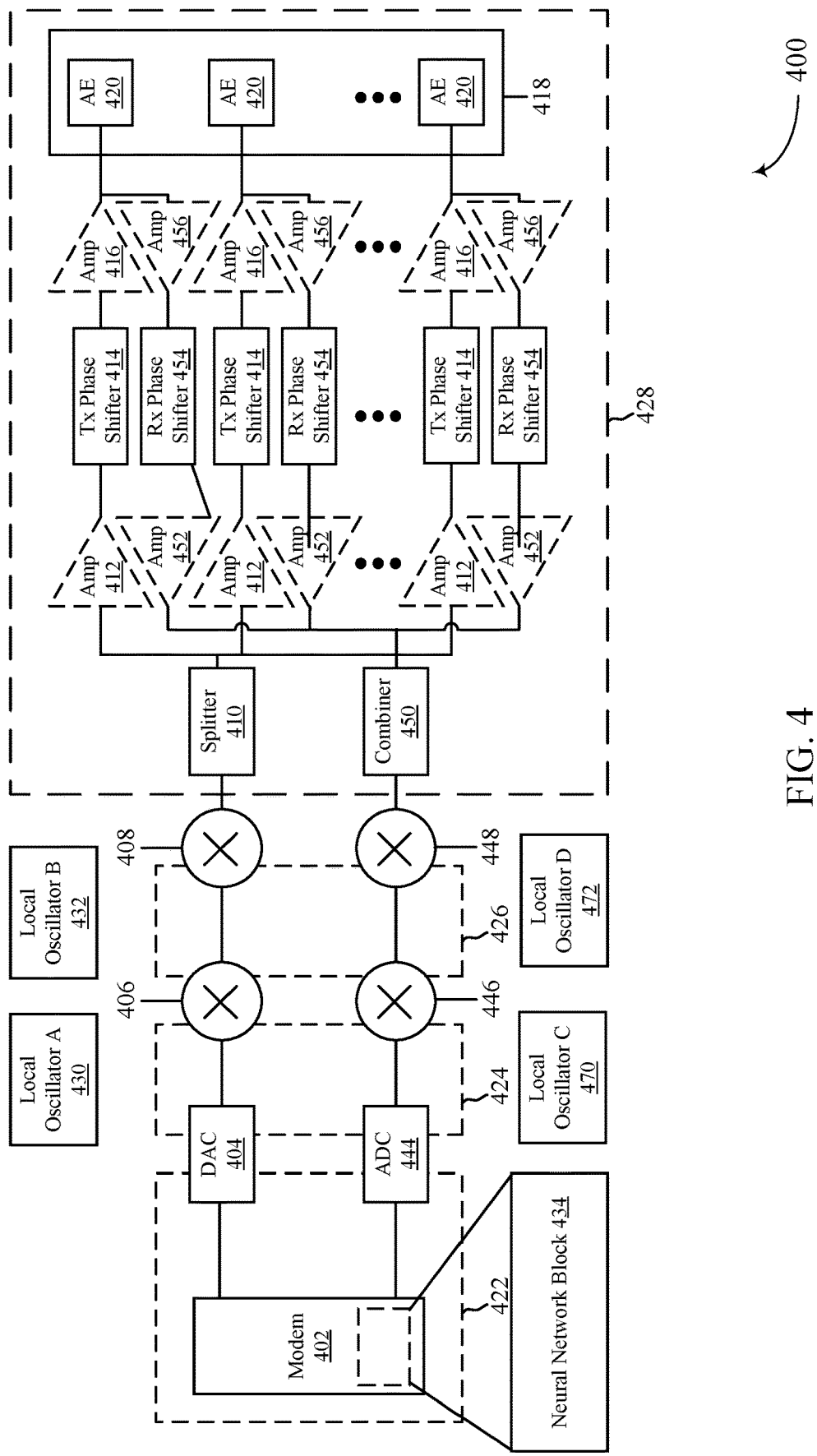
FIG. 4 illustrates an example of an architecture that supports neural network configuration for wireless communication system assistance in accordance with aspects of the present disclosure.

FIG. 4 illustrates an example of an architecture 400 that supports neural network configuration for wireless communication system assistance in accordance with aspects of the present disclosure. In some examples, architecture 400 may implement aspects of wireless communications system 100, wireless communications system 200, and neural network block 300. In some aspects, architecture 400 may be an example of the transmitting device (e.g., a first wireless device, UE 115, or base station 105) and/or a receiving device (e.g., a second wireless device, UE 115, or base station 105) as described herein.

Broadly, FIG. 4 is a diagram illustrating example hardware components of a wireless device in accordance with certain aspects of the disclosure. The illustrated components may include those that may be used for antenna element selection and/or for beamforming for transmission of wireless signals. The illustrated components may be used to receive millimeter waves, as described with reference to FIG. 4. In other examples (e.g., an LTE system) the hardware components may be streamlined to receive radio frequency waves (e.g., may include a single antenna element and may not include phase shifters, intermediate frequencies, etc.) There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes a plurality of first amplifiers 412, a plurality of Tx phase shifters 414, a plurality of second amplifiers 416, and an antenna array 418 that includes a plurality of antenna elements 420. Transmission lines or other waveguides, wires, traces, or the like are shown connecting the various components to illustrate how signals to be transmitted may travel between components. Boxes 422, 424, 426, and 428 indicate regions in the architecture 400 in which different types of signals travel or are processed. Specifically, box 422 indicates a region in which digital domain baseband signals travel or are processed, box 424 indicates a region in which analog domain baseband signals travel or are processed, box 426 indicates a region in which analog domain intermediate frequency (IF) signals travel or are processed, and box 428 indicates a region in which analog domain radio frequency (RF) signals travel or are processed. The architecture also includes a local oscillator A 430, a local oscillator B 432, and a neural network block 434. In some examples, neural network block 434 may be part of (e.g., may be an aspect of) modem 402.

Each of the antenna elements 420 may include one or more sub-elements (not shown) for radiating or receiving RF signals. For example, a single antenna element 420 may include a first sub-element cross-polarized with a second sub-element that can be used to independently transmit cross-polarized signals. The antenna elements 420 may include patch antennas or other types of antennas arranged in a linear, two dimensional, or other pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital domain baseband signals and may also control operation of the DAC 404, first and second mixers 406, 408, splitter 410, first amplifiers 412, Tx phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital domain baseband signals received from the modem 402 (and that are to be transmitted) into analog baseband signals. The first mixer 406 upconverts analog domain baseband signals to analog domain IF signals within an IF using a local oscillator A 430. For example, the first mixer 406 may mix the signals with an oscillating signal generated by the local oscillator A 430 to "move" the analog domain baseband signals to the IF. In some cases, some processing or filtering (not shown) may take place at the IF. The second mixer 408 upconverts the analog domain IF signals to analog domain RF signals using the local oscillator B 432. Similarly to the first mixer, the second mixer 408 may mix the signals with an oscillating signal generated by the local oscillator B 432 to "move" the analog domain IF signals to the RF, or the frequency at which signals will be transmitted. The modem 402 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into a plurality of identical or nearly identical RF signals, as denoted by its presence in box 428. In other examples, the split may take place with any type of signal including, for example, with digital domain baseband signals, analog domain baseband signals, and/or analog domain IF signals. Each of these signals may correspond to an antenna element 420 and the signal travels through and is processed by amplifiers 412, 416, Tx phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some implementations. In one implementation, both the first amplifier 412 and second amplifier 416 are present. In another implementation, neither the first amplifier 412 nor the second amplifier 416 is present. In other implementations, one of the two amplifiers 412, 416 is present but not the other. By way of example, if the splitter 410 is an active splitter, the first amplifier 412 may not be used. By way of further example, if the Tx phase shifter 414 is an active phase shifter that can provide a gain, the second amplifier 416 might not be used. The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element 420. Each of the amplifiers 412, 416 may be controlled independently (e.g., by the modem 402 and/or neural network block 434) to provide independent control of the gain for each antenna element 420. For example, the modem 402 and/or the neural network block 434 may have at least one control line connected to each of the splitter 410, first amplifiers 412, Tx phase shifters 414, and/or second amplifiers 416 which may be used to configure a gain to provide a desired amount of gain for each component and thus each antenna element 420.

The Tx phase shifter 414 may provide a configurable phase shift or phase offset to a corresponding RF signal to be transmitted. The Tx phase shifter 414 could be a passive phase shifter not directly connected to a power supply. Passive phase shifters might introduce some insertion loss. The second amplifier 416 could boost the signal to compensate for the insertion loss. The Tx phase shifter 414 could be an active phase shifter connected to a power supply such that the active phase shifter provides some amount of gain or prevents insertion loss. The settings of each of the Tx phase shifters 414 are independent meaning that each can be set to provide a desired amount of phase shift or the same amount of phase shift or some other configuration. The modem 402 and/or the neural network block 434 may have at least one control line connected to each of the Tx phase shifters 414 and which may be used to configure the Tx phase shifters 414 to provide a desired amounts of phase shift or phase offset between antenna elements 420.

In the illustrated architecture 400, RF signals received by the antenna elements 420 are provided to one or more of third amplifier 456 to boost the signal strength. The third amplifier 456 may be connected to the same antenna arrays 418, e.g., for TDD operations. The third amplifier 456 may be connected to different antenna arrays 418. The boosted RF signal is input into one or more of phase shifter 454 to provide a configurable phase shift or phase offset for the corresponding received RF signal. The Rx phase shifter 454 may be an active phase shifter or a passive phase shifter. The settings of each of the Rx phase shifters 454 are independent, meaning that each can be set to provide a desired amount of phase shift or the same amount of phase shift or some other configuration. The modem 402 and/or the neural network block 434 may have at least one control line connected to each of the Rx phase shifters 454 and which may be used to configure the Rx phase shifters 454 to provide a desired amount of phase shift or phase offset between antenna elements 420.

The outputs of the Rx phase shifters 454 may be input to one or more second amplifiers 452 for signal amplification of the Rx phase shifted received RF signals. The fourth amplifiers 452 may be individually configured to provide a configured amount of gain. The fourth amplifiers 452 may be individually configured to provide an amount of gain to ensure that the signal input to combiner 450 have the same magnitude. The amplifiers 452 and/or 456 are illustrated in dashed lines because they might not be necessary in some implementations. In one implementation, both the fourth amplifier 452 and the third amplifier 456 are present. In another implementation, neither the fourth amplifier 452 nor the third amplifier 456 are present. In other implementations, one of the amplifiers 452, 456 is present but not the other.

In the illustrated architecture 400, signals output by the phase shifters 454 (via the fourth amplifiers 452 when present) are combined in combiner 450. The combiner 450 in architecture combines the RF signal into a signal, as denoted by its presence in box 428. The combiner 450 may be a passive combiner, e.g., not connected to a power source, which may result in some insertion loss. The combiner 450 may be an active combiner, e.g., connected to a power source, which may result in some signal gain. When combiner 450 is an active combiner, it may provide a different (e.g., configurable) amount of gain for each input signal so that the input signals have the same magnitude when they are combined. When combiner 450 is an active combiner, it may not need the fourth amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate signals or baseband signals that carry the encoded and modulated information. The output of the mixers 448 and 446 are input into an analog-to-digital converter (ADC) 444 for conversion to digital signals. The digital signals output from ADC 444 is input to modem 402 for baseband processing, e.g., decoding, de-interleaving, etc.

The architecture 400 is given by way of example only to illustrate an architecture for transmitting and/or receiving signals. It will be understood that the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 422, 424, 426, 428) in different implemented architectures. For example, a split of the signal to be transmitted into a plurality of signals may take place at the analog domain RF, analog domain IF, analog domain baseband, or digital domain baseband frequencies in different examples. Similarly, amplification, and/or phase shifts may also take place at different frequencies. For example, in some contemplated implementations, one or more of the splitter 410, amplifiers 412, 416, or Tx phase shifters 414 may be located between the DAC 404 and the first mixer 406 or between the first mixer 406 and the second mixer 408. In one example, the functions of one or more of the components may be combined into one component. For example, the Tx phase shifters 414 may perform amplification to include or replace the first and/or or second amplifiers 412, 416. By way of another example, a phase shift may be implemented by the second mixer 408 to obviate the need for a separate Tx phase shifter 414. This technique is sometimes called local oscillator (LO) phase shifting. In one implementation of this configuration, there may be a plurality of IF to RF mixers (e.g., for each antenna element chain) within the second mixer 408 and the local oscillator B 432 would supply different local oscillator signals (with different phase offsets) to each IF to RF mixer.

The modem 402 and/or the neural network block 434 may control one or more of the other components 404-472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the Tx phase shifters 414 and amplitudes imparted by the amplifiers 412, 416 of the plurality of signals relative to each other.

In some examples, the UE 115 may receive a reference signal. The reference signal may be passed through a third amplifier 456 to amplify the reference signal, and Rx phase shifter 454 to align the phase of one or more reference signals received across the multiple antenna elements 420, and a fourth amplifier 452. The combiner 450 may combine signals received at various antenna elements 420 to generate the complete and aligned reference signal, and may pass the reference signal to mixers 448 and 446. Mixers 448 and 446 may down convert the received reference signal using inputs from local oscillators 472 and 470, respectively, to create intermediate or baseband signals that carry encoded and modulated data of the reference signal. The UE 115 may input the output of the mixers 448 and 446 into ADC 444 for conversion to digital domain signals. The digital domain signals output from ADC 444 are input to modem 402 for baseband processing, e.g., decoding, de-interleaving, etc. The decoded digital domain signal may then be forwarded to a processor for additional processing.

In some examples (e.g., in a long-term evolution (LTE) system) a UE 115 may receive signals using a single receive chain. That is, UE 115 may receive a signal (e.g., a reference signal) at a single antenna element 420, and pass the signal through a third amplifier 456. No Rx phase shifter 454 and no combiner 450 may be necessary in such examples, (e.g., because the signal was received at a single antenna element 420) Similarly, UE 115 may not pass the received signal through both a mixer 448 and a mixer 446 (e.g., because a signal in an LTE system may not be a mmW signal, and therefore may not need to be mixed to an intermediate signal and then to a baseband signal). Having passed the signal through a single filter, the UE 115 may pass the mixed signal through the ADC 444, generating a digital domain baseband signal for the modem 402. Or, in such examples (e.g., in an LTE system), the UE 115 may transmit signals using a single transmit chain. That is, UE 115 may generate a signal for transmission. Modem 402 may prepare a digital domain signal (e.g., a bitstream) for transmission, and may pass the digital domain signal through the DAC 404. The UE 115 may then pass the analog domain baseband signal through a first mixer 406. A single mixer (e.g., first mixer 406) may be sufficient to transmit the signal (e.g., because the signal is not an mmW signal). The first mixer 406 may upconvert the baseband signal to an appropriate frequency. The UE 115 may not have need of a splitter 410 because it utilizes a single transmit chain. Similarly, UE 115 may have no need of a Tx phase shifter 414 (because no phase alignment across multiple antenna elements 420 may be needed for a single transmission chain). The UE 115 may pass the signal to a first amplifier 412, and may transmit the signal using a single antenna element 420.

In some examples, a UE 115 (e.g., as described with reference to FIGS. 1 to 3) may perform channel estimation. For example, the UE 115 may be configured to know one or more transmission parameters for one or more reference signals transmitted by a base station 105. Transmission parameters for the reference signals may include phase, modulation, waveform, or the like. The UE 115 may receive a reference signal using one or more antenna elements 420. Because modem 402 may be aware of the transmission parameters of the reference signal, modem 402 may be able to determine any differences between the received reference signal and the configured transmission parameters. These differences may be identified as distortions occurring to OTA signals over the channel on which the reference signal was received. The UE 115 (e.g., via modem 402) may generate one or more corrections that can be used to address the identified distortion, resulting in improved reception of subsequent signals and successful processing of the received reference signal.

In a non-limiting example in which processed signals are baseband signals, the neural network block 434 may perform (e.g., at modem 402) one or more operations on baseband signals. In this example, the modem 402 may extract relevant data from the reference signal (e.g., a subset of the total number of bits included in the digital domain baseband signal) and forward the relevant data on to a processor for further processing. However, neural network block 434 may perform its operation on baseband signals (e.g., prior to data extraction by modem 402 or further processing by a processor). In some examples, neural network block 434 may perform channel estimation. That is, neural network block 434 may receive the reference signal in modem 402, and may process the reference signal using the neural network block 434. Neural network block 434 may generate one or more outputs, which may indicate error correction to address distortions (e.g., sampling time, finding carrier frequency offset (CFO), phase correction, or the like) to OTA signals on the channel In some examples, processing baseband signals using neural network blocks (e.g., instead of traditional algorithms), may result in improved channel estimation. For example, gathered data may be provided to the base station 105, which may be used to update one or more neural network block parameters over time. Thus, the neural network block may be trained over time to learn behaviors (e.g., learn patterns and channel conditions in particular environments, scenarios, etc.). By processing baseband signals using neural network blocks, the neural network blocks may be able to accurately predict or determine channel conditions.

In some examples, (e.g., a highly mobile UE 115, a UE 115 that is located within a moving vehicle, etc.) channel conditions may rapidly change. Performing channel estimation as described herein using neural network block 434 may result in improved channel estimation (e.g., even when channel conditions are not available or known in real-time), and improved throughput and user experience. To perform such channel estimation by neural network block 434, the UE 115 and base station 105 may communicate capability information, neural network block parameters, feedback information, and the like, as described in greater detail with reference to FIG. 5.

Figure 5:
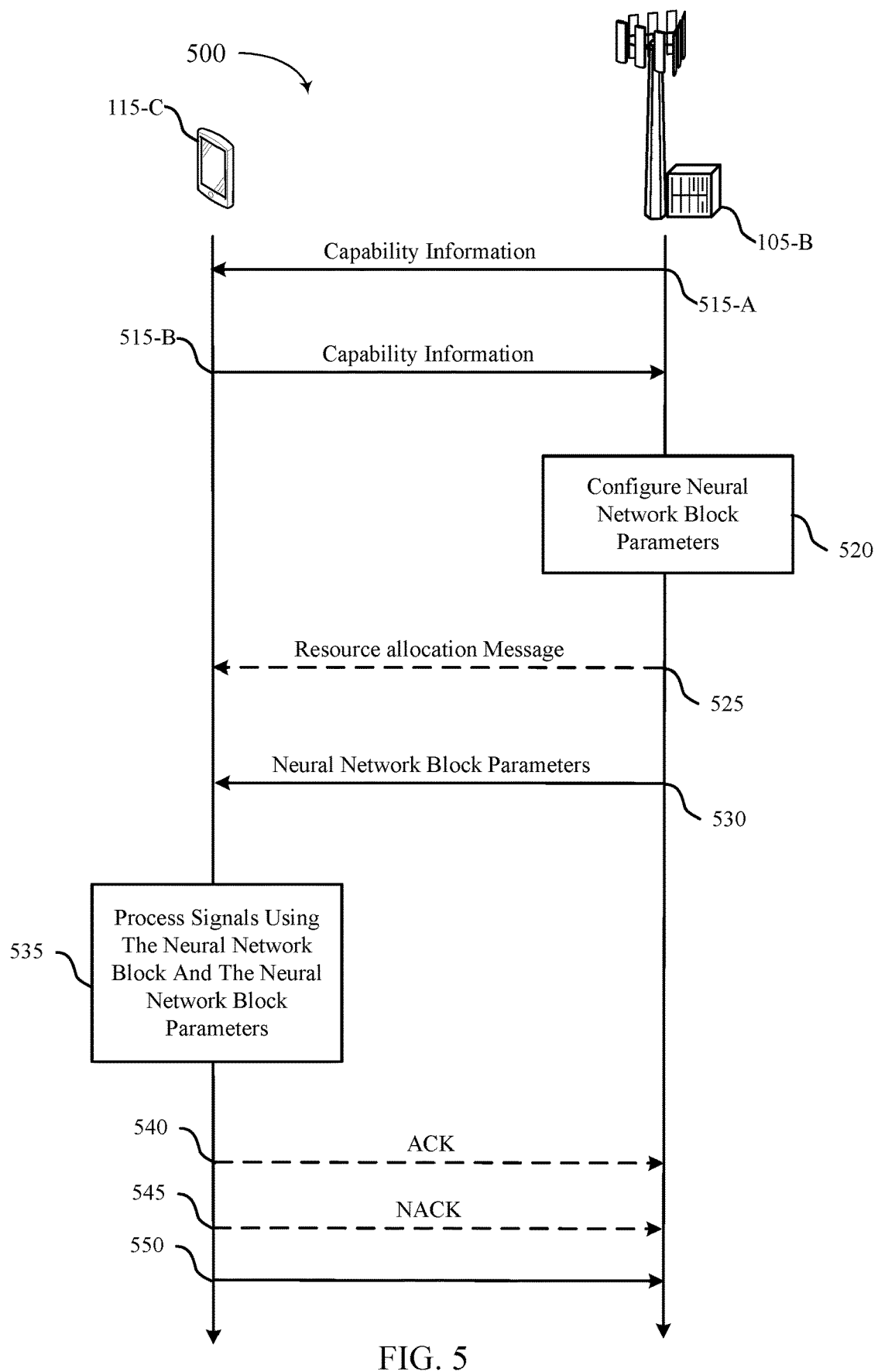
FIG. 5 illustrates an example of a process flow that supports neural network configuration for wireless communication system assistance in accordance with aspects of the present disclosure.

FIG. 5 illustrates an example of a process flow 500 that supports neural network configuration for wireless communication system assistance in accordance with aspects of the present disclosure. In some examples, process flow 500 may implement aspects of wireless communications system 100, wireless communications system 200, neural network block 300, and architecture 400.

At 515-a and 515-b, base station 105-b and UE 115-c may negotiate the availability of various neural network blocks for the UE 115-c, the base station 105-b, or both. For example, at 515-a, base station 105-b may transmit capability information to UE 115-c. The capability information may indicate one or more neural network blocks capable of being implemented by base station 105-b. At 515-b, UE 115-c may transmit capability information to base station 105-b. The capability information may include one or more neural network blocks capable of being implemented by UE 115-c. Thus, base station 105-b may determine one or more neural network blocks that are capable of being implemented by both base station 105-b and UE 115-c. In some examples, capability information from base station 105-b may be included in a master information block (MIB), a system information block (SIB), a DCI message, a MAC-CE message, an RRC message, or the like. In some examples, base station 105-b may indicate (e.g., via the capability information at 515-a), that it provides related services such as particular neural network blocks (e.g., using one bit of a MIB, SIB, MAC-CE, DCI, etc. for a particular neural network block), and UE 115-c may indicate (e.g., at 515-b) whether it supports the same service (e.g., the same neural network block).

In block 520, base station 105-b may configure one or more neural network block parameters for a neural network block of the one or more neural network blocks capable of being implemented by UE 115-c based on the capability information exchanged at 515.

At 530, base station 105-a may transmit the neural network block parameters to UE 115-c. The neural network block parameters may include one or more adjustment parameters for a neural network block capable of being implemented by UE 115-c, or configuration information for a new neural network block, or an indication of one of a set of neural network blocks, as described in greater detail below.

In block 535, UE 115-c may process one or more signals (e.g., baseband signals) using a neural network block and the neural network block parameters received at 530. For example, UE 115-c may receive one or more reference signals, as described in greater detail with reference to FIG. 4. UE 115-c may generate a baseband signal, and may process, at the modem of UE 115-c, the baseband signal. In some examples, UE 115-c may process real-time received baseband signals using the neural network block. For example, UE 115-c may determine channel distortions for one or more channels, and may address or correct the channel distortions by inputting measurement data, historical data, or input values indicated by the one or more neural network block parameters. The neural network block may generate a set of output values that represent corrections to channel distortion for a channel In some examples, UE 115-c may not have access to real-time channel quality measurements, or may be located or moving through a highly variant environment. In such examples, UE 115-c may process one or more baseband signals using the neural network block. UE 115-c may generate, by processing the baseband signals using the neural network block, one or more output values. The one or more output values may represent learned channel conditions under current conditions, or channel conditions based on learned behaviors from other UEs 115 in the same or similar locations, scenarios, or the like. In such examples, the neural network block may generate one or more output values that represent channel distortion values, corrections to channel distortions for the channel, or a combination thereof.

At 540, if UE 115-c has successfully received the neural network block parameters at 530, UE 115-c may transmit an ACK message to base station 105-b. However, (e.g., if the neural network block used to process the baseband signals are considered critical), if UE 115-c does not successfully receive the neural network block parameters at 530, then UE 115-c may transmit a NACK message at 545.

The process described with reference to FIG. 5 may vary depending on supported neural network blocks, neural network block types, and neural network block parameters, as described below.

In some examples, UE 115-c may support a neural network block with one or more dynamic configuration options. UE 115-c may report the configurable neural network block in its capability information at 515-b.

In block 520, base station 105-b may configure one or more neural network block parameters for the configurable neural network block reported at 515-b. The neural network block parameters may include one or more adjustment parameters, which may apply to one or more nodes of the neural network block to reconfigure the neural network block. As described in greater detail with reference to FIG. 3, a node in a neural network block may be referred to as a neuron, a node, a block, or the like). The adjustment parameters may include an activation indication for one or more nodes of the neural network block, a deactivation indication of one or more nodes of the neural network block, an activation indication of one or more layers of the neural network block, a deactivation indication of one or more layers of the neural network block, a weight value for one or more nodes of the neural network block, or a bias value for one or more nodes of the neural network block, or a combination thereof. In some examples, the neural network block parameters may include weight values, bias values, or the like, for supplementary submodules of the neural network block. For example, the adjustment parameters may indicate first adjustment parameters (e.g., weight values, bias values, a connection map, or the like) for a primary submodule and second adjustment parameters (e.g., weight values, bias values, a connection map, or the like) for a secondary submodule.

In some examples, the one or more adjustment parameters of the neural network block parameters configured by the base station 105-b may be used to adjust neural network blocks corresponding to various network components. For example, master cell group, secondary cell group, component carriers, BWPs, uplink layers, supplementary uplink layers, and the like, may each be associated with or operated by one or more neural network blocks having the same or different neural network configurations characterized by neural network block parameters. In such examples, the neural network block parameters may include configuration information for a new neural network block to replace (permanently or temporarily) the default neural network block providing functionality for any network component. In such examples, the neural network block parameters may include an indication of one or more added algorithms for the neural network block, one or more released algorithms from the default network function block, or a combination thereof. The neural network block parameters (e.g., the configuration information) may further include an activation indication for one or more nodes of the neural network block, a deactivation indication for one or more nodes of the neural network block, an activation indication for one or more layers of the neural network block, a deactivation indication for the one or more layers of the neural network block, a weight value for one or more nodes of the neural network block, or a bias value for one or more nodes of the neural network block, or a combination thereof. In some examples, the neural network block parameters may include weight values, bias values, or the like, for supplementary submodules of the neural network block.

A base station 105-b may replace, or override, an existing neural network block with a new neural network block, add additional configurable parameters to an existing neural network block, or take the place of a default network function block. Replacing a default network function block or a previously implemented neural network block with a new neural network block may increase operating rates and efficiency. By providing UE 115-c with a supported neural network block, resources may be reserved by performing default network block functionality without requiring additional training of the neural network block.

Overriding existing functional blocks may be implemented in a hierarchical manner. For example, a master cell group may be associated with four component carriers operating at various frequencies according to the default network function block. For example, one of the component carriers may be operating across a frequency range FR1 of 410 MHz to 7125 MHz, and the remaining three component carriers may be operating across a frequency range FR2 of 24.25 GHz to 52.6 GHz. Thus, when determining a neural network to replace, or override, the default network function block, a base station 105-b may search for, within a repository of neural networks, a suitable neural network that is customized to three of the component carriers operating at frequency range FR2.

A base station 105-b may transmit the suitable neural network block to UE 115-c to cause the default network function block or the existing neural network block associated with the master cell group to be overridden. As a result, the master cell group functionality may be replaced, which may then replace the functionality of each carrier component associated with that master cell group. Similarly, implementing a new neural network block to perform functions of a majority of component carriers may also adjust the functionality of each BWP associated with each component carrier in a hierarchical manner.

Configurable parameters, or adjustment parameters, may be added to existing neural network blocks, or added to one or more new neural network blocks when replacing a default network block or an existing neural network block. Additional configurable parameters may be provided in block 520. In addition to the new neural network block, a base station 105-b may also transmit additional neural network block parameters at 530 to further train or refine a neural network in block 535 for a specific application in the UE 115-c. Taking the example above with the master cell group and the four associated component carriers, the newly implemented neural network block may not be suitable for the desired functionality of the carrier component operating at FR1. Thus, the base station 105-b may provide additional neural network block parameters to be associated with FR1 carrier components directly to further refine or train the neural network block so that the carrier component operating at FR1 can function according to the requested needs of the UE 115-c.

Additional adjusted parameters may be defined and transmitted by a base station 105-b to refine or train any portion of the implemented neural network. In the example of the master cell group and four associated component carriers, although the implemented neural network block may be suitable for three of the four component carriers, each of the component carriers may have different compression rates. Assuming that the neural network block to be implemented does not define or loosely defines the compression rates, a base station 105-b may transmit, at 530, neural network block parameters in addition to those defining the neural network block to be implemented. These additional neural network block parameters not originally associated with the neural network block may adjust the neural network block in block 535 to account for the various compression rates of the component carriers. Thus, the suitable neural network block selected by base station 105-b, based in part on the supported neural network blocks of UE 115-c, may be further refined for each specific application.

In some examples, network components (e.g., master cell group, component carrier, BWP, supplementary uplink) may be configured directly on an individual basis. For example, a UE 115-*c* may be associated with three BWPs, each needing to operate at specific parameters for a given application. A base station 105-*b* may receive capability information from the UE 115-*c* at 515-*b*, and may determine that a hierarchical approach (i.e. overriding the previously existing neural network defining the functionality of the master cell group and component carrier associated with the BWPs to adjust the functionality of the BWPs) is inefficient. Thus, the base station 105-*b* may configure one or more neural network blocks having neural network block parameters to individually override portions of the existing neural network, such that the functionality of the BWPs is overridden or adjusted, while preserving the functionality of the master cell group and the component carrier.

In some examples, two distinct neural network blocks, each having neural network block parameters, may be transmitted to the UE 115-*c* at 530. The two sets of neural network block parameters may be transmitted at 530 simultaneously, or consecutively.

Base station 105-*b* may send the adjustment parameters at 530. In such examples, base station 105-*b* may transmit a DCI, or a MAC-CE including the adjustment parameters at 530. In some examples, base station 105-*b* may reserve PDSCH resources for transmitting the adjustment parameters. For example, if the adjustment parameters include neural network block parameters for multiple submodules of the neural network block, then the amount of information needed to convey the adjustment parameters may exceed those available in a DCI or MAC-CE. Instead, base station 105-*b* may transmit a resource allocation message at 525 (e.g., an RRC message, or a DCI message), reserving PDSCH resources for transmitting the adjustment parameters. At 530, base station 105-*b* may transmit the adjustment parameters on the reserved PDSCH resources.

In block 535, UE 115-*c* may process one or more signals, e.g., baseband signals, using the neural network block and the adjustment parameters. That is, UE 115-*c* may apply the one or more adjustment parameters to the neural network block, and process the signals using the reconfigured neural network block. In some examples (e.g., where the adjustment parameters include first parameters and second parameters for multiple submodules), UE 115-*c* may perform a first operation on the signals using a first node or set of nodes having a first weight value indicated by the adjustment parameters, and may perform a second operation on the signals using a second node or set of nodes having a second weight value indicated by the adjustment parameters. For instance, UE 115-*c* may adjust the weight values, bias values, or a connection map for a primary submodule according to the adjustment parameters, and may adjust the weight values, bias values, or a connection map for a secondary submodule. UE 115-*c* may perform weighted multiplication in each of the primary submodule and the secondary submodule, and may perform a weighed sum of the result according to the adjustment parameters.

If the neural network block is critical, (e.g., time-sensitive), then UE 115-*c* may activate in block 535 (e.g., use for processing current baseband signals) the reconfigured (e.g., adjusted) neural network block immediately upon receiving the one or more network block parameters at 530. If UE 115-*c* successfully receives the neural network block parameters at 530, then UE 115-*c* may send an ACK message at 540 (e.g., an ACK corresponding to the DCI message, MAC-CE, or PDSCH message). However, if UE 115-*c* fails to receive the neural network block parameters at 530, then UE 115-*c* may transmit a NACK message at 545 (e.g., a NACK corresponding to the DCI message, MAC-CE message, or PDSCH message). In some examples, the priority (e.g., critical status) of a neural network block may be preconfigured, signaled via higher layer signaling, communicated in the capability information at 515, or otherwise indicated by base station 105-*b*.

If the neural network block is not critical (e.g., has a normal or non-critical priority), then the timing for using (e.g., applying) the neural network block may be indicated by base station 105-*b* (e.g., via RRC signaling). For example, an RRC message (e.g., at 530, 525, or otherwise (not shown)) may indicate a timer, or a transmission time interval (TTI) counter (e.g., a symbol counter, slot counter, or the like). The timer may be an inactive timer or an active timer. In some examples, UE 115-*c* in block 535 may initiate the timer upon receiving the neural network block parameters. Upon expiration of the timer, UE 115-*c* may activate in block 535 (e.g., begin using) the reconfigured neural network block. In some examples, UE 115-*c* may initiate the timer upon receiving the neural network block parameters or upon using the reconfigured neural network block, and upon expiration of the timer, may default to a previously used or default neural network block. Similarly, UE 115-*c* may receive a TTI counter (e.g., via RRC signaling). The TTI counter may indicate a number of TTIs (e.g., slots, symbols, mini-slots, or the like) after which to activate the reconfigured neural network block, deactivate the reconfigured neural network block, revert to a previously used or default neural network block or function block, or the like. In such examples, UE 115-*c* may count the indicated number of TTIs and perform the indicated function. In some examples, UE 115-*c* may transmit an ACK message at 540 (e.g., a PUCCH message, or higher layer (e.g., RRC) signal).

In some examples, UE 115-*c* may support a default function block or neural network block. UE 115-*c* may report the default neural network block in its capability information at 515-*b*. In some examples, UE 115-*c* may identify the default block based on RRC signaling or DCI. For example, upon establishing a connection (e.g., via a random access procedure), UE 115-*c* and base station 105-*b* may negotiate at least one default neural network block or network function block. In some examples, during reconfiguration (e.g., via another RRC message or a DCI message), base station 105-*b* may assign a new default neural network block or network function block.

Base station 105-*b* may configure one or more neural network block parameters based on the capability information received at 515-*b*. In such examples, the neural network block parameters may include configuration information for a new neural network block to replace (permanently or temporarily) the default neural network block. In such examples, the neural network block parameters may include an indication of one or more added algorithms for the neural network block, one or more released algorithms from the default network function block, or a combination thereof. The neural network block parameters (e.g., the configuration information) may further include an activation indication for one or more nodes of the neural network block, a deactivation indication for the one or more nodes of the neural network block, an activation indication for one or more layers of the neural network block, a deactivation indication for one or more layers of the neural network block, a weight value for one or more nodes of the neural network block, or a bias value for one or more nodes of the neural network block, or a combination thereof. In some examples, the neural network block parameters may include weight values, bias values, or the like, for supplementary submodules of the neural network block.

In such examples, base station 105-b may transmit a resource allocation message at 525 to reserve PDSCH resources for transmitting the one or more neural network block parameters. The resource allocation message may be a dynamic resource allocation message (e.g., a DCI message) or a semi-persistent resource allocation message (e.g., an RRC message). The resource allocation message may reserve sufficient resources (e.g., a set of resources across a set of two or more slots) for transmitting the neural network block parameters for configuring a new neural network block at UE 115-c. At 530, base station 105-b may transmit the neural network block parameters on the PDSCH as scheduled at 525.

In block 535, UE 115-c may process one or more signals, e.g., baseband signals, using the newly configured neural network block. In some examples, UE 115-c may also receive control information (e.g., on a physical downlink control channel (PDCCH)) from base station 105-b indicating a new network function block or neural network block to be the default network function block. UE 115-c may include the default neural network function block in the capability information at 515-b based on the control information. In some examples, UE 115-c may transmit a request message to use a second neural network block that is different than the currently used neural network block. UE 115-c may continue to use the current neural network block until it receives an ACK message from base station 105-b. Upon receiving the ACK message, UE 115-c may switch from the current neural network block to the newly requested neural network block, and may continue to process one or more signals using the newly requested neural network block in block 535.

If the neural network block is critical, (e.g., time-sensitive), then UE 115-c may activate in block 535 (e.g., use for processing current baseband signals) the reconfigured (e.g., adjusted) neural network block immediately upon receiving the one or more neural network block parameters at 530. If UE 115-c successfully receives the neural network block parameters at 530, then UE 115-c may send an ACK message at 540 (e.g., an ACK corresponding to the DCI message, MAC-CE, or PDSCH message). However, if UE 115-c fails to receive the neural network block parameters at 530, then UE 115-c may transmit a NACK message at 545 (e.g., a NACK corresponding to the DCI message, MAC-CE message, or PDSCH message). If base station 105-b receives the NACK message at 545, then base station 105-b may schedule more PDSCH resources for retransmitting the neural network block parameters, as described above with reference to 525 and 530. In some examples, the priority (e.g., critical status) of a neural network block may be preconfigured, signaled via higher layer signaling, communicated in the capability information at 515, or otherwise indicated by base station 105-b.

If the neural network block is not critical (e.g., has a normal or non-critical priority), then the timing for using (e.g., applying) the neural network block may be indicated by base station 105-b (e.g., via RRC signaling). In some examples, an RRC message (e.g., at 530, 525, or another RRC message (not shown)), may include an information element (IE) for releasing (e.g., IE: "Torelease:") a list of one or more function blocks (e.g., one or more algorithms), an IE for adding (e.g., IE: "Toadd:") a list of one or more function blocks (e.g., one or more algorithms).

In some examples, an RRC message (e.g., at 530, 525, or otherwise (not shown)) may indicate a timer, or a transmission time interval (TTI) counter (e.g., a symbol counter, slot counter, or the like). The timer may be an inactive timer or an active timer. In some examples, UE 115-c may initiate the timer upon receiving the neural network block parameters. Upon expiration of the timer, UE 115-c may activate in block 535 (e.g., begin using) the reconfigured neural network block. In some examples, UE 115-c may initiate the timer upon receiving the neural network block parameters or upon using the reconfigured neural network block, and upon expiration of the timer, may default to a previously used or default neural network block. Similarly, UE 115-c may receive a TTI counter (e.g., via RRC signaling). The TTI counter may indicate a number of TTIs (e.g., slots, symbols, mini-slots, or the like) after which to activate the reconfigured neural network block, deactivate the reconfigured neural network block, revert to a previously used or default neural network block or function block, or the like. In such examples, UE 115-c may count the indicated number of TTIs and perform the indicated function. In some examples, UE 115-c may transmit an ACK message at 540 (e.g., a PUCCH message, or higher layer (e.g., RRC) signaling).

In some examples, UE 115-c may support a set of one or more pre-trained neural network blocks. UE 115-c may indicate the set of neural network blocks in its capability information to base station 105-b at 515-b.

In block 520, base station 105-b may configure neural network block parameters for UE 115-c. The neural network block parameters may include one or more bits (e.g., in a DCI message, a MAC-CE message, or an RRC message) indicating one of the set of neural network blocks.

At 530, UE 115-c may receive the neural network block parameters, and in block 535 UE 115-c may process one or more signals, e.g., baseband signals, using the indicated neural network block of the set of neural network blocks.

In some examples, UE 115-c may provide feedback data indicating performance of the neural network block. For example, base station 105-b may transmit a request to UE 115-c requesting the feedback information, and UE 115-c may transmit a feedback report based on processing baseband signals using the neural network block. The feedback data may be processed data, unprocessed data, complete measurements, estimations, or predictions of channel quality, partial measurements, estimations, or predictions of channel quality, or a combination thereof, as described in greater detail with reference to FIG. 2. In some examples, base station 105-b may request and receive such feedback information from UE 115-c, and various other UEs 115 (not shown). Base station 105-b may utilize this additional information in configuring neural network block parameters (e.g., in block 520 of a subsequent iteration with UE 115-c). That is, the processing of baseband signals using the neural network block in block 535 can be improved with updated, reconfigured, or new neural network blocks (e.g., based on feedback information from UE 115-c or other UEs 115), then base station 105-b may adjust the neural network block parameters accordingly to improve the accuracy and efficiency of the neural network block, thus improving system efficiency, throughput, and user experience.

In some examples, a base station 105-b may configure control signaling with one or more neural network block parameters after receiving UE capability information at 515-b. Based on capability information received from a UE 115-c, the base station 105-b may configure control signaling to include one or more neural network block parameters for configuring a first neural network block. Control signaling may be used by the base station 105-*b* to configure various network aspects (e.g., data path configurations) associated with communications with UE 115-*c*. The control signaling may be a resource allocation message as described herein. The control signaling may include control information that may be transmitted to the UE 115-*c* as part of the control signaling (e.g., on a PDCCH), as opposed to being transmitted across a data path. The control information may include an indication of a new network function block or neural network block to be the default network function block, in addition to the neural network block parameters. The control signaling operating as a resource allocation message may include a downlink control information message, a media access control element, or radio resource control message, as described in various examples.

In some examples, the ACK message transmit by UE 115-*c* at 540 may include verification that the UE 115-*c* received the control signaling. The ACK message may include an indication that the control signaling and corresponding control information including neural network block parameters was successful in configuring the neural network block. In some examples, the NACK message transmit by the UE 115-*c* at 545 may include verification that the UE 115-*c* did not successfully receive a portion or all of the control signaling. The NACK message may include an indication that the control signaling and corresponding control information including neural network block parameters was not successful in configuring the neural network block.

At 550, the UE 115-*c* may register the newly configured neural network block, and transmit the configuration to the base station 105-*b*. Assuming the newly configured neural network block includes additional training from adjusted neural network block parameters, the UE 115-*c* may transmit the configuration of the newly configured neural network block to the base station 105-*b*. The base station 105-*b* may receive the configuration of the newly configured neural network block, and store the corresponding parameters in a repository. Thus, the base station 105-*b* may use the received configuration or the corresponding neural network block parameters as a template for further iterations of the processes described in FIG. 5. The template may be used in processes in which a UE, similar to the UE 115-*c*, requests a specific neural network block that is the same as or similar to the received neural network block characterized by the template of neural network block parameters. This may reduce the number of resources used to train previously available, less refined, neural network blocks by reducing the amount of data transferred at 530. In some examples, the base station 105-*b* may receive a configuration of the configured first neural network block from the UE 115-*c* over a physical uplink control channel or a physical uplink shared channel.

Figure 6:
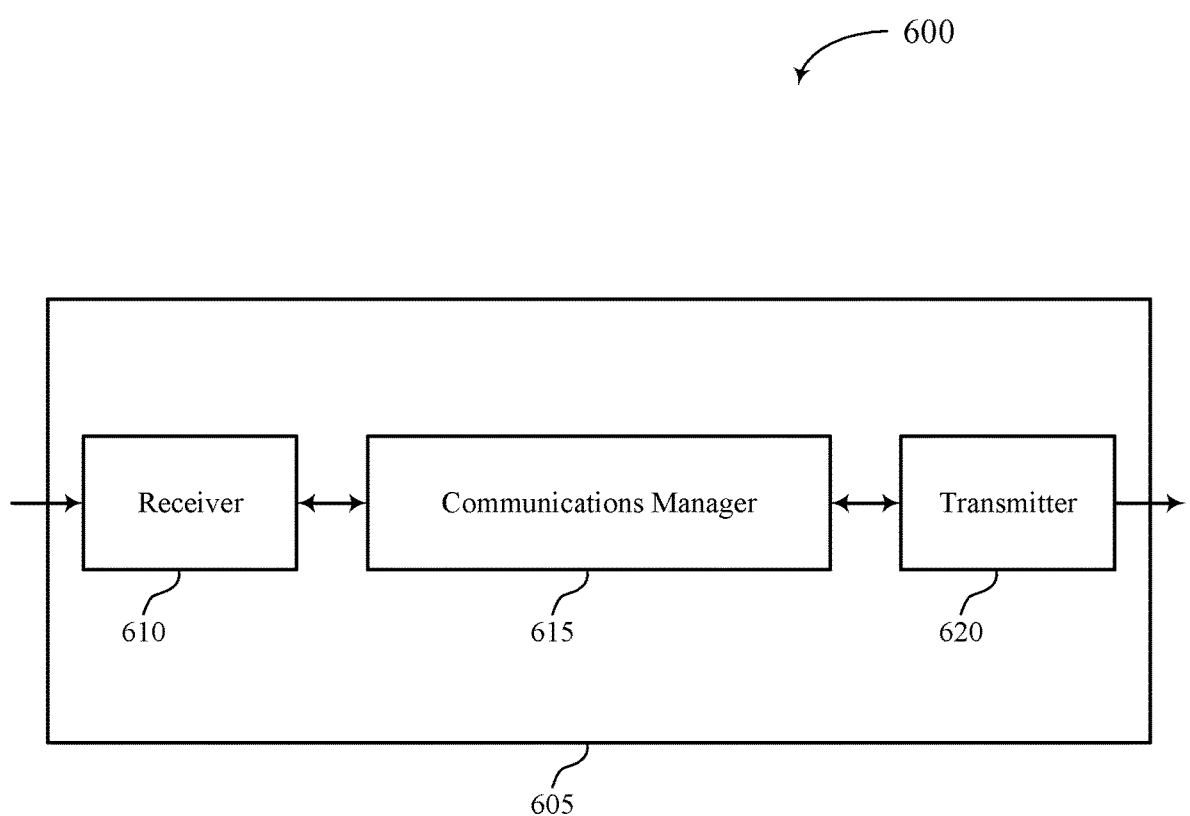
FIGS. 6 and 7 show block diagrams of devices that support neural network configuration for wireless communication system assistance in accordance with aspects of the present disclosure.

FIG. 6 shows a block diagram 600 of a device 605 that supports neural network configuration for wireless communication system assistance in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses). The communications manager 615 may manage the communications via the receiver 610 and the transmitter 620. Thus, the communications manager 615 may receive, via the receiver 610, one or more signals, and may transmit, via the transmitter 620, one or more signals.

The receiver 610 may receive, under the direction or control of the communications manager 615, information such as packets, user data, or control information associated with various information channels (e.g., control channels, data channels, and information related to neural network configuration for wireless communication system assistance, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit, to a base station, capability information regarding one or more neural network blocks supported by the UE, receive, from the base station, one or more neural network block parameters based on the transmitting of the capability information, process one or more baseband signals generated by the UE using a neural network block of the one or more neural network blocks and the one or more neural network block parameters, and transmit, to the base station, an acknowledgement message indicating that the one or more neural network block parameters have been successfully received. The communications manager 615 may be an example of aspects of the communications manager 910 described herein. In some cases, the one or more baseband signals received by the UE may refer (or correspond) to one or more baseband signals generated by the UE using one or more radio frequency signals received by the UE.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components or mixed components (e.g., amplifiers, filters, antennas) coupled with the mobile device modem to enable wireless transmission and reception over one or more bands.

The communications manager 615 as described herein may be implemented to realize one or more potential advantages. One implementation may allow the use of a neural network block without excessive power or overhead signaling expenditures, while saving computation resources at the device due to base station assistance. Such base station assisted neural network block training and implementation may result in improved throughput, increased efficiency, and improved user experience.

Figure 9:
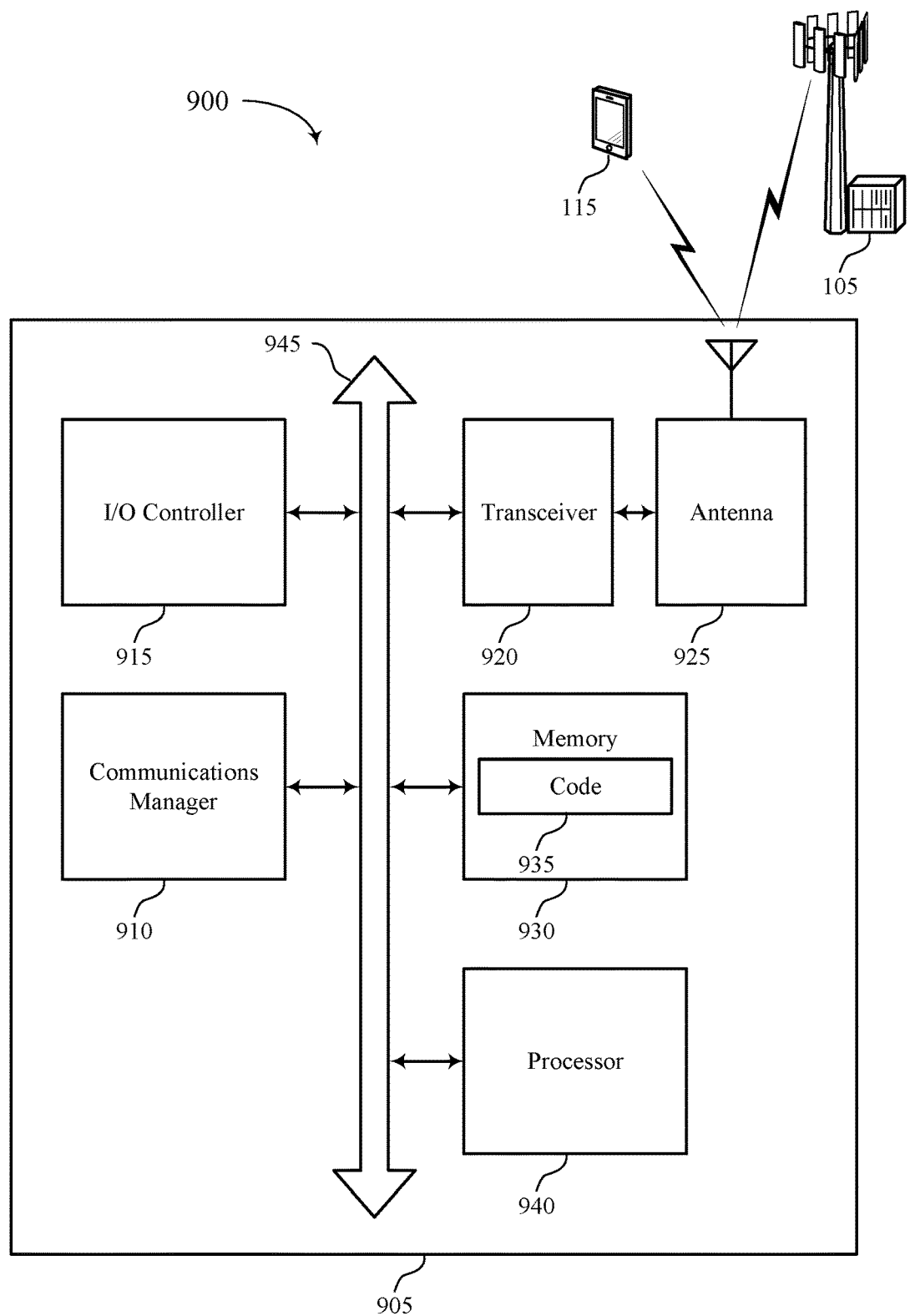
FIG. 9 shows a diagram of a system including a device that supports neural network configuration for wireless communication system assistance in accordance with aspects of the present disclosure.

Based on techniques for efficiently communicating a maximum number of layers for a device as described herein, a processor of a UE 115 (e.g., controlling the receiver 610, the transmitter 620, or a transceiver 920 as described with respect to FIG. 9) may increase system efficiency and decrease unnecessary processing at a device.

Figure 7:
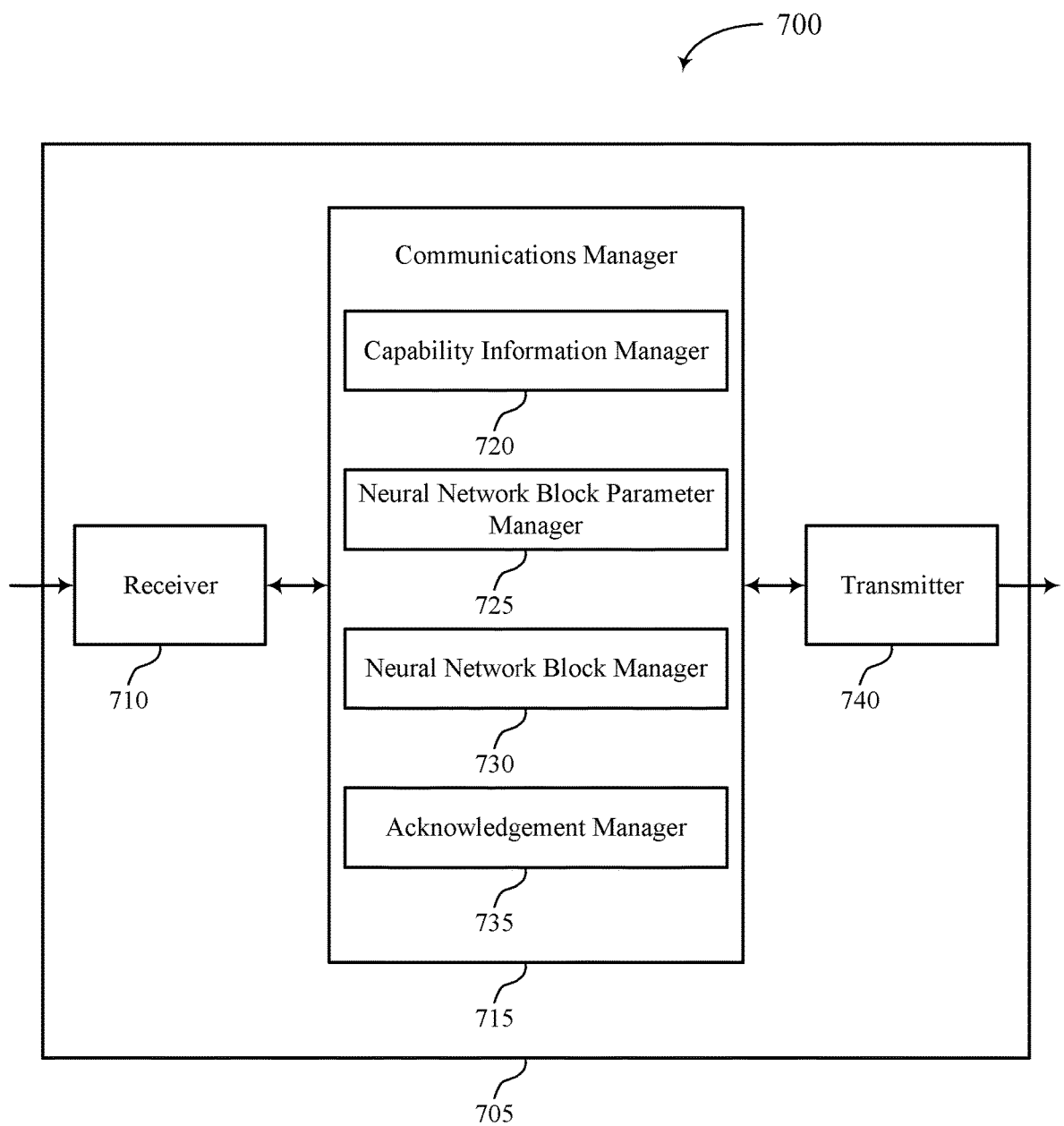

FIG. 7 shows a block diagram 700 of a device 705 that supports neural network configuration for wireless communication system assistance in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to neural network configuration for wireless communication system assistance, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a capability information manager 720, a neural network block parameter manager 725, a neural network block manager 730, and an acknowledgement manager 735. The communications manager 715 may be an example of aspects of the communications manager 910 described herein.

The capability information manager 720 may transmit, to a base station, capability information regarding one or more neural network blocks supported by the UE.

The neural network block parameter manager 725 may receive, from the base station, one or more neural network block parameters based on the transmitting of the capability information.

The neural network block manager 730 may process one or more signals, e.g., baseband signals, generated by the UE using a neural network block of the one or more neural network blocks and the one or more neural network block parameters.

The acknowledgement manager 735 may transmit, to the base station, an acknowledgement message indicating that the one or more neural network block parameters have been successfully received.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
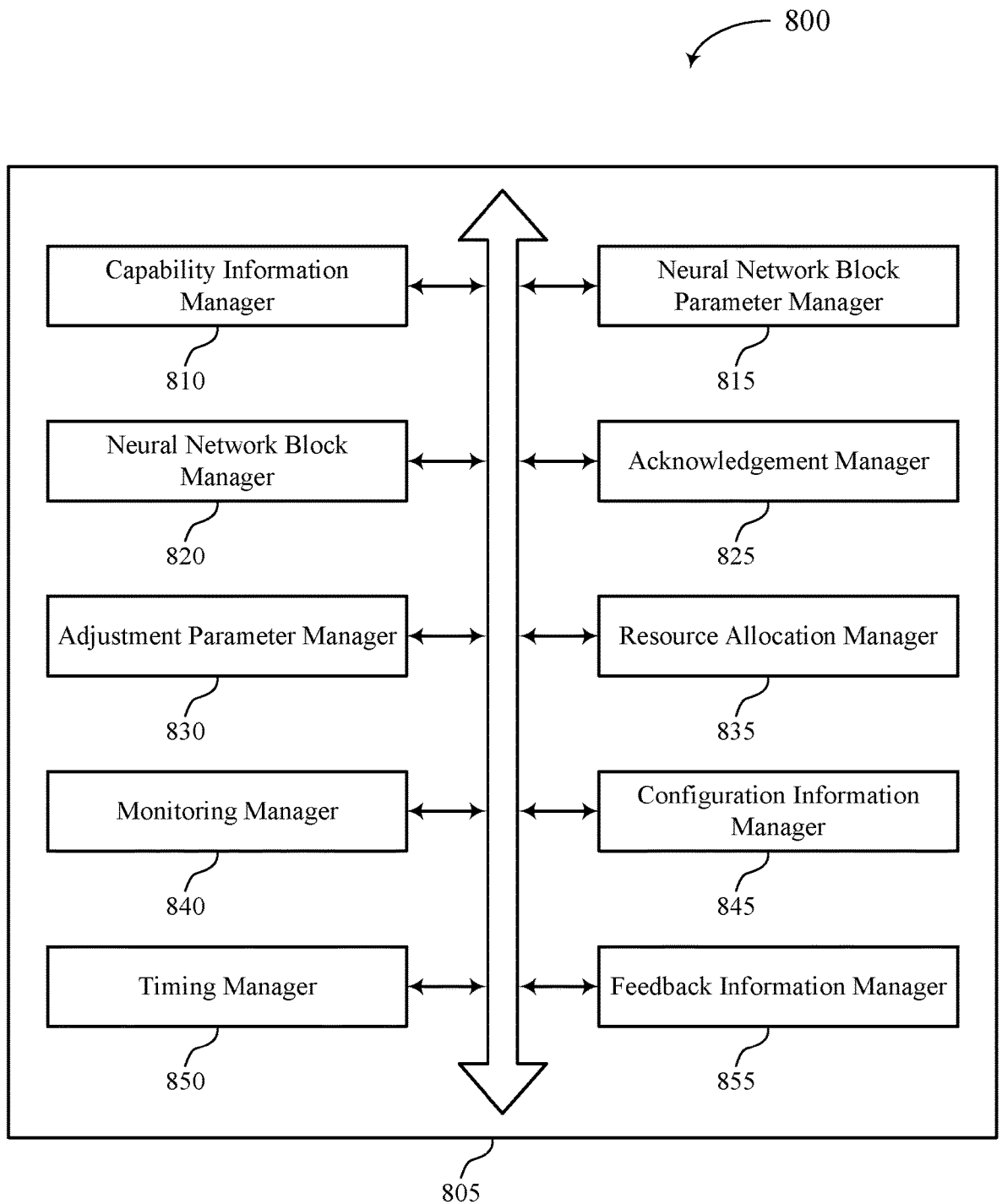
FIG. 8 shows a block diagram of a communications manager that supports neural network configuration for wireless communication system assistance in accordance with aspects of the present disclosure.

FIG. 8 shows a block diagram 800 of a communications manager 805 that supports neural network configuration for wireless communication system assistance in accordance with aspects of the present disclosure. The communications manager 805 may be an example of aspects of a communications manager 615, a communications manager 715, or a communications manager 910 described herein. The communications manager 805 may include a capability information manager 810, a neural network block parameter manager 815, a neural network block manager 820, an acknowledgement manager 825, an adjustment parameter manager 830, a resource allocation manager 835, a monitoring manager 840, a configuration information manager 845, a timing manager 850, and a feedback information manager 855. Each of these modules may communicate, directly or indirectly, with one another (e.g., via one or more buses).

The capability information manager 810 may transmit, to a base station, capability information regarding one or more neural network blocks supported by the UE. In some examples, the capability information manager 810 may identify the neural network block having one or more configuration options, where the one or more neural network blocks supported by the UE include the neural network block.

In some examples, the capability information manager 810 may identify a default network function block, where the one or more neural network blocks supported by the UE includes the default network function block.

In some examples, the capability information manager 810 may receive control information from the base station that indicates a new network function block to be the default network function block, where identifying the default network function block is based on receiving the control information.

In some examples, the capability information manager 810 may identify a set of neural network blocks stored by the UE, where the one or more neural network blocks supported by the UE includes the set of neural network blocks.

In some examples, the capability information manager 810 may receive, from the base station, second capability information indicating that the base station supports at least one neural network block, where transmitting the capability information to the base station is based on receiving the second capability information.

In some cases, the capability information manager 810 may manage capability information transmitted in a system information block, a master information block, a downlink control information message, a media access control element, or a radio resource control message, or a combination thereof.

The neural network block parameter manager 815 may receive, from the base station, one or more neural network block parameters based on the transmitting of the capability information. In some examples, the neural network block parameter manager 815 may receive configuration information for the neural network block and the one or more neural network block parameters over the physical downlink shared channel based on receiving the resource allocation message. In some examples, the neural network block parameter manager 815 may receive an indication of the neural network block of the set of neural network blocks. In some examples, the neural network block parameter manager 815 may receive a downlink message that includes the one or more neural network block parameters, where receiving the one or more neural network block parameters is based on receiving the downlink message.

In some examples, the neural network block parameter manager 815 may receive, from the base station, one or more additional neural network block parameters.

In some cases, one or more neural network block parameters are received as part of a downlink data message. In some cases, the downlink message includes a downlink control information message, a media access control element, or a radio resource control message, or a combination thereof. In some cases, the one or more neural network block parameters include one or more input values, a number of layers of the neural network block, a number of nodes for one or more layers of the neural network block, a connection map across the one or more layers of the neural network block, one or more activation functions for one or more nodes of the neural network block, one or more weight values for the one or more nodes of the neural network block, an adjustment to one or more weight values for one or more submodules, or one or more bias values for the one or more nodes of the neural network block, or a combination thereof.

The neural network block manager 820 may process one or more signals, e.g., baseband signals, generated by the UE using a neural network block of the one or more neural network blocks and the one or more neural network block parameters.

In some examples, the neural network block manager 820 may perform a first operation on signals, e.g., baseband signals using a first node of the neural network block based on a first weight value indicated by the one or more adjustment parameters.

In some examples, the neural network block manager 820 may perform a second operation on signals, e.g., baseband signals, using a second node of the neural network block based on a second weight value indicated by the one or more adjustment parameters, where processing the one or more signals using the neural network block is based on performing the first operation and the second operation.

In some examples, the neural network block manager 820 may transmit, by the UE, a request message to use a second neural network block different than the neural network block.

In some examples, the neural network block manager 820 may process signals, e.g., baseband signals, using the second neural network block based on transmitting the request message.

In some examples, the neural network block manager 820 may identify the neural network block of the set of neural network blocks based on receiving the indication of the neural network block, where processing the one or more signals, e.g., baseband signals, using the neural network block is based on identifying the neural network block.

In some examples, the neural network block manager 820 may process, based on determining that the timer has expired, the one or more signals, e.g., baseband signals, using a default neural network block different than the neural network block. In some cases, the neural network block may be configured to perform channel estimation for one or more baseband signals, channel state information compression for the one or more baseband signals, or a combination thereof.

The acknowledgement manager 825 may transmit, to the base station, an acknowledgement message indicating that the one or more neural network block parameters have been successfully received. In some examples, the acknowledgement manager 825 may receive, from the base station, an acknowledgment message based on the transmitting of the request message, where processing signals, e.g., baseband signals, using the second neural network block is based on receiving the acknowledgement message. In some examples, the acknowledgement manager 825 may transmit, to the base station, a negative acknowledgement message indicating that the one or more neural network block parameters failed to be successfully decoded. In some examples, the acknowledgement manager 825 may determine a priority status of the one or more additional neural network block parameters, where transmitting the negative acknowledgement message is based on the priority status.

The adjustment parameter manager 830 may adjust the neural network block according to the one or more adjustment parameters, where processing the one or more signals, e.g., baseband signals, using the neural network block is based on the adjusting. In some cases, the one or more adjustment parameters include an activation indication for one or more nodes of the neural network block, a deactivation indication of the one or more nodes of the neural network block, a weight value for the one or more nodes of the neural network block, or a bias value for the one or more nodes of the neural network block, or a combination thereof.

The resource allocation manager 835 may receive a resource allocation message for a physical downlink shared channel In some examples, the resource allocation manager 835 may receive, from the base station, a resource allocation message for a physical downlink shared channel In some cases, the resource allocation message includes a downlink control information message or radio resource control message. In some cases, the resource allocation message includes a radio resource control message, or a downlink control information message.

The monitoring manager 840 may monitor the physical downlink shared channel for the one or more neural network block parameters based on receiving the resource allocation message, where receiving the one or more neural network block parameters is based on monitoring the physical downlink shared channel In some examples, the monitoring manager 840 may monitor for the configuration information based on receiving the resource allocation message, where receiving the configuration information is based on the monitoring.

The configuration information manager 845 may configure the neural network block in place of a default network function block of the UE based on receiving the configuration information and the one or more neural network block parameters, where processing the one or more signals, e.g., baseband signals, using the neural network block is based on the configuring. In some cases, the configuration information includes an indication of one or more added algorithms for the neural network block, one or more released algorithms from the default network function block, or a combination thereof.

The timing manager 850 may initiate, upon receiving the one or more neural network block parameters, a timer, where processing the one or more signals, e.g., baseband signals, using the neural network block is based on an expiration of the timer. In some examples, the timing manager 850 may initiate, upon receiving the one or more neural network block parameters, a counter of symbols, a counter of slots, or a combination thereof, where processing the one or more signals using the neural network block is based on the counter of symbols, the counter of slots, or the combination thereof satisfying a threshold. In some examples, the timing manager 850 may initiate, upon processing the one or more signals using the neural network block, a timer. In some examples, the timing manager 850 may determine that the timer has expired.

The feedback information manager 855 may receive, from the base station, a request for feedback information about a performance of the neural network block. In some examples, the feedback information manager 855 may transmit, based on processing the one or more signals, e.g., baseband signals, using the neural network block and the request, a report including the feedback information about the performance of the neural network block to the base station. In some cases, the request is communicated using a DCI message, a MAC-CE message, or an RRC message. In some cases, the feedback information is communicated using an uplink control message on an uplink control channel or an uplink data message on a physical uplink shared channel In some cases, the feedback information includes processed data, unprocessed data, complete measurements, partial measurements, or a combination thereof.

FIG. 9 shows a diagram of a system 900 including a device 905 that supports neural network configuration for wireless communication system assistance in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit, to a base station, capability information regarding one or more neural network blocks supported by the UE, receive, from the base station, one or more neural network block parameters based on the transmitting of the capability information, process one or more signals, e.g., baseband signals, generated by the UE using a neural network block of the one or more neural network blocks and the one or more neural network block parameters, and transmit, to the base station, an acknowledgement message indicating that the one or more neural network block parameters have been successfully received.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input output system (BIOS), which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting neural network configuration for wireless communication system assistance).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
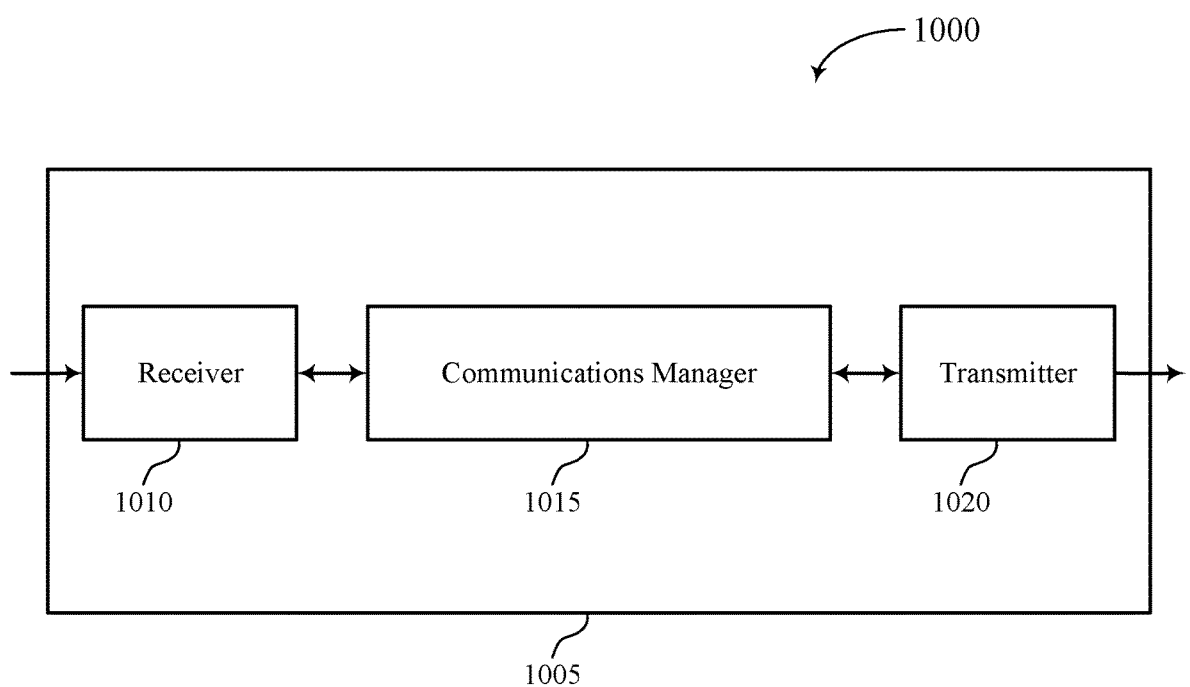
FIGS. 10 and 11 show block diagrams of devices that support neural network configuration for wireless communication system assistance in accordance with aspects of the present disclosure.

FIG. 10 shows a block diagram 1000 of a device 1005 that supports neural network configuration for wireless communication system assistance in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to neural network configuration for wireless communication system assistance, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive, from a UE, capability information indicating that the UE supports one or more neural network blocks, configure one or more neural network block parameters for a neural network block of the one or more neural network blocks supported by the UE based on the capability information, transmit, to the UE, the one or more neural network block parameters, and receive, from the UE, an acknowledgment message indicating that the one or more neural network block parameters have been successfully received by the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
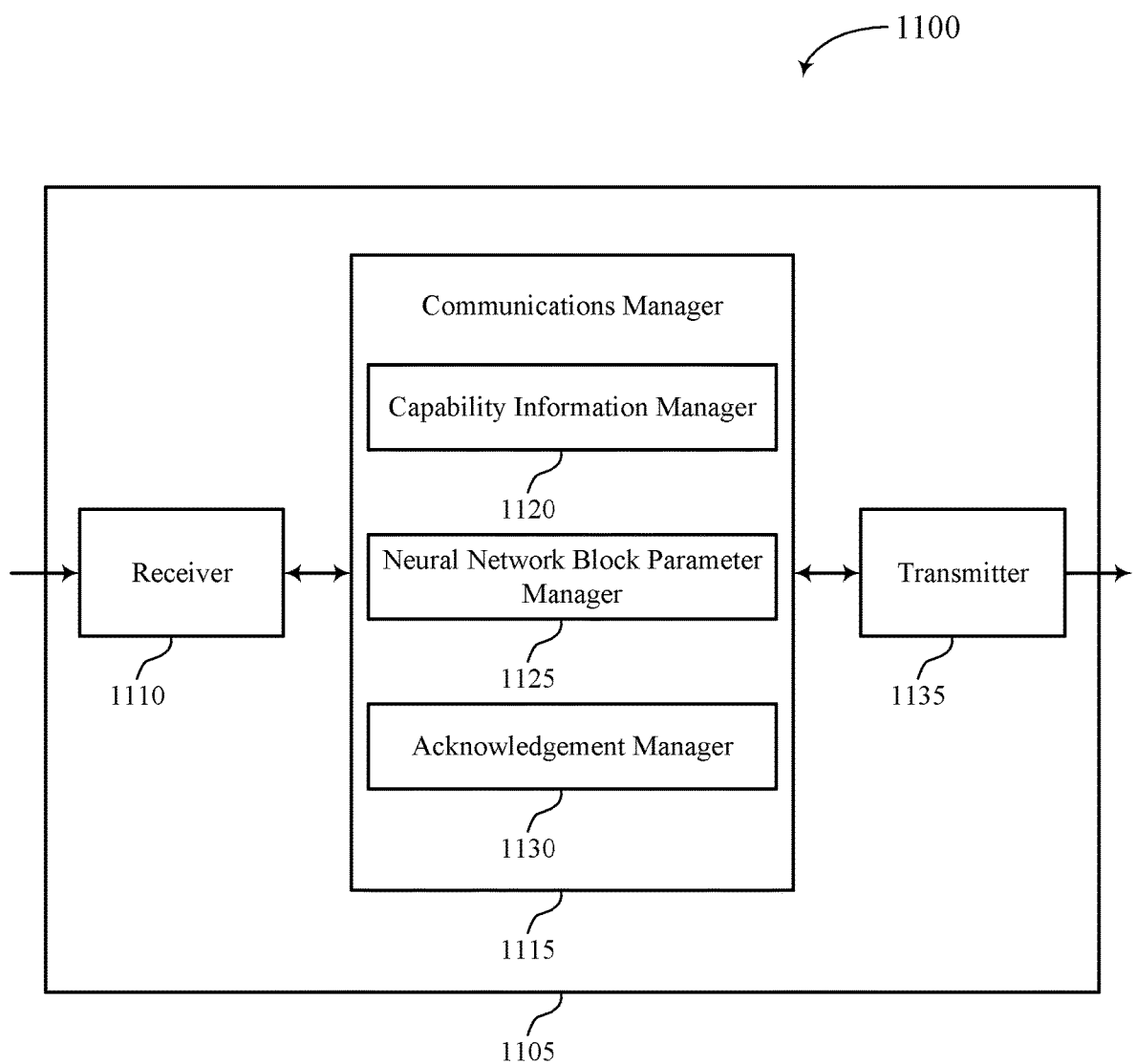

FIG. 11 shows a block diagram 1100 of a device 1105 that supports neural network configuration for wireless communication system assistance in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to neural network configuration for wireless communication system assistance, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a capability information manager 1120, a neural network block parameter manager 1125, and an acknowledgement manager 1130. The communications manager 1115 may be an example of aspects of the communications manager 1310 described herein.

The capability information manager 1120 may receive, from a UE, capability information indicating that the UE supports one or more neural network blocks.

The neural network block parameter manager 1125 may configure one or more neural network block parameters for a neural network block of the one or more neural network blocks supported by the UE based on the capability information and transmit, to the UE, the one or more neural network block parameters.

The acknowledgement manager 1130 may receive, from the UE, an acknowledgment message indicating that the one or more neural network block parameters have been successfully received by the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
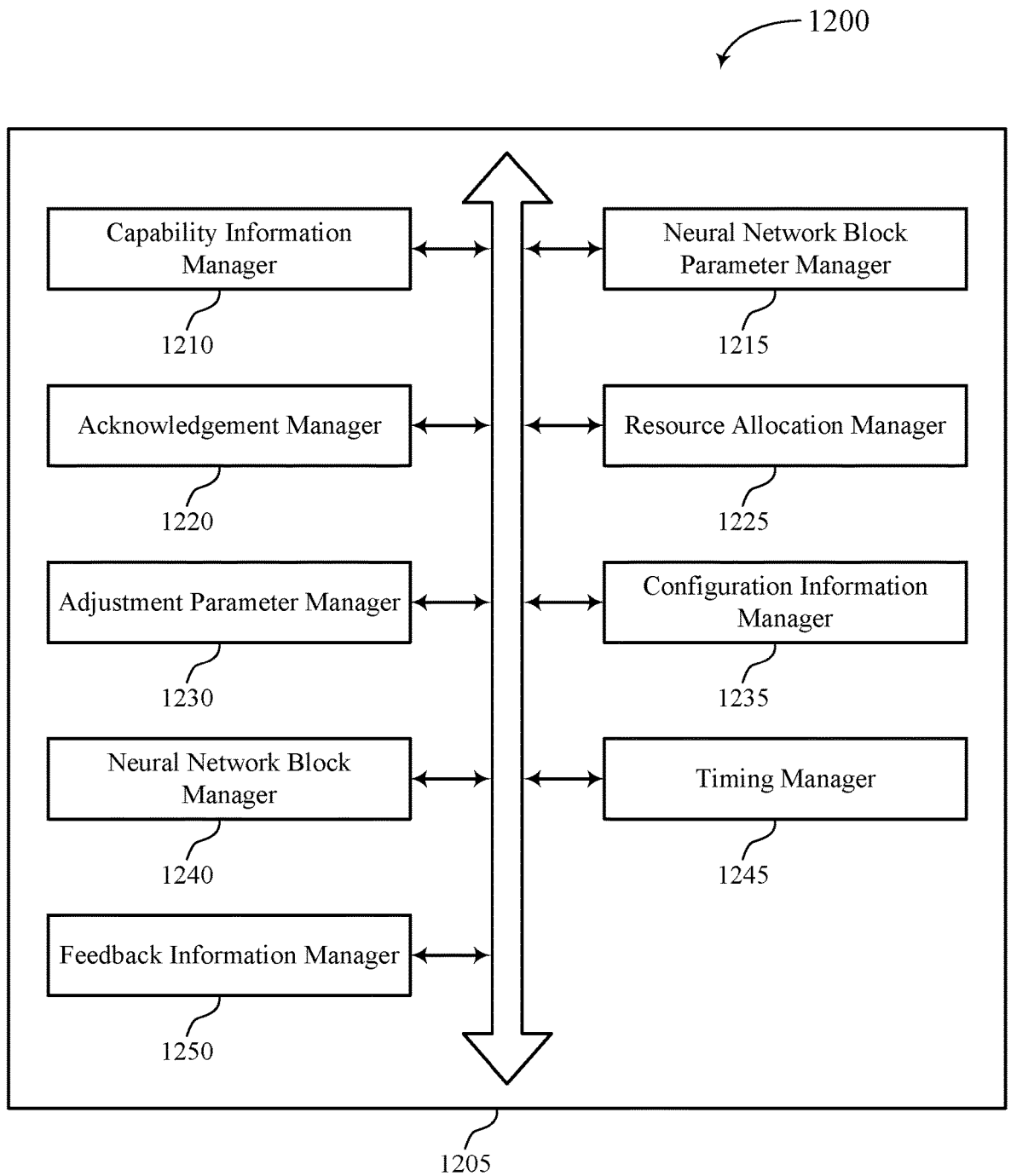
FIG. 12 shows a block diagram of a communications manager that supports neural network configuration for wireless communication system assistance in accordance with aspects of the present disclosure.

FIG. 12 shows a block diagram 1200 of a communications manager 1205 that supports neural network configuration for wireless communication system assistance in accordance with aspects of the present disclosure. The communications manager 1205 may be an example of aspects of a communications manager 1015, a communications manager 1115, or a communications manager 1310 described herein. The communications manager 1205 may include a capability information manager 1210, a neural network block parameter manager 1215, an acknowledgement manager 1220, a resource allocation manager 1225, an adjustment parameter manager 1230, a configuration information manager 1235, a neural network block manager 1240, a timing manager 1245, and a feedback information manager 1250. Each of these modules may communicate, directly or indirectly, with one another (e.g., via one or more buses).

The capability information manager 1210 may receive, from a UE, capability information indicating that the UE supports one or more neural network blocks. In some examples, the capability information manager 1210 may transmit control information to the UE that indicates a new network function block to be the default network function block. In some examples, the capability information manager 1210 may transmit, to the UE, second capability information indicating that the base station supports at least one neural network block, where receiving the capability information from the UE is based on transmitting the second capability information. In some cases, one or more neural network block types supported by the UE includes the default network function block. In some cases, the second capability information included in a system information block, a master information block, a downlink control information message, a media access control element, or a radio resource control message, or a combination thereof.

The neural network block parameter manager 1215 may configure one or more neural network block parameters for a neural network block of the one or more neural network blocks supported by the UE based on the capability information. In some examples, the neural network block parameter manager 1215 may transmit, to the UE, the one or more neural network block parameters. In some examples, the neural network block parameter manager 1215 may transmit an indication of the neural network block of a set of neural network blocks that have been stored in memory of the UE but not active, thereby enabling the UE to recall the indicated neural network block from memory based on the received indication. In this manner, a base station may configure neural network blocks in a UE by transmitting just an indication or identifier of a selected neural network block, enabling the UE to implement the indicated neural network block by recalling the required information from memory. In some embodiments, neural network blocks stored in memory of the UE may be included in the list of one or more neural network blocks supported by the UE that the UE transmits to the base station. In some examples, the neural network block parameter manager 1215 may transmit a downlink message to the base station that includes the one or more neural network block parameters as part of the downlink message.

In some examples, the neural network block parameter manager 1215 may transmit, to the UE, one or more additional neural network block parameters. In some cases, the one or more neural network block parameters further include one or more adjustment parameters to the neural network block to be used to process one or more signals, e.g., baseband signals, by the UE. In some cases, the one or more neural network block parameters are transmitted as part of a downlink data message. In some cases, the downlink message includes a downlink control information message, a media access control element, or a radio resource control message, or a combination thereof. In some cases, the one or more neural network block parameters include one or more input values, a number of layers of the neural network block, a number of nodes for one or more layers of the neural network block, a connection map across the one or more layers of the neural network block, one or more activation functions for one or more nodes of the neural network block, one or more weight values for the one or more nodes of the neural network block, or one or more bias values for the one or more nodes of the neural network block, or a combination thereof.

The acknowledgement manager 1220 may receive, from the UE, an acknowledgment message indicating that the one or more neural network block parameters have been successfully received by the UE. In some examples, the acknowledgement manager 1220 may transmit, to the UE, an acknowledgement message based on the receiving of the request message. In some examples, the acknowledgement manager 1220 may receive, from the UE, a negative acknowledgement message indicating that the one or more neural network block parameters failed to be successfully decoded. In some examples, the acknowledgement manager 1220 may receive the negative acknowledgement message based on a priority status of the one or more additional neural network block parameters.

The resource allocation manager 1225 may transmit a resource allocation message for a physical downlink shared channel, where the one or more neural network block parameters are transmitted over the physical downlink shared channel according to the resource allocation message. In some examples, the resource allocation manager 1225 may transmit, to the UE, a resource allocation message for a physical downlink shared channel In some cases, the resource allocation message includes a downlink control information message or radio resource control message. In some cases, the resource allocation message includes a radio resource control message, or a downlink control information message.

The adjustment parameter manager 1230 may receive or transmit one or more adjustment parameters. In some cases, the one or more adjustment parameters include an activation indication for one or more nodes of the neural network block, a deactivation indication for the one or more nodes of the neural network block, a weight value for the one or more nodes of the neural network block, or a bias value for the one or more nodes of the neural network block, or a combination thereof. In some cases, the one or more adjustment parameters to the neural network block include a first adjustment to a first weight value for a first node of the neural network block or a second adjustment to a second weight value for a second node of the neural network block, or both.

The configuration information manager 1235 may transmit configuration information for the neural network block and the one or more neural network block parameters over the physical downlink shared channel based on transmitting the resource allocation message, where the configuration information includes instructions for the UE to configure the neural network block in place of a default network function block of the UE. In some cases, the configuration information includes an indication of one or more added algorithms for the neural network block, one or more released algorithms from the default network function block, or a combination thereof.

The neural network block manager 1240 may receive, from the UE, a request message to use a second neural network block different than the neural network block. In some cases, the neural network block may be configured to perform channel estimation for one or more signals, e.g., baseband signals, channel state information compression for the one or more signals, or a combination thereof.

The timing manager 1245 may transmit an indication of a timer and an instruction for the UE to initiate the timer upon receiving the one or more neural network block parameters. In some examples, the timing manager 1245 may transmit an indication of a counter of symbols, a counter of slots, or a combination thereof and an instruction for the UE to initiate the counter of symbols, the counter of slots, or the combination thereof upon receiving the one or more neural network block parameters.

The feedback information manager 1250 may transmit, to the UE, a request for feedback information about a performance of the neural network block. In some examples, the feedback information manager 1250 may receive, based on the request for the feedback information about the performance of the neural network block, a report including the feedback information about the performance of the neural network block. In some cases, the request is communicated using a DCI message, a MAC-CE message, or an RRC message. In some cases, the feedback information is communicated using an uplink control message on an uplink control channel or an uplink data message on a physical uplink shared channel In some cases, the feedback information includes processed data, unprocessed data, complete measurements, partial measurements, or a combination thereof.

Figure 13:
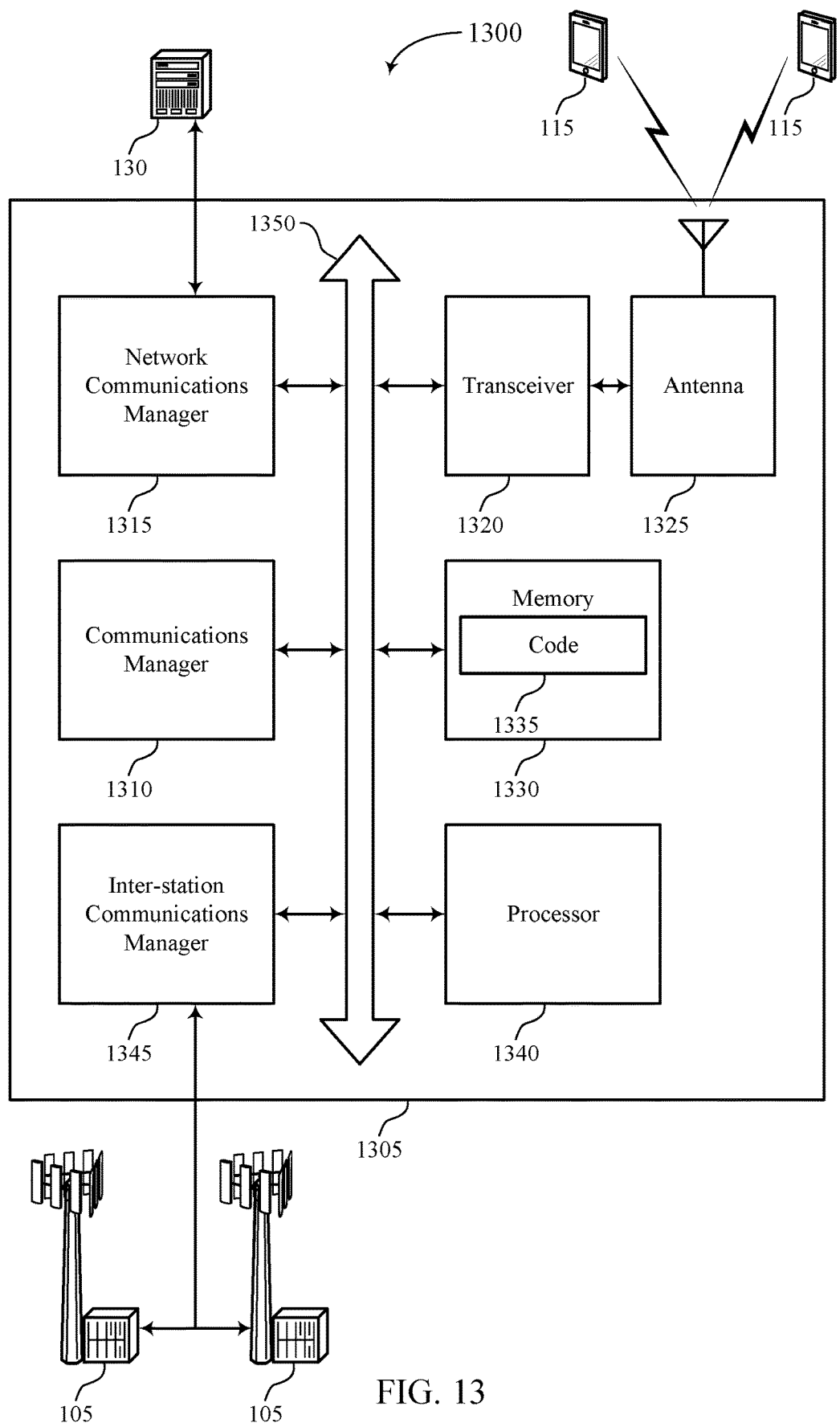
FIG. 13 shows a diagram of a system including a device that supports neural network configuration for wireless communication system assistance in accordance with aspects of the present disclosure.

FIG. 13 shows a diagram of a system 1300 including a device 1305 that supports neural network configuration for wireless communication system assistance in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive, from a UE, capability information indicating that the UE supports one or more neural network blocks, configure one or more neural network block parameters for a neural network block of the one or more neural network blocks supported by the UE based on the capability information, transmit, to the UE, the one or more neural network block parameters, and receive, from the UE, an acknowledgment message indicating that the one or more neural network block parameters have been successfully received by the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting neural network configuration for wireless communication system assistance).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
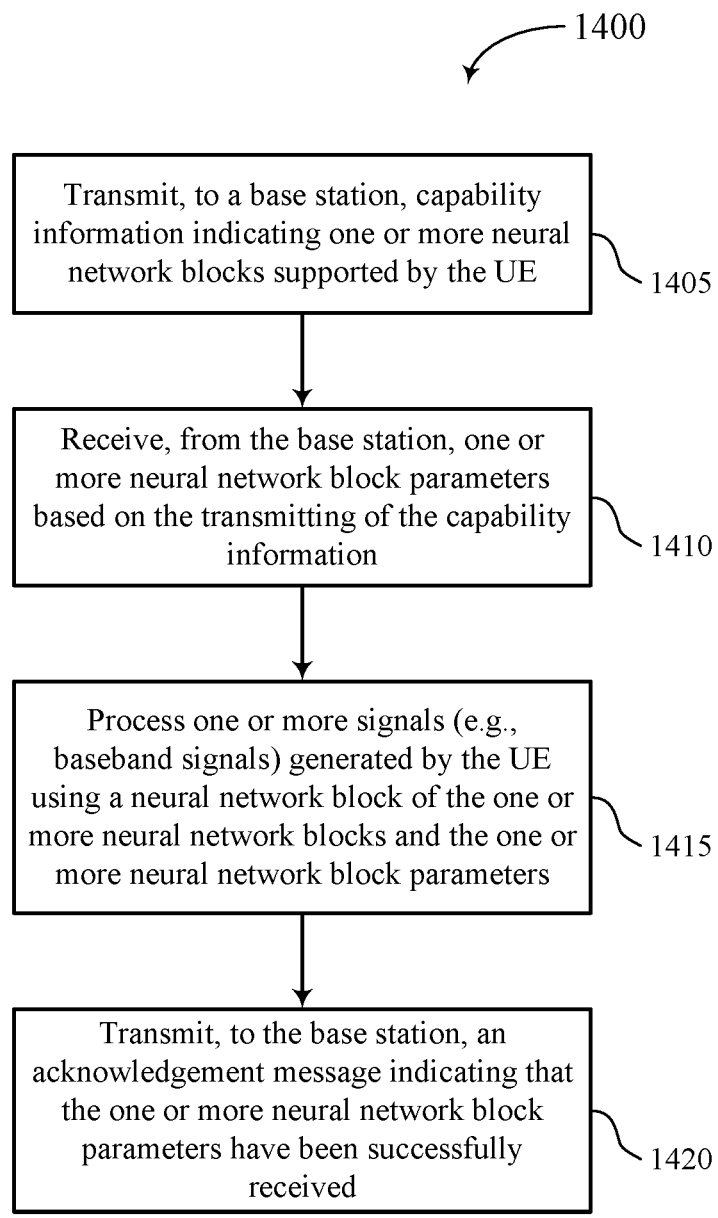
FIGS. 14 through 19 show process flow diagrams illustrating methods that support neural network configuration for wireless communication system assistance in accordance with aspects of the present disclosure.

FIG. 14 shows a process flow diagram illustrating a method 1400 that supports neural network configuration for wireless communication system assistance in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

In block 1405, the UE may transmit, to a base station, capability information regarding one or more neural network blocks capable of being implemented by the UE. The operations of block 1405 may be performed according to the methods described herein. In some examples, aspects of the operations of block 1405 may be performed by a capability information manager as described with reference to FIGS. 7 through 8.

In block 1410, the UE may receive, from the base station, one or more neural network block parameters based on the transmitting of the capability information. The operations of block 1410 may be performed according to the methods described herein. In some examples, aspects of the operations of block 1410 may be performed by a neural network block parameter manager as described with reference to FIGS. 7 through 8.

In block 1415, the UE may process one or more signals, e.g., baseband signals, generated by the UE using a neural network block of the one or more neural network blocks and the one or more neural network block parameters. The operations of block 1415 may be performed according to the methods described herein. In some examples, aspects of the operations of block 1415 may be performed by a neural network block manager as described with reference to FIGS. 7 through 8.

In block 1420, the UE may transmit, to the base station, an acknowledgement message indicating that the one or more neural network block parameters have been successfully received. The operations of block 1420 may be performed according to the methods described herein. In some examples, aspects of the operations of block 1420 may be performed by an acknowledgement manager as described with reference to FIGS. 7 through 8.

Figure 15:
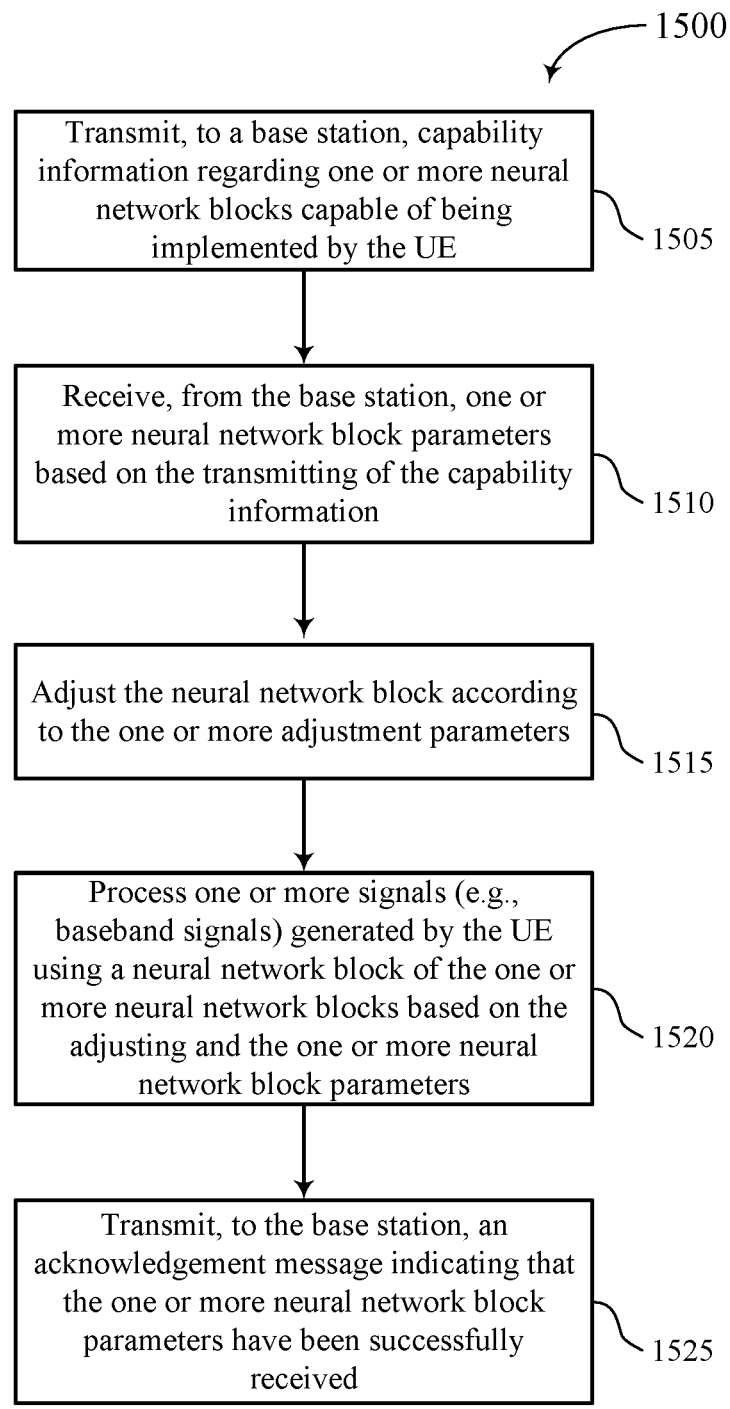

FIG. 15 shows a process flow diagram illustrating a method 1500 that supports neural network configuration for wireless communication system assistance in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

In block 1505, the UE may transmit, to a base station, capability information regarding one or more neural network blocks capable of being implemented by the UE. The operations of block 1505 may be performed according to the methods described herein. In some examples, aspects of the operations of block 1505 may be performed by a capability information manager as described with reference to FIGS. 7 through 8.

In block 1510, the UE may receive, from the base station, one or more neural network block parameters based on the transmitting of the capability information, wherein the one or more neural network block parameters may comprise one or more adjustment parameters to the first neural network block. The operations of block 1510 may be performed according to the methods described herein. In some examples, aspects of the operations of block 1510 may be performed by a neural network block parameter manager as described with reference to FIGS. 7 through 8.

In block 1515, the UE may adjust the neural network block according to the one or more adjustment parameters, where processing the one or more signals, e.g., baseband signals, using the neural network block is based on the adjusting. The operations of block 1515 may be performed according to the methods described herein. In some examples, aspects of the operations of block 1515 may be performed by an adjustment parameter manager as described with reference to FIGS. 7 through 8.

In block 1520, the UE may process one or more signals, e.g., baseband signals, generated by the UE using a neural network block of the one or more neural network blocks based on the adjusting and the one or more neural network block parameters. The operations of block 1520 may be performed according to the methods described herein. In some examples, aspects of the operations of block 1520 may be performed by a neural network block manager as described with reference to FIGS. 7 through 8.

In block 1525, the UE may transmit, to the base station, an acknowledgement message indicating that the one or more neural network block parameters have been successfully received. The operations of block 1525 may be performed according to the methods described herein. In some examples, aspects of the operations of block 1525 may be performed by an acknowledgement manager as described with reference to FIGS. 7 through 8.

Figure 16:
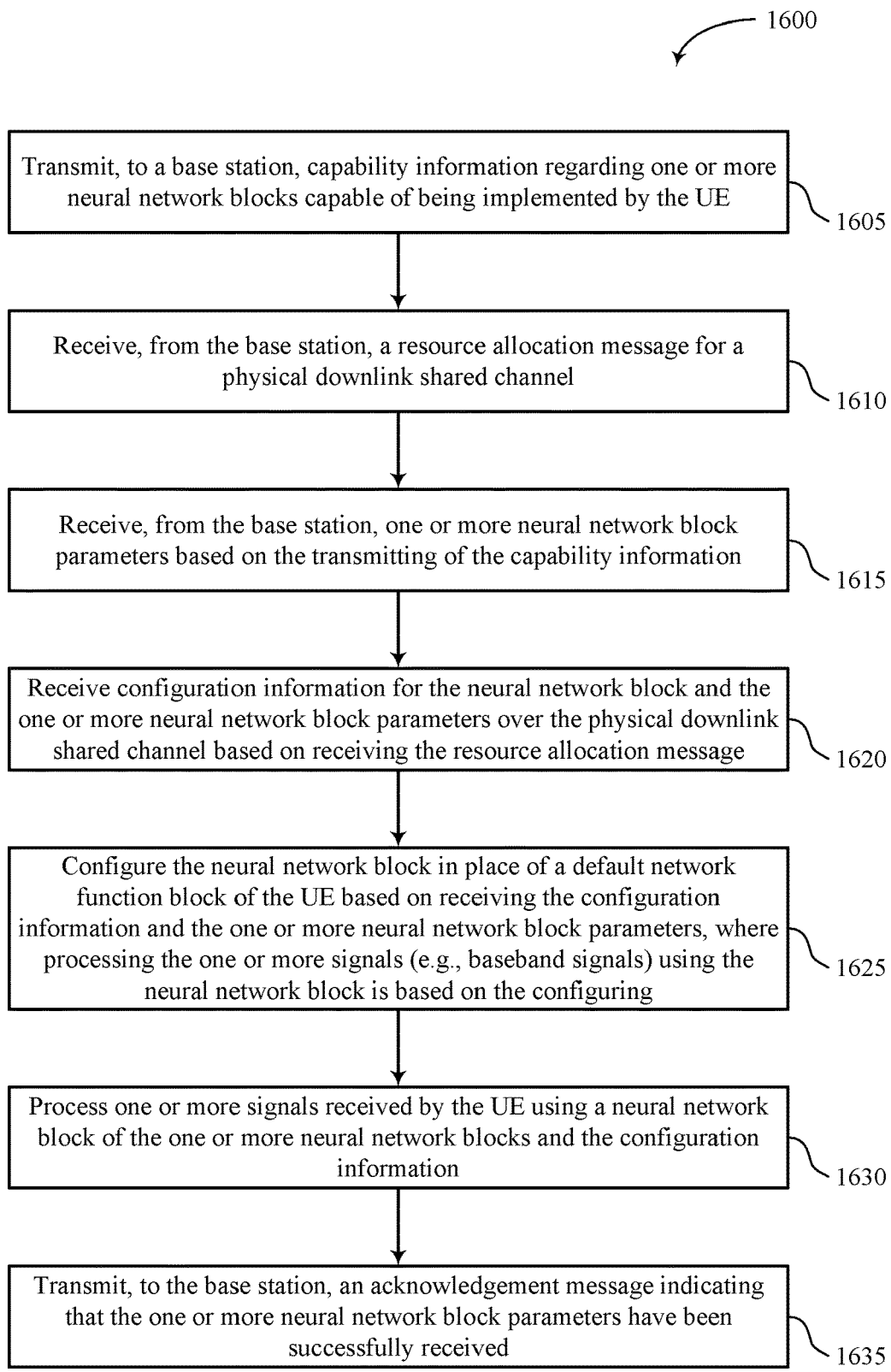

FIG. 16 shows a process flow diagram illustrating a method 1600 that supports neural network configuration for wireless communication system assistance in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

In block 1605, the UE may transmit, to a base station, capability information regarding one or more neural network blocks capable of being implemented by the UE. The operations of block 1605 may be performed according to the methods described herein. In some examples, aspects of the operations of block 1605 may be performed by a capability information manager as described with reference to FIGS. 7 through 8.

In block 1610, the UE may receive, from the base station, a resource allocation message for a physical downlink shared channel. The operations of block 1610 may be performed according to the methods described herein. In some examples, aspects of the operations of block 1610 may be performed by a resource allocation manager as described with reference to FIG. 9s. 8.

In block 1615, the UE may receive, from the base station, one or more neural network block parameters based on the transmitting of the capability information. The operations of block 1615 may be performed according to the methods described herein. In some examples, aspects of the operations of block 1615 may be performed by a neural network block parameter manager as described with reference to FIGS. 7 through 8.

In block 1620, the UE may receive configuration information for the neural network block and the one or more neural network block parameters over the physical downlink shared channel based on receiving the resource allocation message. The operations of block 1620 may be performed according to the methods described herein. In some examples, aspects of the operations of block 1620 may be performed by a neural network block parameter manager as described with reference to FIGS. 7 through 8.

In block 1625, the UE may configure the neural network block in place of a default network function block of the UE based on receiving the configuration information and the one or more neural network block parameters, where processing the one or more signals, e.g., baseband signals, using the neural network block is based on the configuring. The operations of block 1625 may be performed according to the methods described herein. In some examples, aspects of the operations of block 1625 may be performed by a configuration information manager as described with reference to FIG. 8.

In block 1630, the UE may process one or more signals, e.g., baseband signals, generated by the UE using a neural network block of the one or more neural network blocks and the configuration information. The operations of block 1630 may be performed according to the methods described herein. In some examples, aspects of the operations of block 1630 may be performed by a neural network block manager as described with reference to FIGS. 7 through 8.

In block 1635, the UE may transmit, to the base station, an acknowledgement message indicating that the one or more neural network block parameters have been successfully received. The operations of block 1635 may be performed according to the methods described herein. In some examples, aspects of the operations of block 1635 may be performed by an acknowledgement manager as described with reference to FIGS. 7 through 8.

Figure 17:
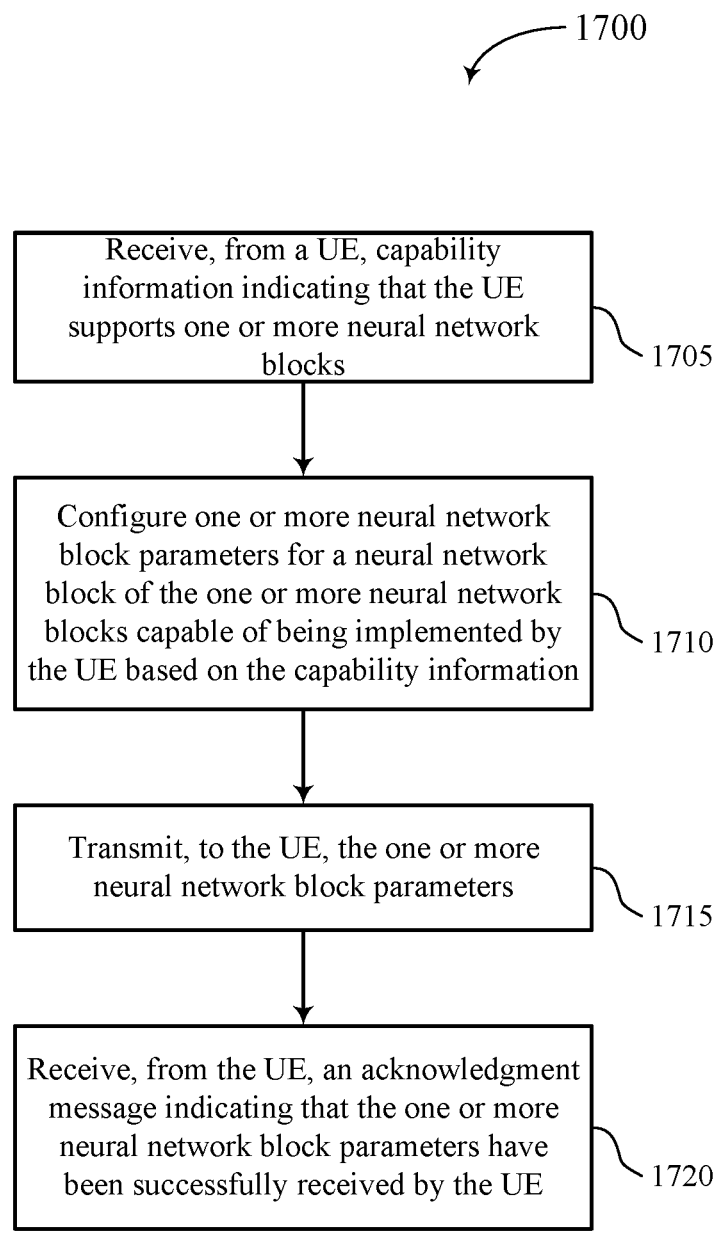

FIG. 17 shows a process flow diagram illustrating a method 1700 that supports neural network configuration for wireless communication system assistance in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

In block 1705, the base station may receive, from a UE, capability information indicating that the UE supports one or more neural network blocks. The operations of block 1705 may be performed according to the methods described herein. In some examples, aspects of the operations of block 1705 may be performed by a capability information manager as described with reference to FIGS. 11 through 12.

In block 1710, the base station may configure one or more neural network block parameters for a neural network block of the one or more neural network blocks capable of being implemented by the UE based on the capability information. The operations of block 1710 may be performed according to the methods described herein. In some examples, aspects of the operations of block 1710 may be performed by a neural network block parameter manager as described with reference to FIGS. 11 through 12.

In block 1715, the base station may transmit, to the UE, the one or more neural network block parameters. The operations of block 1715 may be performed according to the methods described herein. In some examples, aspects of the operations of block 1715 may be performed by a neural network block parameter manager as described with reference to FIGS. 11 through 12.

In block 1720, the base station may receive, from the UE, an acknowledgment message indicating that the one or more neural network block parameters have been successfully received by the UE. The operations of block 1720 may be performed according to the methods described herein. In some examples, aspects of the operations of block 1720 may be performed by an acknowledgement manager as described with reference to FIGS. 11 through 12.

Figure 18:
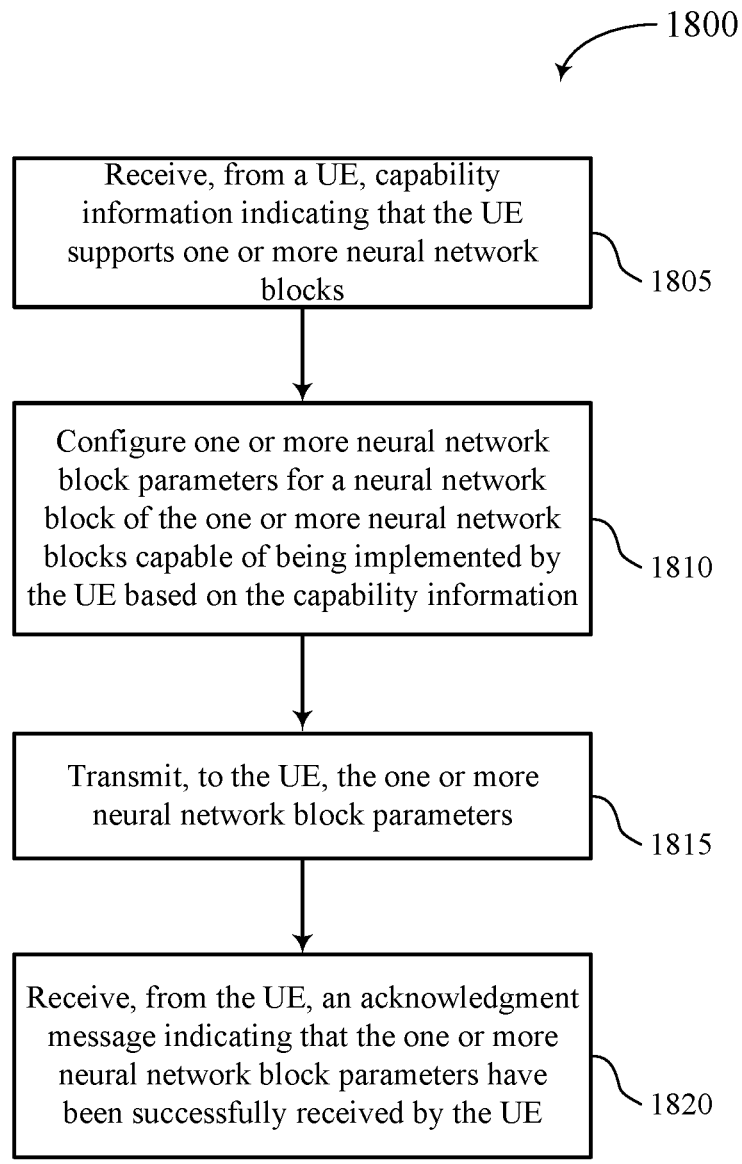

FIG. 18 shows a process flow diagram illustrating a method 1800 that supports neural network configuration for wireless communication system assistance in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

In block 1805, the base station may receive, from a UE, capability information indicating that the UE supports one or more neural network blocks. The operations of block 1805 may be performed according to the methods described herein. In some examples, aspects of the operations of block 1805 may be performed by a capability information manager as described with reference to FIGS. 11 through 12.

In block 1810, the base station may configure one or more neural network block parameters for a neural network block of the one or more neural network blocks capable of being implemented by the UE based on the capability information. The one or more neural network block parameters may include one or more adjustment parameters to the neural network block to be used to process one or more signals, e.g., baseband signals, by the UE. The operations of block 1810 may be performed according to the methods described herein. In some examples, aspects of the operations of block 1810 may be performed by a neural network block parameter manager as described with reference to FIGS. 11 through 12.

In block 1815, the base station may transmit, to the UE, the one or more neural network block parameters. The operations of block 1815 may be performed according to the methods described herein. In some examples, aspects of the operations of block 1815 may be performed by a neural network block parameter manager as described with reference to FIGS. 11 through 12.

In block 1820, the base station may receive, from the UE, an acknowledgment message indicating that the one or more neural network block parameters have been successfully received by the UE. The operations of block 1820 may be performed according to the methods described herein. In some examples, aspects of the operations of block 1820 may be performed by an acknowledgement manager as described with reference to FIGS. 11 through 12.

Figure 19:
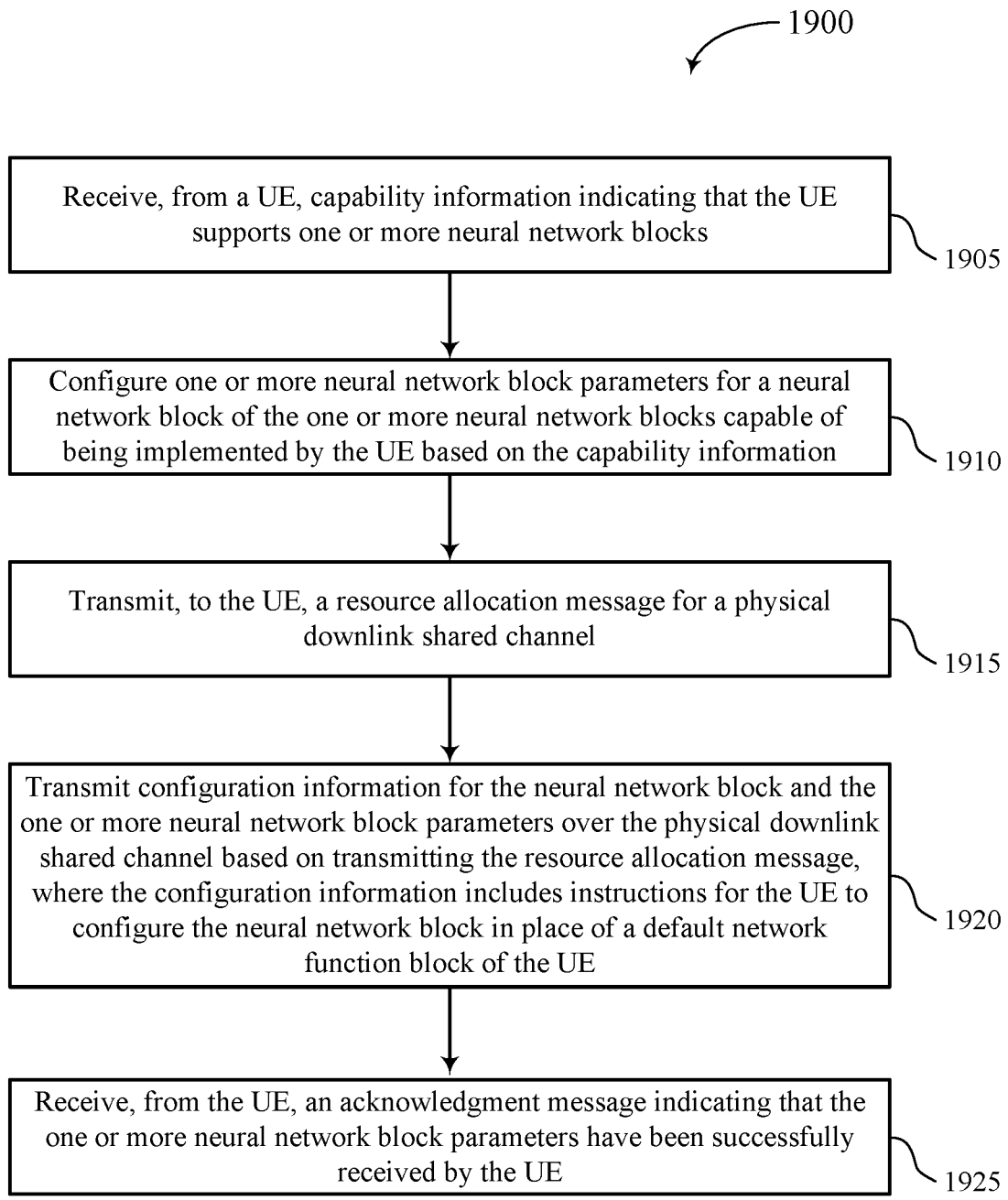

FIG. 19 shows a process flow diagram illustrating a method 1900 that supports neural network configuration for wireless communication system assistance in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

In block 1905, the base station may receive, from a UE, capability information indicating that the UE supports one or more neural network blocks. The operations of block 1905 may be performed according to the methods described herein. In some examples, aspects of the operations of block 1905 may be performed by a capability information manager as described with reference to FIGS. 11 through 12.

In block 1910, the base station may configure one or more neural network block parameters for a neural network block of the one or more neural network blocks capable of being implemented by the UE based on the capability information. The operations of block 1910 may be performed according to the methods described herein. In some examples, aspects of the operations of block 1910 may be performed by a neural network block parameter manager as described with reference to FIGS. 11 through 12.

In block 1915, the base station may transmit, to the UE, a resource allocation message for a physical downlink shared channel. The operations of block 1915 may be performed according to the methods described herein. In some examples, aspects of the operations of block 1915 may be performed by a resource allocation manager as described with reference to FIG. 12.

In block 1920, the base station may transmit at least one of configuration information for the neural network block and the one or more neural network block parameters over the physical downlink shared channel based on transmitting the resource allocation message, where the configuration information includes instructions for the UE to configure the neural network block in place of a default network function block of the UE. The operations of block 1920 may be performed according to the methods described herein. In some examples, aspects of the operations of block 1920 may be performed by a configuration information manager as described with reference to FIG. 12.

In block 1925, the base station may receive, from the UE, an acknowledgment message indicating that the one or more neural network block parameters have been successfully received by the UE. The operations of block 1925 may be performed according to the methods described herein. In some examples, aspects of the operations of block 1925 may be performed by an acknowledgement manager as described with reference to FIGS. 11 through 12.

Figure 20:
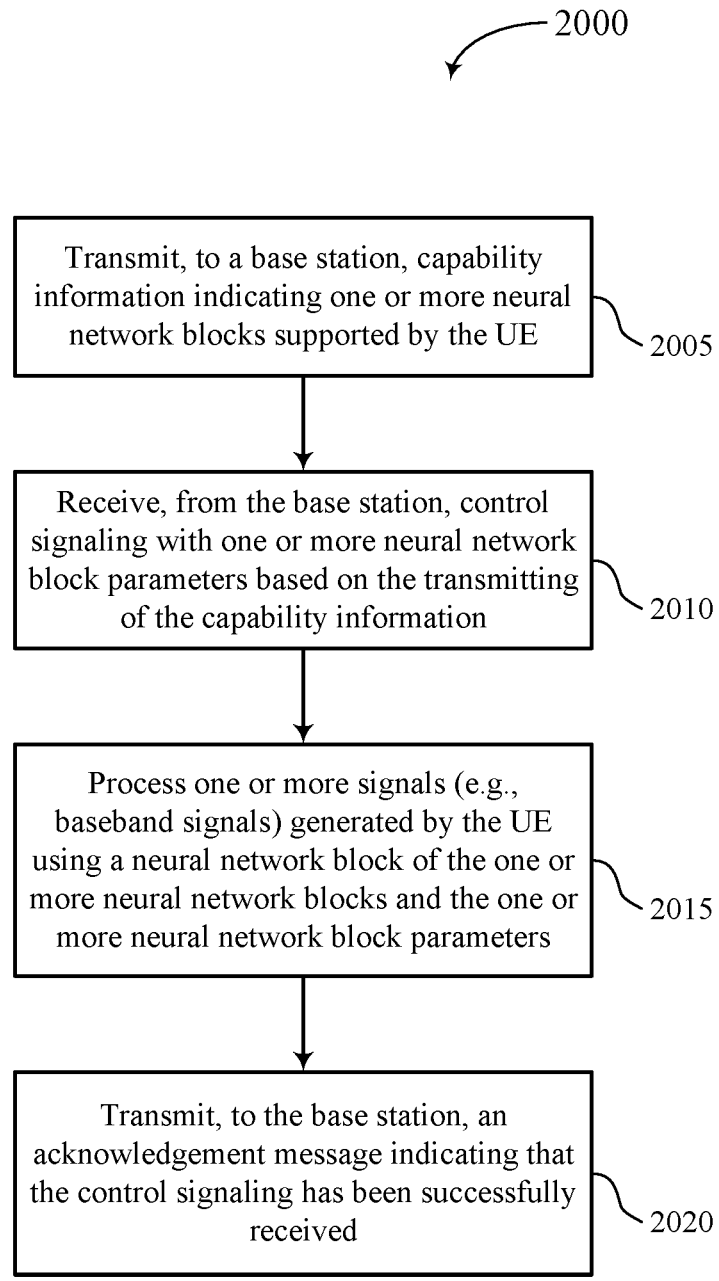
FIGS. 20 through 24 show process flow diagrams illustrating methods for communicating neural network configuration information using a control channel for wireless communication system assistance in accordance with aspects of the present disclosure.

FIG. 20 shows a process flow diagram illustrating a method 2000 that supports neural network configuration for wireless communication system assistance in accordance with aspects of the present disclosure. The operations of the method 2000 may be implemented by a UE 115 or its components as described herein. For example, the operations of the method 2000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

In block 2005, the UE may transmit, to a base station, capability information regarding one or more neural network blocks capable of being implemented by the UE. The operations of block 2005 may be performed according to the methods described herein. In some examples, aspects of the operations of block 2005 may be performed by a capability information manager as described with reference to FIGS. 7 through 8.

In some examples, the UE may identify the default network function block, wherein the one or more neural network blocks supported by the UE includes the default network function block.

In block 2010, the UE may receive, from the base station, control signaling with one or more neural network block parameters based on the capability information transmitted by the UE in the operations of block 2005. The operations of block 2010 may be performed according to the methods described herein. In some examples, aspects of the operations of block 2010 may be performed by a neural network block parameter manager as described with reference to FIGS. 7 through 8.

In some examples, the one or more neural network block parameters may further include one or more adjustment parameters to the first neural network block used to process the one or more signals, e.g., baseband signals, by the UE. The method may further include adjusting the first neural network block according to the one or more adjustment parameters, wherein processing the one or more signals using the first neural network block is based at least in part on the adjusting. The one or more adjustment parameters may include an activation indication for one or more nodes of the first neural network block, a deactivation indication of the one or more nodes of the first neural network block, a weight value for the one or more nodes of the first neural network block, an adjustment to a weight value for a submodule of the first neural network block, or a bias value for the one or more nodes of the first neural network block, or any such combination.

In some examples, adjusting the first neural network block according to the one or more adjustment parameters may further include performing a first operation on the one or more signals, e.g., baseband signals, using a first node of the first neural network block based at least in part on a first weight value indicated by the one or more adjustment parameters, and performing a second operation on the one or more signals, e.g., baseband signals, using a second node of the first neural network block based at least in part on a second weight value indicated by the one or more adjustment parameters, wherein processing the one or more signals, e.g., baseband signals, using the first neural network block is based at least in part on performing the first operation and the second operation. Adjusting the first neural network block may further include identifying the first neural network block having one or more configuration options, wherein the one or more neural network blocks supported by the UE includes the first neural network block.

In some examples, the first neural network block may be configured to perform channel estimation for the one or more signals, e.g., baseband signals, channel state information compression for the one or more signals, or a combination thereof.

According to some examples, the one or more neural network block parameters may include one or more input values, a number of layers of the first neural network block, a number of nodes for one or more layers of the first neural network block, a connection map across the one or more layers of the first neural network block, one or more activation functions for one or more nodes of the first neural network block, one or more weight values for the one or more nodes of the first neural network block, or one or more bias values for the one or more nodes of the first neural network block, or a combination thereof.

In some examples, the capability information may be communicated using an uplink control message on an uplink control channel or an uplink data message on a physical uplink shared channel, or a combination thereof.

According to some examples, the control signaling may include a resource allocation message including the one or more neural network block parameters for configuring network components. The resource allocation message may include a downlink control information message, a media access control element, or radio resource control message. The network components may include one or more cell groups, one or more component carriers associated with each of the one or more cell groups, one or more bandwidth parts associated with each of the one or more component carriers, or any such combination. In some examples, the one or more cell groups can include a master cell group, a secondary cell group, a supplementary cell group, or any such combination.

In some examples, receiving control signaling from the base station may include receiving the control signaling over a physical downlink control channel, wherein the one or more neural network block parameters are received over the physical downlink control channel, and configuring the first neural network block in place of a default network function block of the UE based at least in part on receiving the one or more neural network block parameters, wherein processing the one or more signals, e.g., baseband signals, using the first neural network block is based at least in part on the configuring. In some examples, receiving control signaling from the base station may include receiving configuration information over a physical downlink control channel, wherein the configuration information includes an indication of one or more added algorithms for the first neural network block, one or more released algorithms from the default network function block, or a combination thereof. Configuration information received from the base station may indicate a new network function block to be the default network function block, wherein identifying the default network function block is based at least in part on receiving the control signaling.

In some examples, the UE may monitor for the configuration information based at least in part on receiving the resource allocation message, wherein receiving the configuration information is based at least in part on the monitoring.

In some examples, receiving the control signaling may further include identifying a set of neural network blocks stored by the UE, wherein the one or more neural network blocks supported by the UE includes the set of neural network blocks, receiving an indication of the first neural network block of the set of neural network blocks, and identifying the first neural network block of the set of neural network blocks based at least in part on receiving the indication of the first neural network block, wherein processing the one or more signals, e.g., baseband signals, using the first neural network block is based at least in part on identifying the first neural network block.

According to some examples, the UE may receive a downlink message that includes the one or more neural network block parameters, wherein receiving the one or more neural network block parameters is based at least in part on receiving the downlink message. The downlink message may include a downlink control information message, a media access control element, a radio resource control message, or a combination thereof.

In some examples, upon receiving the one or more neural network block parameters, the UE may initiate a counter of symbols, a counter of slots, or a combination thereof, wherein processing the one or more signals, e.g., baseband signals, using the first neural network block is based at least in part on the counter of symbols, the counter of slots, or the combination thereof satisfying a threshold. Upon receiving the one or more neural network block parameters, the UE may initiate a timer, wherein processing the one or more signals using the first neural network block is based at least in part on an expiration of the timer.

According to some examples, the UE may receive, from the base station, additional control signaling including one or more additional neural network block parameters. The UE may transmit, to the base station, a negative acknowledgement message indicating that the one or more additional neural network block parameters failed to be successfully decoded. The UE may determine a priority status of the one or more additional neural network block parameters, wherein transmitting the negative acknowledgement message is based at least in part on the priority status.

In some examples, the UE may receive, from the base station, second capability information indicating that the base station supports at least one neural network block, wherein transmitting the capability information to the base station is based at least in part on receiving the second capability information. The second capability information may be included in a system information block, a master information block, a downlink control information message, a media access control element, or a radio resource control message, or a combination thereof.

In block 2015, the UE may process one or more signals, e.g., baseband signals, generated by the UE using a neural network block of the one or more neural network blocks and the one or more neural network block parameters. The operations of block 2015 may be performed according to the methods described herein. In some examples, aspects of the operations of block 2015 may be performed by a neural network block manager as described with reference to FIGS. 7 through 8.

In some examples, the UE may transmit a request message to use a second neural network block different than the first neural network block to process the one or more signals, e.g., baseband signals, using the second neural network block based at least in part on transmitting the request message. The UE may receive, from the base station, an acknowledgment message based at least in part on the transmitting of the request message, wherein processing the one or more signals using the second neural network block is based at least in part on receiving the acknowledgement message.

According to some examples, the UE may initiate a timer, wherein processing the one or more signals, e.g., baseband signals, using the first neural network block is based at least in part on an expiration of the timer. The UE may further determine that the timer has expired, and may process, based at least in part on determining that the timer has expired, the one or more signals using a default neural network block different than the first neural network block, wherein the first neural network block is an active neural network block.

According to some examples, the UE may receive, from the base station, a request for feedback information about a performance of the first neural network block; and may transmit, based at least in part on processing the one or more signals, e.g., baseband signals, using the first neural network block and the request, a report comprising the feedback information about the performance of the first neural network block to the base station. The request may be communicated using a DCI message, a MAC-CE message, or an RRC message, and the feedback information may be communicated using an uplink control message on an uplink control channel or an uplink data message on a physical uplink shared channel In some examples, the feedback information may include processed data, unprocessed data, complete measurements, partial measurements, or a combination thereof.

In block 2020, the UE may transmit, to the base station, an acknowledgement message indicating that the control signaling has been successfully received. The operations of block 2020 may be performed according to the methods described herein. In some examples, aspects of the operations of block 2020 may be performed by an acknowledgement manager as described with reference to FIGS. 7 through 8.

In some examples, the UE may transmit a configuration of a configured first neural network block to the base station over a physical uplink control channel or a physical uplink shared channel, where the configured first neural network block is the result of adjusting parameters of the first neural network block.

Figure 21:
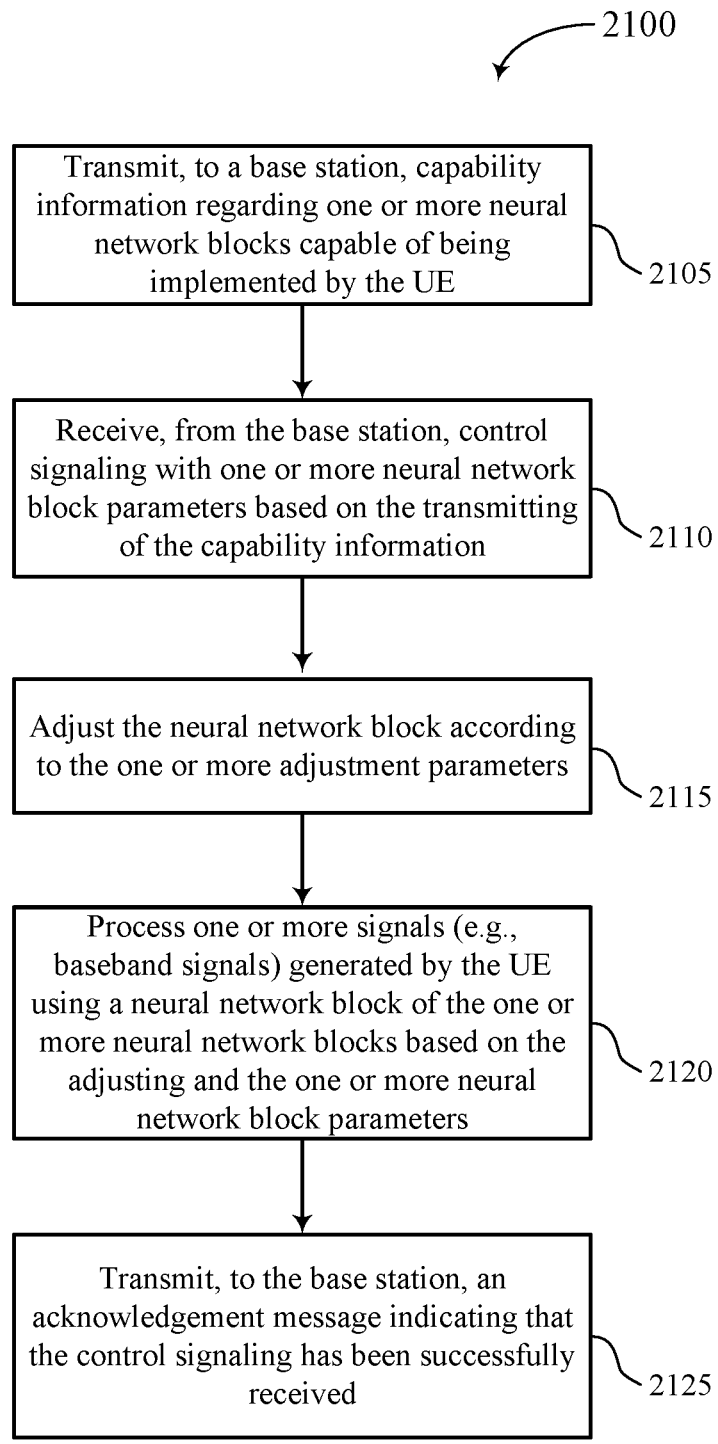

FIG. 21 shows a process flow diagram illustrating a method 2100 that supports neural network configuration for wireless communication system assistance in accordance with aspects of the present disclosure. The operations of method 2100 may be implemented by a UE 115 or its components as described herein. For example, the operations of method 2100 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

In block 2105, the UE may transmit, to a base station, capability information regarding one or more neural network blocks capable of being implemented by the UE. The operations of block 2105 may be performed according to the methods described herein. In some examples, aspects of the operations of block 2105 may be performed by a capability information manager as described with reference to FIGS. 7 through 8.

In some examples, the UE may identify the default network function block, wherein the one or more neural network blocks supported by the UE includes the default network function block.

In block 2110, the UE may receive, from the base station, control signaling with one or more neural network block parameters based on the capability information transmitted by the UE in operations of block 2105. The operations of block 2110 may be performed according to the methods described herein. In some examples, aspects of the operations of block 2110 may be performed by a neural network block parameter manager as described with reference to FIGS. 7 through 8.

According to some examples, the control signaling may include a resource allocation message including the one or more neural network block parameters for configuring network components. The resource allocation message may include a downlink control information message, a media access control element, or radio resource control message. The network components may include one or more cell groups, one or more component carriers associated with each of the one or more cell groups, one or more bandwidth parts associated with each of the one or more component carriers, or any such combination. In some examples, the one or more cell groups can include a master cell group, a secondary cell group, a supplementary cell group, or any such combination.

In some examples, receiving control signaling from the base station may include receiving the control signaling over a physical downlink control channel, wherein the one or more neural network block parameters are received over the physical downlink control channel, and configuring the first neural network block (e.g., active neural network block to process baseband signals) in place of a default network function block of the UE based at least in part on receiving the one or more neural network block parameters, wherein processing one or more signals, e.g., baseband signals, using the first neural network block is based at least in part on the configuring. In some examples, receiving control signaling from the base station may include receiving configuration information over a physical downlink control channel, wherein the configuration information includes an indication of one or more added algorithms for the first neural network block, one or more released algorithms from the default network function block, or a combination thereof. Configuration information received from the base station may indicate a new network function block to be the default network function block, wherein identifying the default network function block is based at least in part on receiving the control signaling.

In some examples, the UE may monitor for the configuration information based at least in part on receiving the resource allocation message, wherein receiving the configuration information is based at least in part on the monitoring.

In some examples, receiving the control signaling may further include identifying a set of neural network blocks stored by the UE, wherein the one or more neural network blocks supported by the UE includes the set of neural network blocks, receiving an indication of the first neural network block of the set of neural network blocks, and identifying the first neural network block of the set of neural network blocks based at least in part on receiving the indication of the first neural network block, wherein processing the one or more signals, e.g., baseband signals, using the first neural network block is based at least in part on identifying the first neural network block.

According to some examples, the UE may receive a downlink message that includes the one or more neural network block parameters, wherein receiving the one or more neural network block parameters is based at least in part on receiving the downlink message. The downlink message may include a downlink control information message, a media access control element, a radio resource control message, or a combination thereof.

In some examples, upon receiving the one or more neural network block parameters, the UE may initiate a counter of symbols, a counter of slots, or a combination thereof, wherein processing the one or more signals, e.g., baseband signals, using the first neural network block is based at least in part on the counter of symbols, the counter of slots, or the combination thereof satisfying a threshold. Upon receiving the one or more neural network block parameters, the UE may initiate a timer, wherein processing the one or more signals using the first neural network block is based at least in part on an expiration of the timer.

According to some examples, the UE may receive, from the base station, additional control signaling including one or more additional neural network block parameters. The UE may transmit, to the base station, a negative acknowledgement message indicating that the one or more additional neural network block parameters failed to be successfully decoded. The UE may determine a priority status of the one or more additional neural network block parameters, wherein transmitting the negative acknowledgement message is based at least in part on the priority status.

In some examples, the UE may receive, from the base station, second capability information indicating that the base station supports at least one neural network block, wherein transmitting the capability information to the base station is based at least in part on receiving the second capability information. The second capability information may be included in a system information block, a master information block, a downlink control information message, a media access control element, or a radio resource control message, or a combination thereof.

In block 2115, the UE may adjust the neural network block according to the one or more adjustment parameters, and process the one or more signals, e.g., baseband signals, using the adjusted neural network block. The one or more adjustment parameters may include an activation indication for one or more nodes of the first neural network block, a deactivation indication of the one or more nodes of the first neural network block, a weight value for the one or more nodes of the first neural network block, an adjustment to a weight value for a submodule of the first neural network block, or a bias value for the one or more nodes of the first neural network block, or any such combination. The operations of block 2115 may be performed according to the methods described herein. In some examples, aspects of the operations of block 2115 may be performed by an adjustment parameter manager as described with reference to FIG. 8.

In some examples, adjusting the first neural network block according to the one or more adjustment parameters may further include performing a first operation on the one or more signals, e.g., baseband signals, using a first node of the first neural network block based at least in part on a first weight value indicated by the one or more adjustment parameters, and performing a second operation on the one or more signals, e.g., baseband signals, using a second node of the first neural network block based at least in part on a second weight value indicated by the one or more adjustment parameters, wherein processing the one or more signals using the first neural network block is based at least in part on performing the first operation and the second operation. Adjusting the first neural network block may further include identifying the first neural network block having one or more configuration options, wherein the one or more neural network blocks supported by the UE includes the first neural network block.

In some examples, the first neural network block may be configured to perform channel estimation for the one or more baseband signals, channel state information compression for the one or more baseband signals, or a combination thereof.

According to some examples, the one or more neural network block parameters may include one or more input values, a number of layers of the first neural network block, a number of nodes for one or more layers of the first neural network block, a connection map across the one or more layers of the first neural network block, one or more activation functions for one or more nodes of the first neural network block, one or more weight values for the one or more nodes of the first neural network block, or one or more bias values for the one or more nodes of the first neural network block, or a combination thereof.

In some examples, the capability information may be communicated using an uplink control message on an uplink control channel or an uplink data message on a physical uplink shared channel, or a combination thereof.

In block 2120, the UE may process one or more signals, e.g., baseband signals, generated by the UE using a neural network block of the one or more neural network blocks based on the adjustments and the one or more neural network block parameters. The operations of block 2120 may be performed according to the methods described herein. In some examples, aspects of the operations of block 2120 may be performed by a neural network block manager as described with reference to FIGS. 7 through 8.

In some examples, the UE may transmit a request message to use a second neural network block (e.g., additional active neural network block) different than the first neural network block to process the one or more signals, e.g., baseband signals, using the second neural network block based at least in part on transmitting the request message. The UE may receive, from the base station, an acknowledgment message based at least in part on the transmitting of the request message, wherein processing the one or more signals using the second neural network block is based at least in part on receiving the acknowledgement message.

According to some examples, the UE may initiate a timer, wherein processing the one or more signals, e.g., baseband signals, using the first neural network block is based at least in part on an expiration of the timer. The UE may further determine that the timer has expired, and may process, based at least in part on determining that the timer has expired, the one or more signals, e.g., baseband signals, using a default neural network block different than the first neural network block According to some examples, the UE may receive, from the base station, a request for feedback information about a performance of the first neural network block; and may transmit, based at least in part on processing the one or more signals, e.g., baseband signals, using the first neural network block and the request, a report comprising the feedback information about the performance of the first neural network block to the base station. The request may be communicated using a DCI message, a MAC-CE message, or an RRC message, and the feedback information may be communicated using an uplink control message on an uplink control channel or an uplink data message on a physical uplink shared channel In some examples, the feedback information may include processed data, unprocessed data, complete measurements, partial measurements, or a combination thereof.

In block 2125, the UE may transmit, to the base station, an acknowledgement message indicating that the control signaling has been successfully received. The operations of block 2125 may be performed according to the methods described herein. In some examples, aspects of the operations of block 2125 may be performed by an acknowledgement manager as described with reference to FIGS. 7 through 8.

In some examples, the UE may transmit a configuration of a configured first neural network block to the base station over a physical uplink control channel or a physical uplink shared channel, where the configured first neural network block is the result of adjusting parameters of the first neural network block.

Figure 22:
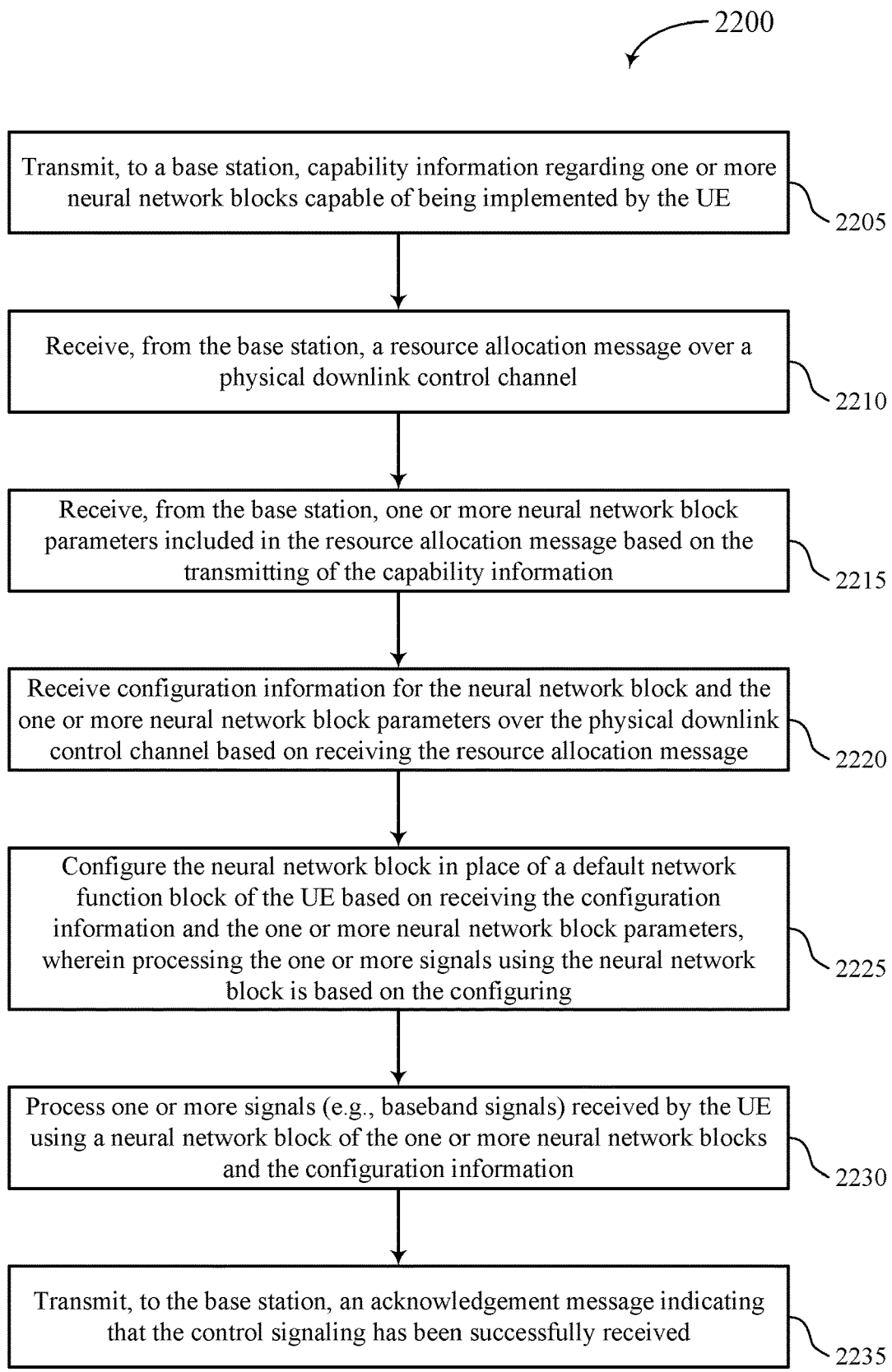

FIG. 22 shows a process flow diagram illustrating a method 2200 that supports neural network configuration for wireless communication system assistance in accordance with aspects of the present disclosure. The operations of method 2200 may be implemented by a UE 115 or its components as described herein. For example, the operations of method 2200 may be performed by a communications manager as described with reference to FIGS. 6 through 9. In some examples, a UE may execute a set of instructions to control the functional elements of the UE to perform the functions described below. Additionally, or alternatively, a UE may perform aspects of the functions described below using special-purpose hardware.

In block 2205, the UE may transmit, to a base station, capability information regarding one or more neural network blocks capable of being implemented by the UE. The operations of block 2205 may be performed according to the methods described herein. In some examples, aspects of the operations of block 2205 may be performed by a capability information manager as described with reference to FIGS. 7 through 8.

In some examples, the UE may identify the default network function block, wherein the one or more neural network blocks supported by the UE includes the default network function block.

In some examples, the capability information may be communicated using an uplink control message on an uplink control channel or an uplink data message on a physical uplink shared channel, or a combination thereof.

In block 2210, the UE may receive, from the base station, a resource allocation message over a physical downlink control channel. The operations of block 2210 may be performed according to the methods described herein. In some examples, aspects of the operations of block 2210 may be performed by a resource allocation manager as described with reference to FIG. 8. The resource allocation message may include a downlink control information message, a media access control element, or radio resource control message.

In block 2215, the UE may receive, from the base station, one or more neural network block parameters included in the resource allocation message based on the capability information transmitted in the operations of block 2205. The operations of block 2215 may be performed according to the methods described herein. In some examples, aspects of the operations of block 2215 may be performed by a neural network block parameter manager as described with reference to FIGS. 7 through 8.

According to some examples, the UE may receive a downlink message that includes the one or more neural network block parameters, wherein receiving the one or more neural network block parameters is based at least in part on receiving the downlink message. The downlink message may include a downlink control information message, a media access control element, a radio resource control message, or a combination thereof.

In some examples, upon receiving the one or more neural network block parameters, the UE may initiate a counter of symbols, a counter of slots, or a combination thereof, wherein processing the one or more signals, e.g., baseband signals, using the first neural network block is based at least in part on the counter of symbols, the counter of slots, or the combination thereof satisfying a threshold. Upon receiving the one or more neural network block parameters, the UE may initiate a timer, wherein processing the one or more signals using the first neural network block is based at least in part on an expiration of the timer.

According to some examples, the UE may receive, from the base station, additional control signaling including one or more additional neural network block parameters. The UE may transmit, to the base station, a negative acknowledgement message indicating that the one or more additional neural network block parameters failed to be successfully decoded. The UE may determine a priority status of the one or more additional neural network block parameters, wherein transmitting the negative acknowledgement message is based at least in part on the priority status.

In some examples, the UE may receive, from the base station, second capability information indicating that the base station supports at least one neural network block, wherein transmitting the capability information to the base station is based at least in part on receiving the second capability information. The second capability information may be included in a system information block, a master information block, a downlink control information message, a media access control element, or a radio resource control message, or a combination thereof.

According to some examples, the one or more neural network block parameters may include one or more input values, a number of layers of the first neural network block, a number of nodes for one or more layers of the first neural network block, a connection map across the one or more layers of the first neural network block, one or more activation functions for one or more nodes of the first neural network block, one or more weight values for the one or more nodes of the first neural network block, or one or more bias values for the one or more nodes of the first neural network block, or a combination thereof.

In block 2220, the UE may receive configuration information for the neural network block and the one or more neural network block parameters over the physical downlink control channel based on receiving the resource allocation message. The operations of block 2220 may be performed according to the methods described herein. In some examples, aspects of the operations of block 2220 may be performed by a neural network block parameter manager as described with reference to FIGS. 7 through 8.

In some examples, the configuration information may include an indication of one or more added algorithms for the first neural network block, one or more released algorithms from the default network function block, or a combination thereof. Configuration information received from the base station may indicate a new network function block to be the default network function block, wherein identifying the default network function block is based at least in part on receiving the control signaling. In some examples, the UE may monitor for the configuration information based at least in part on receiving the resource allocation message, wherein receiving the configuration information is based at least in part on the monitoring.

In some examples, receiving the configuration information may further include identifying a set of neural network blocks stored by the UE, wherein the one or more neural network blocks supported by the UE includes the set of neural network blocks, receiving an indication of the first neural network block (e.g., active neural network block to process baseband signals) of the set of neural network blocks, and identifying the first neural network block of the set of neural network blocks based at least in part on receiving the indication of the first neural network block, wherein processing the one or more signals using the first neural network block is based at least in part on identifying the first neural network block.

In block 2225, the UE may configure the neural network block in place of a default network function block of the UE based upon receiving the configuration information and the one or more neural network block parameters, wherein processing the one or more signals is performed using the configured neural network block. The operations of block 2225 may be performed according to the methods described herein. In some examples, aspects of the operations of block 2225 may be performed by a configuration information manager as described with reference to FIG. 8.

In block 2230, the UE may process one or more signals, e.g., baseband signals, generated by the UE using a neural network block of the one or more neural network blocks and the configuration information. In some examples, the first neural network block may be configured to perform channel estimation for the one or more baseband signals, channel state information compression for the one or more baseband signals, or a combination thereof. The operations of block 2230 may be performed according to the methods described herein. In some examples, aspects of the operations of block 2230 may be performed by a neural network block manager as described with reference to FIGS. 7 through 8.

In some examples, the UE may transmit a request message to use a second neural network block different than the first neural network block to process the one or more signals, e.g., baseband signals, using the second neural network block based at least in part on transmitting the request message. The UE may receive, from the base station, an acknowledgment message based at least in part on the transmitting of the request message, wherein processing the one or more signals using the second neural network block is based at least in part on receiving the acknowledgement message.

According to some examples, the UE may initiate a timer, wherein processing the one or more signals, e.g., baseband signals, using the first neural network block is based at least in part on an expiration of the timer. The UE may further determine that the timer has expired, and may process, based at least in part on determining that the timer has expired, the one or more signals, e.g., baseband signals, using a default neural network block different than the first neural network block.

According to some examples, the UE may receive, from the base station, a request for feedback information about a performance of the first neural network block; and may transmit, based at least in part on processing the one or more signals, e.g., baseband signals, using the first neural network block and the request, a report comprising the feedback information about the performance of the first neural network block to the base station. The request may be communicated using a DCI message, MAC-CE message, or an RRC message, and the feedback information may be communicated using an uplink control message on an uplink control channel or an uplink data message on a physical uplink shared channel In some examples, the feedback information may include processed data, unprocessed data, complete measurements, partial measurements, or a combination thereof.

In block 2235, the UE may transmit, to the base station, an acknowledgement message indicating that the control signaling has been successfully received. The operations of block 2235 may be performed according to the methods described herein. In some examples, aspects of the operations of block 2235 may be performed by an acknowledgement manager as described with reference to FIGS. 7 through 8.

In some examples, the UE may transmit a configuration of a configured first neural network block to the base station over a physical uplink control channel or a physical uplink shared channel, where the configured first neural network block is the result of adjusting parameters of the first neural network block.

Figure 23:
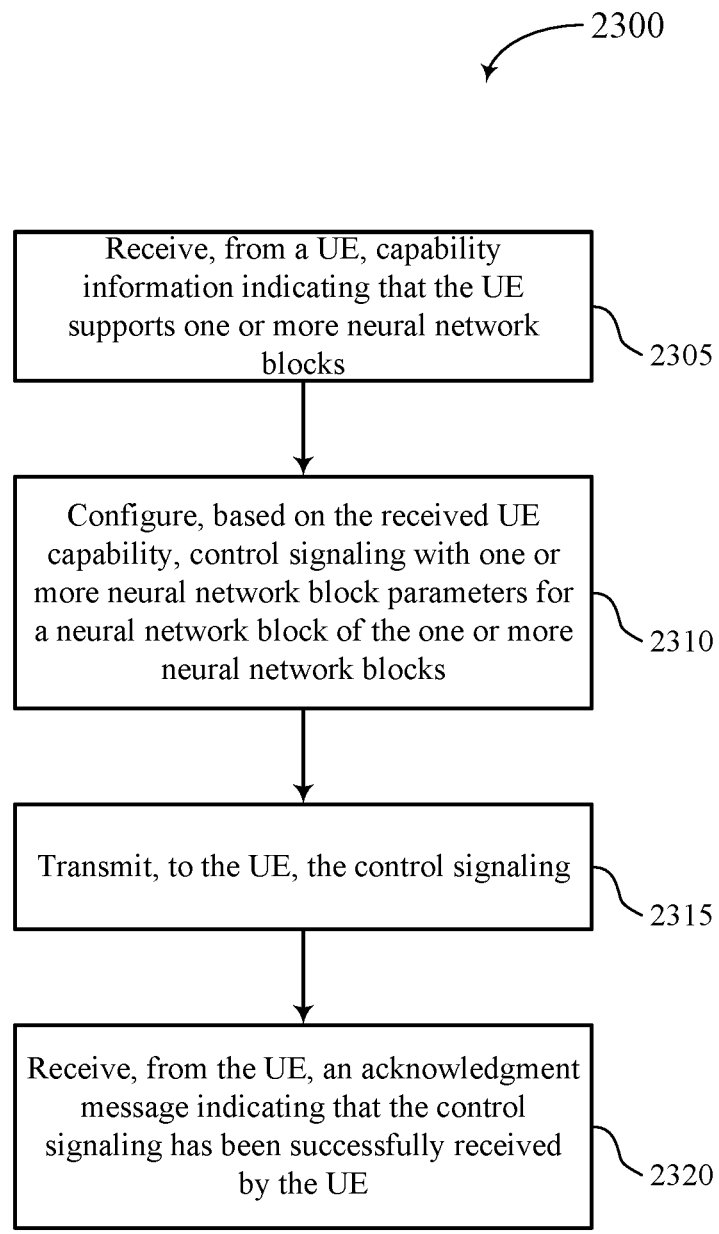

FIG. 23 shows a process flow diagram illustrating a method 2300 that supports neural network configuration for wireless communication system assistance in accordance with aspects of the present disclosure. The operations of method 2300 may be implemented by a base station 105 or its components as described herein. For example, the operations of method 2300 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

In block 2305, the base station may receive, from a UE, capability information indicating that the UE supports one or more neural network blocks. The operations of block 2305 may be performed according to the methods described herein. In some examples, aspects of the operations of block 2305 may be performed by a capability information manager as described with reference to FIGS. 11 through 12.

According to some examples, the capability information may be communicated using an uplink control message on an uplink control channel or an uplink data message on a physical uplink shared channel, or a combination thereof.

In some examples, the base station may transmit, to the UE, second capability information indicating that the base station supports at least one neural network block, wherein receiving the capability information from the UE is based at least in part on transmitting the second capability information. The second capability information may be included in a system information block, a master information block, a downlink control information message, a media access control element, or a radio resource control message, or a combination thereof.

In block 2310, the base station may configure, based on the received UE capability, control signaling with one or more neural network block parameters for a neural network block of the one or more neural network blocks. The operations of block 2310 may be performed according to the methods described herein. In some examples, aspects of the operations of block 2310 may be performed by a neural network block parameter manager as described with reference to FIGS. 11 through 12.

In some examples, the one or more neural network block parameters further include one or more adjustment parameters to the first neural network block used to process one or more signals, e.g., baseband signals, by the UE. The control signaling may include a resource allocation message including the one or more neural network block parameters for configuring network components. The resource allocation message may include a downlink control information message, a media access control element, or radio resource control message. Network components may include one or more cell groups, one or more component carriers associated with each of the one or more cell groups, one or more bandwidth parts associated with each of the one or more component carriers, or a combination thereof. In some examples, the one or more cell groups may include a master cell group, a secondary cell group, a supplementary cell group, or a combination thereof.

According to some examples, the one or more adjustment parameters may include an activation indication for one or more nodes of a first submodule of the first neural network block, a deactivation indication for the one or more nodes of the first submodule of the first neural network block, a weight value for the one or more nodes of the first submodule of the first neural network block, or a bias value for the one or more nodes of the first submodule of the first neural network block, or a combination thereof. The one or more adjustment parameters to the first neural network block may include a first adjustment to a first weight value for a first node of the first neural network block or a second adjustment to a second weight value for a second node of the first neural network block, or both.

According to some examples, the one or more neural network block parameters may include one or more input values, a number of layers of the first neural network block, a number of nodes for one or more layers of the first neural network block, a connection map across the one or more layers of the first neural network block, one or more activation functions for one or more nodes of the first neural network block, one or more weight values for the one or more nodes of the first neural network block, or one or more bias values for the one or more nodes of the first neural network block, or a combination thereof.

In some examples, transmitting the control signaling may further include transmitting configuration information for the first neural network block and the one or more neural network block parameters over a physical downlink control channel, wherein the configuration information includes instructions for the UE to configure the first neural network block in place of a default network function block of the UE. The configuration information may include an indication of one or more added algorithms for the first neural network block, one or more released algorithms from the default network function block, or a combination thereof. In some examples, the one or more neural network block types supported by the UE may include the default network function block. According to some examples, transmitting the control signaling may further include transmitting control information to the UE that indicates a new network function block to be the default network function block, wherein the control information is included in the control signaling. In some examples, transmitting the control signaling may further include transmitting an indication of the first neural network block of a set of neural network blocks stored by the UE, wherein the one or more neural network blocks supported by the UE includes the set of neural network blocks.

In some examples, the base station may receive a request message from the UE to use a second neural network block different than the first neural network block, and may transmit an acknowledgement message to the UE based at least in part on the receiving of the request message.

According to some examples, the base station may transmit a downlink message that includes the one or more neural network block parameters, wherein the one or more neural network block parameters transmitted as part of the downlink message In some examples, base station may transmit an indication of a timer and an instruction for the UE to initiate the timer upon receiving the one or more neural network block parameters. In some examples, the base station may transmit an indication of a counter of symbols, a counter of slots, or a combination thereof and an instruction for the UE to initiate the counter of symbols, the counter of slots, or the combination thereof upon receiving the one or more neural network block parameters.

In block 2315, the base station may transmit, to the UE, the control signaling. The operations of block 2315 may be performed according to the methods described herein. In some examples, aspects of the operations of block 2315 may be performed by a neural network block parameter manager as described with reference to FIGS. 11 through 12.

In some examples, the base station may transmit, to the UE, one or more additional neural network block parameters, and may receive a negative acknowledgement message indicating that the one or more additional neural network block parameters failed to be successfully decoded. Receiving the negative acknowledgement message may be based at least in part on a priority status of the one or more additional neural network block parameters.

According to some examples, the base station may transmit, to the UE, a request for feedback information about a performance of the first neural network block, and may receive, based at least in part on the request for the feedback information about the performance of the first neural network block, a report comprising the feedback information about the performance of the first neural network block. The request may be communicated using a DCI message, MAC-CE message, or an RRC message, and the feedback information may be communicated using an uplink control message on an uplink control channel or an uplink data message on a physical uplink shared channel. The feedback information may include processed data, unprocessed data, complete measurements, partial measurements, or a combination thereof.

In some examples, transmitting the control signaling may further include transmitting, to the UE, the control signaling over a physical downlink control channel, wherein the one or more neural network block parameters are transmitted over the physical downlink control channel according to the control signaling.

In block 2320, the base station may receive, from the UE, an acknowledgment message indicating that the control signaling has been successfully received by the UE. The operations of block 2320 may be performed according to the methods described herein. In some examples, aspects of the operations of block 2320 may be performed by an acknowledgement manager as described with reference to FIGS. 11 through 12.

In some examples, the first neural network block may be configured to perform channel estimation for one or more signals, e.g., baseband signals, channel state information compression for the one or more signals, e.g., baseband signals, or a combination thereof.

According to some examples, the base station may receive a configuration of a configured first neural network block from the UE over a physical uplink control channel or a physical uplink shared channel, wherein the configured first neural network block has been configured by the UE based at least in part on the one or more neural network block parameters.

Figure 24:
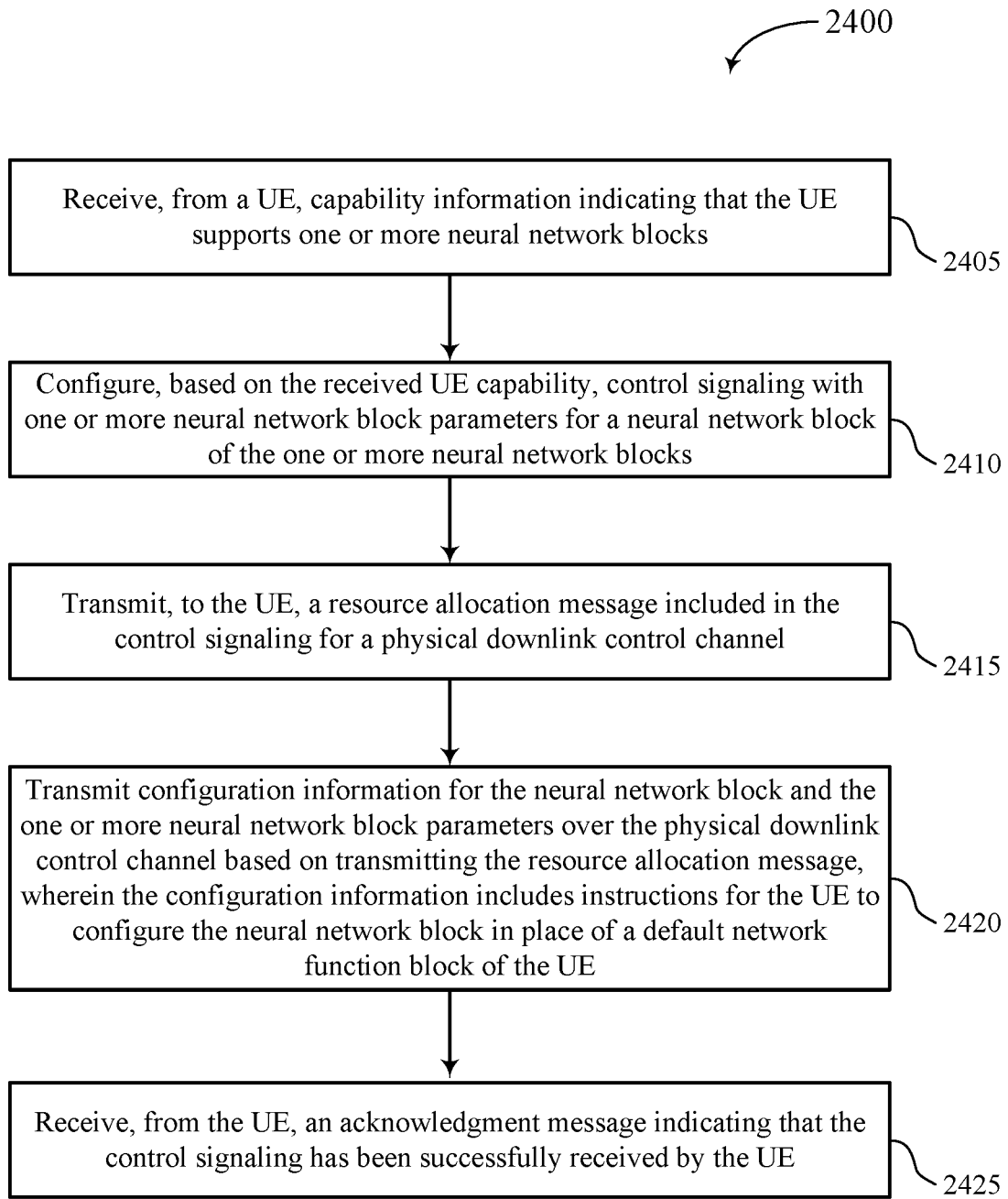

FIG. 24 shows a process flow diagram illustrating a method 2400 that supports neural network configuration for wireless communication system assistance in accordance with aspects of the present disclosure. The operations of method 2400 may be implemented by a base station 105 or its components as described herein. For example, the operations of method 2400 may be performed by a communications manager as described with reference to FIGS. 10 through 13. In some examples, a base station may execute a set of instructions to control the functional elements of the base station to perform the functions described below. Additionally, or alternatively, a base station may perform aspects of the functions described below using special-purpose hardware.

In block 2405, the base station may receive, from a UE, capability information indicating that the UE supports one or more neural network blocks. The operations of block 2405 may be performed according to the methods described herein. In some examples, aspects of the operations of block 2405 may be performed by a capability information manager as described with reference to FIGS. 5, and 10 through 13.

According to some examples, the capability information may be communicated using an uplink control message on an uplink control channel or an uplink data message on a physical uplink shared channel, or a combination thereof.

In some examples, the base station may transmit, to the UE, second capability information indicating that the base station supports at least one neural network block, wherein transmitting the capability information from the UE is based at least in part on receiving the second capability information. The second capability information may be included in a system information block, a master information block, a downlink control information message, a media access control element, or a radio resource control message, or a combination thereof.

In block 2410, the base station may configure, based on the received UE capability, control signaling with one or more neural network block parameters for a neural network block of the one or more neural network blocks. The operations of block 2410 may be performed according to the methods described herein. In some examples, aspects of the operations of block 2410 may be performed by a neural network block parameter manager as described with reference to FIGS. 11 through 12.

In some examples, the one or more neural network block parameters further include one or more adjustment parameters to the first neural network block used to process one or more signals, e.g., baseband signals, by the UE. The control signaling may include a resource allocation message including the one or more neural network block parameters for configuring network components. The resource allocation message may include a downlink control information message, a media access control element, or radio resource control message. Network components may include one or more cell groups, one or more component carriers associated with each of the one or more cell groups, one or more bandwidth parts associated with each of the one or more component carriers, or a combination thereof. In some examples, the one or more cell groups may include a master cell group, a secondary cell group, a supplementary cell group, or a combination thereof.

According to some examples, the one or more adjustment parameters may include an activation indication for one or more nodes of the first submodule of the first neural network block, a deactivation indication for the one or more nodes of the first neural network block, a weight value for the one or more nodes of the first submodule of the first neural network block, or a bias value for the one or more nodes of the first submodule of the first neural network block, or a combination thereof. The one or more adjustment parameters to the first neural network block may include a first adjustment to a first weight value for a first node of the first neural network block or a second adjustment to a second weight value for a second node of the first neural network block, or both.

According to some examples, the one or more neural network block parameters may include one or more input values, a number of layers of the first neural network block, a number of nodes for one or more layers of the first neural network block, a connection map across the one or more layers of the first neural network block, one or more activation functions for one or more nodes of the first neural network block, one or more weight values for the one or more nodes of the first neural network block, or one or more bias values for the one or more nodes of the first neural network block, or a combination thereof.

According to some examples, transmitting the control signaling may further include transmitting control information to the UE that indicates a new network function block to be the default network function block, wherein the control information is included in the control signaling. In some examples, transmitting the control signaling may further include transmitting an indication of the first neural network block of a set of neural network blocks stored by the UE, wherein the one or more neural network blocks supported by the UE includes the set of neural network blocks.

In block 2415, the base station may transmit, to the UE, a resource allocation message included in the control signaling for a physical downlink control channel. The operations of block 2415 may be performed according to the methods described herein. In some examples, aspects of the operations of block 2415 may be performed by a resource allocation manager as described with reference to FIG. 12.

In block 2420, the base station may transmit configuration information for the neural network block and the one or more neural network block parameters over the physical downlink control channel based on transmitting the resource allocation message, wherein the configuration information includes instructions for the UE to configure the neural network block in place of a default network function block of the UE.

In some examples, the configuration information may include instructions for the UE to configure the first neural network block in place of a default network function block of the UE. The configuration information may include an indication of one or more added algorithms for the first neural network block, one or more released algorithms from the default network function block, or a combination thereof. In some examples, the one or more neural network block types supported by the UE may include the default network function block.

In some examples, the base station may receive a request message from the UE to use a second neural network block different than the first neural network block, and may transmit an acknowledgement message to the UE based at least in part on the receiving of the request message.

According to some examples, the base station may transmit a downlink message that includes the one or more neural network block parameters, wherein the one or more neural network block parameters transmitted as part of the downlink message.

In some examples, the base station may transmit an indication of a timer and an instruction for the UE to initiate the timer upon receiving the one or more neural network block parameters. In some examples, the base station may transmit an indication of a counter of symbols, a counter of slots, or a combination thereof and an instruction for the UE to initiate the counter of symbols, the counter of slots, or the combination thereof upon receiving the one or more neural network block parameters.

In some examples, the base station may transmit, to the UE, one or more additional neural network block parameters, and may receive a negative acknowledgement message indicating that the one or more additional neural network block parameters failed to be successfully decoded. Receiving the negative acknowledgement message may be based at least in part on a priority status of the one or more additional neural network block parameters.

According to some examples, the base station may transmit, to the UE, a request for feedback information about a performance of the first neural network block, and may receive, based at least in part on the request for the feedback information about the performance of the first neural network block, a report comprising the feedback information about the performance of the first neural network block. The request may be communicated using a DCI message, MAC-CE message, or an RRC message, and the feedback information may be communicated using an uplink control message on an uplink control channel or an uplink data message on a physical uplink shared channel. The feedback information may include processed data, unprocessed data, complete measurements, partial measurements, or a combination thereof.

In some examples, transmitting the control signaling may further include transmitting, to the UE, the control signaling over a physical downlink control channel, wherein the one or more neural network block parameters are transmitted over the physical downlink control channel according to the control signaling.

In block 2425, the base station may receive, from the UE, an acknowledgment message indicating that the control signaling has been successfully received by the UE. The operations of block 2425 may be performed according to the methods described herein. In some examples, aspects of the operations of block 2425 may be performed by an acknowledgement manager as described with reference to FIGS. 11 through 12.

In some examples, the first neural network block may be configured to perform channel estimation for one or more signals, e.g., baseband signals, channel state information compression for the one or more signals, e.g., baseband signals, or a combination thereof.

According to some examples, the base station may receive a configuration of a configured first neural network block from the UE over a physical uplink control channel or a physical uplink shared channel, wherein the configured first neural network block has been configured by the UE based at least in part on the one or more neural network block parameters.

Implementation examples are described in the following paragraphs. While some of the following implementation examples are described in terms of example methods, further example implementations may include: the example methods discussed in the following paragraphs implemented by a UE comprising a processor configured with processor-executable instructions to perform operations of the methods of the following implementation examples; the example methods discussed in the following paragraphs implemented by a UE comprising means for performing functions of the methods of the following implementation examples; the example methods discussed in the following paragraphs implemented in a computer program product comprising processor-executable instructions configured to cause a processor perform operations of the methods of the following implementation examples; and the example methods discussed in the following paragraphs may be implemented as a non-transitory processor-readable storage medium having stored thereon processor-executable instructions configured to cause a processor of a UE to perform the operations of the methods of the following implementation examples.

Example 1. A method for wireless communications performed by a processor of a user equipment (UE), including: transmitting, to a base station, capability information indicating one or more neural network blocks supported by the UE; receiving, from the base station, control signaling with one or more neural network block parameters based at least in part on the transmitting of the capability information; processing one or more signals generated by the UE using a first neural network block of the one or more neural network blocks and the one or more neural network block parameters.

Example 2. The method of example 1, wherein the one or more neural network block parameters further include one or more adjustment parameters to the first neural network block used to process the one or more signals, e.g., baseband signals, by the UE, the method further including: adjusting the first neural network block according to the one or more adjustment parameters, wherein processing the one or more signals, using the first neural network block is based at least in part on the adjusting.

Example 3. The method of either example 1 or 2, wherein the control signaling includes a resource allocation message including the one or more neural network block parameters for configuring network components.

Example 4. The method of example 3, wherein the network components include one or more cell groups, one or more component carriers associated with each of the one or more cell groups, one or more bandwidth parts associated with each of the one or more component carriers, or a combination thereof.

Example 5. The method of example 4, wherein the one or more cell groups include a master cell group, a secondary cell group, a supplementary cell group, or a combination thereof.

Example 6. The method of example 5, the resource allocation message includes a downlink control information message, a media access control element, or radio resource control message.

Example 7. The method of example 3, wherein the one or more adjustment parameters include an activation indication for one or more nodes of the first neural network block, a deactivation indication of the one or more nodes of the first neural network block, a weight value for the one or more nodes of the first neural network block, an adjustment to a weight value for a submodule, or a bias value for the one or more nodes of the first neural network block, or a combination thereof.

Example 8. The method of example 3, further including: performing a first operation on the one or more signals, e.g., baseband signals, using a first submodule of the first neural network block based at least in part on a first weight value indicated by the one or more adjustment parameters; and performing a second operation on the one or more signals, e.g., baseband signals, using a second submodule of the first neural network block based at least in part on a second weight value indicated by the one or more adjustment parameters, wherein processing the one or more signals using the first neural network block is based at least in part on performing the first operation and the second operation.

Example 9. The method of example 3, further including: identifying the first neural network block having one or more configuration options, wherein the one or more neural network blocks supported by the UE includes the first neural network block.

Example 10. The method of examples 1-9, wherein receiving control signaling may further include: receiving, from the base station, the control signaling over a physical downlink control channel, wherein the one or more neural network block parameters are received over the physical downlink control channel; and configuring the first neural network block in place of a default network function block of the UE based at least in part on receiving the one or more neural network block parameters, wherein processing the one or more signals using the first neural network block is based at least in part on the configuring.

Example 11. The method of example 10, further including: transmitting the configuration of a configured first neural network block to the base station over a physical uplink control channel or a physical uplink shared channel.

Example 12. The method of examples 1-11, wherein receiving the control signaling further includes: receiving configuration information over a physical downlink control channel, wherein the configuration information includes an indication of one or more added algorithms for the first neural network block, one or more released algorithms from a default network function block, or a combination thereof.

Example 13. The method of example 12, further including: identifying the default network function block, wherein the one or more neural network blocks supported by the UE includes the default network function block.

Example 14. The method of example 13, further including: receiving configuration information from the base station that indicates a new network function block to be the default network function block, wherein identifying the default network function block is based at least in part on receiving the control signaling.

Example 15. The method of example 12, further including: monitoring for the configuration information based at least in part on receiving the resource allocation message, wherein receiving the configuration information is based at least in part on the monitoring.

Example 16. The method of examples 1-15, further including: transmitting, by the UE, a request message to use a second neural network block different than the first neural network block; and processing one or more signals, e.g., baseband signals, using the second neural network block based at least in part on transmitting the request message.

Example 17. The method of example 16, further including: receiving, from the base station, an acknowledgment message based at least in part on the transmitting of the request message, wherein processing the one or more signals using the second neural network block is based at least in part on receiving the acknowledgement message.

Example 18. The method of examples 1-17, wherein receiving the control signaling with the one or more neural network block parameters further includes: identifying a set of neural network blocks stored by the UE, wherein the one or more neural network blocks supported by the UE includes the set of neural network blocks; receiving an indication of the first neural network block of the set of neural network blocks; and identifying the first neural network block of the set of neural network blocks based at least in part on receiving the indication of the first neural network block, wherein processing the one or more signals using the first neural network block is based at least in part on identifying the first neural network block.

Example 19. The method of examples 1-18, further including: receiving a downlink message that includes the one or more neural network block parameters, wherein receiving the one or more neural network block parameters is based at least in part on receiving the downlink message.

Example 20. The method of example 19, wherein the downlink message includes a downlink control information message, a media access control element, a radio resource control message, or a combination thereof.

Example 21. The method of examples 1-20, further including: initiating, upon receiving the one or more neural network block parameters, a timer, wherein processing the one or more signals using the first neural network block is based at least in part on an expiration of the timer.

Example 22. The method of examples 1-21, further including: initiating, upon receiving the one or more neural network block parameters, a counter of symbols, a counter of slots, or a combination thereof, wherein processing the one or more signals using the first neural network block is based at least in part on the counter of symbols, the counter of slots, or the combination thereof satisfying a threshold.

Example 23. The method of examples 1-22, further including: initiating, upon processing the one or more signals using the first neural network block, a timer; determining that the timer has expired; and processing, based at least in part on determining that the timer has expired, the one or more signals using a default neural network block different than the first neural network block.

Example 24. The method of examples 1-23, further including: receiving, from the base station, additional control signaling including one or more additional neural network block parameters; and transmitting, to the base station, a negative acknowledgement message indicating that the one or more additional neural network block parameters failed to be successfully decoded.

Example 25. The method of example 24, further including: determining a priority status of the one or more additional neural network block parameters, wherein transmitting the negative acknowledgement message is based at least in part on the priority status.

Example 26. The method of examples 1-25, further including: receiving, from the base station, a request for feedback information about a performance of the first neural network block; and transmitting, based at least in part on processing the one or more signals using the first neural network block and the request, a report including the feedback information about the performance of the first neural network block to the base station.

Example 27. The method of example 26, wherein: the request is communicated using a DCI message, a MAC-CE message, or an RRC message; and the feedback information is communicated using an uplink control message on an uplink control channel or an uplink data message on a physical uplink shared channel.

Example 28. The method of example 26, wherein the feedback information includes processed data, unprocessed data, complete measurements, partial measurements, or a combination thereof.

Example 29. The method of examples 1-28, wherein the first neural network block may be configured to perform channel estimation for the one or more baseband signals, channel state information compression for the one or more baseband signals, or a combination thereof.

Example 30. The method of examples 1-29, further including: receiving, from the base station, second capability information indicating that the base station supports at least one neural network block, wherein transmitting the capability information to the base station is based at least in part on receiving the second capability information.

Example 31. The method of example 30, wherein the second capability information is included in a system information block, a master information block, a downlink control information message, a media access control element, or a radio resource control message, or a combination thereof.

Example 32. The method of examples 1-31, wherein the one or more neural network block parameters include one or more input values, a number of layers of the first neural network block, a number of nodes for one or more layers of the first neural network block, a connection map across the one or more layers of the first neural network block, one or more activation functions for one or more nodes of the first neural network block, one or more weight values for the one or more nodes of the first neural network block, or one or more bias values for the one or more nodes of the first neural network block, or a combination thereof.

Example 33. The method of any of examples 1-32, wherein the capability information is communicated using an uplink control message on an uplink control channel or an uplink data message on a physical uplink shared channel, or a combination thereof.

Example 34. The method of any of examples 1-33, further including transmitting, to the base station, an acknowledgement message indicating that the control signaling has been successfully received.

Example 35. A method for wireless communications performed by a processor at a base station, including: receiving, from a user equipment (UE), UE capability information indicating that the UE supports one or more neural network blocks; configuring, based on the received UE capability information, control signaling with one or more neural network block parameters for a first neural network block of one or more neural network blocks supported by the UE; transmitting the control signaling to the UE.

Example 36. The method of example 35, wherein the one or more neural network block parameters further includes one or more adjustment parameters to the first neural network block used to process one or more signals, e.g., baseband signals, by the UE.

Example 37. The method of example 36, wherein the control signaling includes a resource allocation message including the one or more neural network block parameters for configuring network components.

Example 38. The method of example 37, wherein the network components include one or more cell groups, one or more component carriers associated with each of the one or more cell groups, one or more bandwidth parts associated with each of the one or more component carriers, or a combination thereof.

Example 39. The method of example 38, wherein the one or more cell groups includes a master cell group, a secondary cell group, a supplementary cell group, or a combination thereof.

Example 40. The method of any of examples 35-39, wherein transmitting the control signaling further includes: transmitting, to the UE, the control signaling over a physical downlink control channel, wherein the one or more neural network block parameters are transmitted over the physical downlink control channel according to the control signaling.

Example 41. The method of example 37, wherein the resource allocation message includes a downlink control information message, a media access control element, or radio resource control message.

Example 42. The method of any of examples 35-41, wherein the one or more adjustment parameters include an activation indication for one or more nodes of the first neural network block, a deactivation indication for the one or more nodes of the first neural network block, a weight value for the one or more nodes of the first neural network block, or a bias value for the one or more nodes of the first neural network block, or a combination thereof.

Example 43. The method of any of examples 35-42, wherein the one or more adjustment parameters to the first neural network block include a first adjustment to a first weight value for a first submodule of the first neural network block or a second adjustment to a second weight value for a second submodule of the first neural network block, or both.

Example 44. The method of any of examples 35-43, wherein transmitting the control signaling further includes: transmitting configuration information for the first neural network block and the one or more neural network block parameters over a physical downlink control channel, wherein the configuration information includes instructions for the UE to configure the first neural network block in place of a default network function block of the UE.

Example 45. The method of any of examples 35-44, wherein the configuration information includes an indication of one or more added algorithms for the first neural network block, one or more released algorithms from the default network function block, or a combination thereof.

Example 46. The method of any of examples 35-45, wherein one or more neural network block types supported by the UE includes the default network function block.

Example 47. The method of example 46, wherein transmitting the control signaling further includes: transmitting control information to the UE that indicates a new network function block to be the default network function block, wherein the control information is included in the control signaling.

Example 48. The method of any of examples 35-47, further including: receiving a request message from the UE to use a second neural network block different than the first neural network block; and transmitting an acknowledgement message to the UE based at least in part on the receiving of the request message.

Example 49. The method of any of examples 35-48, wherein transmitting the control signaling further includes: transmitting an indication of the first neural network block of a set of neural network blocks stored by the UE, wherein the one or more neural network blocks supported by the UE includes the set of neural network blocks.

Example 50. The method of any of examples 35-49, further including: transmitting a downlink message that includes the one or more neural network block parameters, wherein the one or more neural network block parameters transmitted as part of the downlink message.

Example 51. The method of any of examples 35-50, further including: transmitting an indication of a timer and an instruction for the UE to initiate the timer upon receiving the one or more neural network block parameters.

Example 52. The method of any of examples 35-51, further including: transmitting an indication of a counter of symbols, a counter of slots, or a combination thereof and an instruction for the UE to initiate the counter of symbols, the counter of slots, or the combination thereof upon receiving the one or more neural network block parameters.

Example 53. The method of any of examples 35-52, further including: transmitting, to the UE, one or more additional neural network block parameters; and receiving, from the UE, a negative acknowledgement message indicating that the one or more neural network block parameters failed to be successfully decoded.

Example 54. The method of example 53, wherein receiving the negative acknowledgement message is based at least in part on a priority status of the one or more additional neural network block parameters.

Example 55. The method of any of examples 35-54, further including: transmitting, to the UE, a request for feedback information about a performance of the first neural network block; and receiving, based at least in part on the request for the feedback information about the performance of the first neural network block, a report including the feedback information about the performance of the first neural network block.

Example 56. The method of example 55, wherein the request is communicated using a DCI message, a MAC-CE message, or an RRC message; and the feedback information is communicated using an uplink control message on an uplink control channel or an uplink data message on a physical uplink shared channel.

Example 57. The method of example 55, wherein the feedback information includes processed data, unprocessed data, complete measurements, partial measurements, or a combination thereof.

Example 58. The method of any of examples 35-57, wherein the first neural network block may be configured to perform channel estimation for one or more baseband signals, channel state information compression for the one or more baseband signals, or a combination thereof.

Example 59. The method of any of examples 35-58, further including: transmitting, to the UE, second capability information indicating that the base station supports at least one neural network block, wherein receiving the capability information from the UE is based at least in part on receiving the second capability information.

Example 60. The method of example 59, wherein the second capability information includes a system information block, a master information block, a downlink control information message, a media access control element, or a radio resource control message, or a combination thereof.

Example 61. The method of any of examples 35-60, wherein the capability information includes a system information block, a master information block, a downlink control information message, a media access control element, or a radio resource control message, or a combination thereof.

Example 62. The method of any of examples 35-61, wherein the one or more neural network block parameters include one or more input values, a number of layers of the first neural network block, a number of nodes for one or more layers of the first neural network block, a connection map across the one or more layers of the first neural network block, one or more activation functions for one or more nodes of the first neural network block, one or more weight values for the one or more nodes of the first neural network block, or one or more bias values for the one or more nodes of the first neural network block, or a combination thereof.

Example 63. The method of any of examples 35-62, further including: receiving a configuration of a configured first neural network block from the UE over a physical uplink control channel or a physical uplink shared channel, wherein the configured first neural network block has been configured by the UE based at least in part on the one or more neural network block parameters.

Example 64. The method of any of examples 35-63, further comprising receiving, from the UE, an acknowledgment message indicating that the control signaling has been successfully received by the UE.

Example 65. An apparatus for wireless communications at a user equipment (UE), including: a processor; memory coupled with the processor; and instructions stored in the memory and executable by the processor to cause the apparatus to perform operations of any of claims 1-34.

Example 66. An apparatus for wireless communications at a base station, including: a processor; memory coupled with the processor; and instructions stored in the memory and executable by the processor to cause the apparatus to perform operations of any of claims 35-64.

Example 67. An apparatus for wireless communications at a user equipment (UE), including means for performing functions of any of examples 1-34.

Example 68. An apparatus for wireless communications at a base station, including means for performing functions of any of examples 35-64.

Example 69. A non-transitory computer-readable medium storing code for wireless communications at a user equipment (UE), the code including instructions executable by a processor to perform operations of any of claims 1-34.

Example 70. A non-transitory computer-readable medium storing code for wireless communications at a base station, the code including instructions executable by a processor to perform operations of any of claims 35-64.

Example 71. A computer program product comprising code for wireless communications at a user equipment (UE), the code including instructions executable by a processor to perform operations of any of claims 1-34.

Example 72. A computer program product comprising code for wireless communications at a base station, the code including instructions executable by a processor to perform operations of any of claims 35-64.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a central processor unit (CPU), an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be used to process other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   transmitting, to a base station, capability information indicating one or more neural network blocks supported by the UE;
   receiving, from the base station, control signaling with one or more neural network block parameters based at least in part on the transmitting of the capability information;
   processing one or more signals generated by the UE using a first neural network block of the one or more neural network blocks and the one or more neural network block parameters;
   receiving, from the base station, additional control signaling including one or more additional neural network block parameters;
   determining a priority status of the one or more additional neural network block parameters; and
   transmitting, to the base station, a negative acknowledgement message in response to the one or more additional neural network block parameters failing to be successfully decoded and based at least in part on the priority status.

2. The method of claim 1, wherein:
   the control signaling comprises a resource allocation message including the one or more neural network block parameters for configuring network components;
   the network components include one or more cell groups, one or more component carriers associated with each of the one or more cell groups, one or more bandwidth parts associated with each of the one or more component carriers, or a combination thereof; and
   the resource allocation message comprises a downlink control information message, a media access control (MAC) control element (MAC-CE) message, or a radio resource control message.

3. The method of claim 1, wherein:
   the one or more neural network block parameters further comprise one or more adjustment parameters to the first neural network block, the method further comprising adjusting the first neural network block according to the one or more adjustment parameters; and
   processing the one or more signals using the first neural network block is based at least in part on adjusting the first neural network block.

4. The method of claim 3, wherein the one or more adjustment parameters comprise an activation indication for one or more nodes of the first neural network block, a deactivation indication of the one or more nodes of the first neural network block, a weight value for the one or more nodes of the first neural network block, an adjustment to a weight value for a submodule of the first neural network block, a bias value for the one or more nodes of the first neural network block, or a combination thereof.

5. The method of claim 1, wherein receiving the control signaling with the one or more neural network block parameters based at least in part on the transmitting of the capability information further comprises:
   receiving, from the base station, the control signaling over a physical downlink control channel, wherein the one or more neural network block parameters are received over the physical downlink control channel; and
   configuring the first neural network block in place of a default network function block of the UE based at least in part on receiving the one or more neural network block parameters;
   wherein processing the one or more signals generated by the UE using the first neural network block of the one or more neural network blocks is based at least in part on the configuring.

6. The method of claim 5, further comprising:
   transmitting a configuration of the configured first neural network block to the base station over a physical uplink control channel or a physical uplink shared channel.

7. The method of claim 1, wherein:
   receiving the control signaling with the one or more neural network block parameters based at least in part on the transmitting of the capability information further comprises receiving configuration information over a physical downlink control channel; and
   the configuration information comprises an indication of one or more added algorithms for the first neural network block, one or more released algorithms from a default network function block, or a combination thereof.

8. The method of claim 7, further comprising:
   identifying the default network function block, wherein the one or more neural network blocks supported by the UE comprises the default network function block and identifying the default network function block is based at least in part on receiving the control signaling; and
   receiving configuration information from the base station that indicates a new network function block to be the default network function block.

9. The method of claim 1, wherein receiving the control signaling with the one or more neural network block parameters comprises:
   identifying a set of neural network blocks stored by the UE, wherein the one or more neural network blocks supported by the UE comprises the set of neural network blocks;
   receiving an indication of the first neural network block of the set of neural network blocks; and identifying the first neural network block of the set of neural network blocks based at least in part on receiving the indication of the first neural network block,
wherein processing the one or more signals generated by the UE using the first neural network block of the one or more neural network blocks is based at least in part on identifying the first neural network block.

10. The method of claim 1, wherein:
the control signaling comprises a downlink message that comprises the one or more neural network block parameters; and
the downlink message comprises a downlink control information message, a media access control (MAC) control element (MAC-CE) message, a radio resource control message, or a combination thereof.

11. The method of claim 1, further comprising:
initiating, upon receiving the one or more neural network block parameters, a counter of symbols, a counter of slots, or a combination thereof, wherein processing the one or more signals generated by the UE using the first neural network block of the one or more neural network blocks is based at least in part on the counter of symbols, the counter of slots, or a combination thereof satisfying a threshold.

12. The method of claim 1, further comprising:
receiving, from the base station, a request for feedback information about a performance of the first neural network block, wherein the request is communicated using a downlink control information message, a media access control (MAC) control element (MAC-CE) message, or a radio resource control message; and
based at least in part on processing the one or more signals using the first neural network block and the request, transmitting, using an uplink control message on an uplink control channel or an uplink data message on a physical uplink shared channel, a report comprising the feedback information about the performance of the first neural network block to the base station,
wherein the feedback information comprises processed data, unprocessed data, complete measurements, partial measurements, or a combination thereof.

13. The method of claim 1, further comprising:
receiving, from the base station, second capability information indicating that the base station supports at least one neural network block, wherein the second capability information is included in a system information block, a master information block, a downlink control information message, a media access control (MAC) control element (MAC-CE), or a radio resource control message, or a combination thereof,
wherein transmitting the capability information to the base station is based at least in part on the second capability information.

14. The method of claim 1, wherein the one or more neural network block parameters comprise one or more input values, a number of layers of the first neural network block, a number of nodes for one or more layers of the first neural network block, a connection map across the one or more layers of the first neural network block, one or more activation functions for one or more nodes of the first neural network block, one or more weight values for the one or more nodes of the first neural network block, or one or more bias values for the one or more nodes of the first neural network block, or a combination thereof.

15. An apparatus for wireless communications at a user equipment (UE), comprising:
a processor,
memory coupled with the processor; and
instructions stored in the memory and executable by the processor to cause the apparatus to:
transmit, to a base station, capability information indicating one or more neural network blocks supported by the UE;
receive, from the base station, control signaling with one or more neural network block parameters based at least in part on the transmitting of the capability information;
process one or more signals generated by the UE using a first neural network block of the one or more neural network blocks and the one or more neural network block parameters
receive, from the base station, additional control signaling including one or more additional neural network block parameters;
determine a priority status of the one or more additional neural network block parameters; and
transmit, to the base station, a negative acknowledgement message in response to the one or more additional neural network block parameters failing to be successfully decoded and based at least in part on the priority status.

16. The apparatus of claim 15, wherein:
the control signaling comprises a resource allocation message including the one or more neural network block parameters for configuring network components;
the network components include one or more cell groups, one or more component carriers associated with each of the one or more cell groups, one or more bandwidth parts associated with each of the one or more component carriers, or a combination thereof; and
the resource allocation message comprises a downlink control information message, a media access control (MAC) control element (MAC-CE) message, or a radio resource control message.

17. The apparatus of claim 15, wherein:
the one or more neural network block parameters further comprise one or more adjustment parameters to the first neural network block used to process the one or more signals by the UE;
the instructions stored in the memory are further executable by the processor to cause the apparatus to:
adjust the first neural network block according to the one or more adjustment parameters; and
process the one or more signals generated by the UE by using the first neural network block of the one or more neural network blocks based at least in part on adjusting the first neural network block.

18. The apparatus of claim 15, wherein the instructions stored in the memory are further executable by the processor to cause the apparatus to:
receive, from the base station, a request for feedback information about a performance of the first neural network block, wherein the request is communicated using a downlink control information message, a media access control (MAC) control element (MAC-CE) message, or a radio resource control message; and
based at least in part on processing the one or more signals using the first neural network block and the request, use an uplink control message on an uplink control channel or an uplink data message on a physical uplink shared channel to transmit a report comprising the feedback information about the performance of the first neural network block to the base station, wherein the feedback information comprises processed data, unprocessed data, complete measurements, partial measurements, or a combination thereof.

* * * * *